US012453359B2

(12) United States Patent
Nielsen et al.

(10) Patent No.: US 12,453,359 B2
(45) Date of Patent: Oct. 28, 2025

(54) PH NEUTRAL BETA-LACTOGLOBULIN BEVERAGE PREPARATION

(71) Applicant: ARLA FOODS AMBA, Viby J (DK)

(72) Inventors: Søren Bang Nielsen, Herning (DK); Tanja Christine Jæger, Kibæk (DK); Kasper Bøgelund Lauridsen, Silkeborg (DK); Kåre Søndergaard, Holstebro (DK); Guilherme De Moura Maciel, Herning (DK); Hans Bertelsen, Videbæk (DK); Behnaz Razi Parjikolaei, Herning (DK)

(73) Assignee: ARLA FOODS AMBA, Viby J (DK)

( * ) Notice: Subject to any disclaimer, the term of this patent is extended or adjusted under 35 U.S.C. 154(b) by 735 days.

(21) Appl. No.: 17/254,723

(22) PCT Filed: Jun. 26, 2019

(86) PCT No.: PCT/EP2019/067039
§ 371 (c)(1),
(2) Date: Dec. 21, 2020

(87) PCT Pub. No.: WO2020/002450
PCT Pub. Date: Jan. 2, 2020

(65) Prior Publication Data
US 2022/0202048 A1 Jun. 30, 2022

(30) Foreign Application Priority Data

Jun. 27, 2018 (EP) .................................. 18180212
Jun. 27, 2018 (EP) .................................. 18180224
(Continued)

(51) Int. Cl.
A23L 2/39 (2006.01)
A23B 70/30 (2025.01)
(Continued)

(52) U.S. Cl.
CPC ................ A23L 2/39 (2013.01); A23B 70/30 (2025.01); A23C 9/1427 (2013.01); A23J 1/205 (2013.01);
(Continued)

(58) Field of Classification Search
CPC ... A23L 2/385; A23L 2/39; A23L 2/46; A23L 2/48; A23L 2/58; A23L 2/60; A23L 2/62;
(Continued)

(56) References Cited

U.S. PATENT DOCUMENTS 2,790,790 A 4/1957 Kostergaard
4,351,710 A 9/1982 Jain
(Continued)

FOREIGN PATENT DOCUMENTS

AU 2006328958 A1 6/2007
CA 1243887 A 11/1988
(Continued)

OTHER PUBLICATIONS

Tai et al.; "β-Lactoglobulin Influences Human Immunity and Promotes Cell Proliferation"; Nov. 13, 2016; National Library of Medicine; https://www.ncbi.nlm.nih.gov/pmc/articles/PMC5124466/ (Year: 2016).*
(Continued)

Primary Examiner — Erik Kashnikow
Assistant Examiner — Austin Parker Taylor
(74) Attorney, Agent, or Firm — Lisa Mueller; Tristan Fuierer; Casimir Jones SC

(57) ABSTRACT

The present invention pertains to a new packaged, heat-treated beverage preparation having a pH in the range of 5.5-8.0. The invention furthermore relates to a method of producing a pack-aged, heat-treated beverage preparation and to different uses of the packaged heat-treated beverage preparation.

23 Claims, 8 Drawing Sheets

(30) Foreign Application Priority Data

Jun. 27, 2018 (WO) .............. PCT/EP2018/067280
Jun. 27, 2018 (WO) .............. PCT/EP2018/067299
Jun. 27, 2018 (WO) .............. PCT/EP2018/067316

(51) Int. Cl.

| | | |
|---|---|---|
| A23C 9/142 | (2006.01) | |
| A23J 1/20 | (2006.01) | |
| A23J 3/08 | (2006.01) | |
| A23L 2/10 | (2006.01) | |
| A23L 2/60 | (2006.01) | |
| A23L 2/66 | (2006.01) | |
| A23L 2/68 | (2006.01) | |
| A23L 33/135 | (2016.01) | |
| A23L 33/19 | (2016.01) | |
| A23P 10/40 | (2016.01) | |
| A61K 9/00 | (2006.01) | |
| A61K 38/01 | (2006.01) | |
| C07K 14/47 | (2006.01) | |

(52) U.S. Cl.
CPC .............. *A23J 3/08* (2013.01); *A23L 2/102* (2013.01); *A23L 2/60* (2013.01); *A23L 2/66* (2013.01); *A23L 2/68* (2013.01); *A23L 33/135* (2016.08); *A23L 33/19* (2016.08); *A23P 10/40* (2016.08); *A61K 9/0095* (2013.01); *A61K 38/018* (2013.01); *C07K 14/4717* (2013.01); *A23V 2002/00* (2013.01)

(58) Field of Classification Search
CPC .... A23L 2/66; A23L 2/70; A23L 33/19; A23J 1/20; A23J 1/205; A23J 3/08; A61K 9/0095; A61K 38/018; C07K 14/4717
USPC .................................... 426/590, 583
See application file for complete search history.

(56) References Cited

U.S. PATENT DOCUMENTS

| | | | |
|---|---|---|---|
| 4,485,040 A | 11/1984 | Roger et al. | |
| 4,659,667 A | 4/1987 | Brewer et al. | |
| 5,008,376 A | 4/1991 | Bottomely | |
| 5,077,067 A | 12/1991 | Thibault | |
| 5,093,143 A | 3/1992 | Behr et al. | |
| 5,278,288 A | 1/1994 | Kawasaki et al. | |
| 5,420,249 A | 5/1995 | de Wit et al. | |
| 5,436,020 A | 7/1995 | Kuwata et al. | |
| 5,455,331 A | 10/1995 | Pearce | |
| 5,503,864 A | 4/1996 | Uchida et al. | |
| 5,641,531 A | 6/1997 | Liebrecht et al. | |
| 5,744,179 A | 4/1998 | Shimamura et al. | |
| 5,747,647 A * | 5/1998 | Stack .............. | A23J 1/205 530/418 |
| 5,756,681 A | 5/1998 | Neurath et al. | |
| 5,898,067 A | 4/1999 | Balschmidt et al. | |
| 5,961,934 A | 10/1999 | Arnowitz et al. | |
| 5,986,063 A | 11/1999 | Etzel | |
| 6,261,624 B1 | 7/2001 | Hudson et al. | |
| 6,290,974 B1 * | 9/2001 | Swaisgood .............. | A61K 8/986 424/440 |
| 6,312,755 B1 | 11/2001 | Wu | |
| 6,372,276 B1 | 4/2002 | Lindquist | |
| 6,528,622 B1 | 3/2003 | Ayers et al. | |
| 6,613,377 B2 | 9/2003 | Wu | |
| 6,998,259 B1 | 2/2006 | Davis et al. | |
| 8,791,064 B2 * | 7/2014 | Livney .............. | A23L 33/15 977/773 |
| 10,834,934 B2 | 11/2020 | Mikkelsen et al. | |
| 2001/0050150 A1 | 12/2001 | Gu | |
| 2002/0061359 A1 * | 5/2002 | Baker ............. | A23J 3/08 426/583 |
| 2003/0078392 A1 | 4/2003 | Leaver et al. | |
| 2006/0003073 A1 * | 1/2006 | Etzel .............. | A23J 3/08 426/583 |
| 2006/0040033 A1 | 2/2006 | Zeller | |
| 2007/0148307 A1 | 6/2007 | Sherwood et al. | |
| 2007/0172474 A1 | 7/2007 | Zemel | |
| 2008/0193601 A1 * | 8/2008 | Nasser ............. | A23F 3/163 426/597 |
| 2009/0074918 A1 | 3/2009 | Foegeding et al. | |
| 2011/0038942 A1 | 2/2011 | Livney | |
| 2011/0046048 A1 * | 2/2011 | Minor ............. | A23L 33/185 514/5.5 |
| 2011/0150824 A1 * | 6/2011 | Faber ............. | A23L 33/12 424/234.1 |
| 2011/0218327 A1 * | 9/2011 | Hansen .......... | A23J 1/205 530/394 |
| 2012/0029165 A1 | 2/2012 | Etzel et al. | |
| 2012/0064058 A1 * | 3/2012 | Cavallo ........... | A23L 29/06 424/94.1 |
| 2012/0211392 A1 | 8/2012 | Jung et al. | |
| 2013/0065822 A1 | 3/2013 | Miller et al. | |
| 2013/0129899 A1 * | 5/2013 | Ummadi ......... | A23C 9/1542 426/399 |
| 2013/0171318 A1 * | 7/2013 | Bovetto .......... | A23P 10/40 426/583 |
| 2014/0170266 A1 | 6/2014 | Siemensma et al. | |
| 2014/0255583 A1 | 9/2014 | Sarama et al. | |
| 2014/0287095 A1 | 9/2014 | Li et al. | |
| 2015/0064317 A1 | 3/2015 | Sherwood et al. | |
| 2015/0250221 A1 | 9/2015 | Patel et al. | |
| 2016/0227828 A1 * | 8/2016 | Chapman ......... | A23L 33/19 |
| 2016/0262424 A1 * | 9/2016 | Mikkelsen ........ | A23C 21/06 |
| 2017/0142993 A1 | 5/2017 | Neiss | |
| 2017/0318835 A1 | 11/2017 | Lihme et al. | |
| 2018/0125926 A1 * | 5/2018 | Williams ......... | A61P 21/00 |
| 2019/0159502 A1 | 5/2019 | Heeney et al. | |
| 2019/0364917 A1 * | 12/2019 | Sher ............... | A23L 29/25 |

FOREIGN PATENT DOCUMENTS

| | | | |
|---|---|---|---|
| CN | 1817149 A | 8/2006 | |
| CN | 101031208 A | 9/2007 | |
| CN | 102711528 A | 10/2012 | |
| CN | 102746395 A | 10/2012 | |
| CN | 103491791 A | 1/2014 | |
| CN | 104256053 A | 1/2015 | |
| CN | 105792659 A | 7/2016 | |
| CN | 105792663 A | 7/2016 | |
| CN | 106581587 A | 4/2017 | |
| CN | 106798345 A | 6/2017 | |
| CN | 107048137 A * | 8/2017 | .............. A23L 2/39 |
| CN | 107105691 A | 8/2017 | |
| CN | 109843072 A | 6/2019 | |
| CN | 110381745 A | 10/2019 | |
| CN | 110621164 A | 12/2019 | |
| EP | 0126290 A1 | 11/1984 | |
| EP | 0311283 | 4/1989 | |
| EP | 0412590 | 2/1991 | |
| EP | 0604684 | 7/1994 | |
| EP | 1839492 A1 | 10/2007 | |
| EP | 2225951 A1 | 9/2010 | |
| EP | 2316283 | 5/2011 | |
| EP | 3097790 B1 * | 5/2018 | |
| FR | 2296428 A1 | 7/1976 | |
| FR | 2687901 | 9/1993 | |
| IE | 62295 | 1/1995 | |
| IE | 62295 B1 | 1/1995 | |
| JP | S61268138 A | 11/1986 | |
| JP | H05236883 A | 9/1993 | |
| JP | H06292514 A | 10/1994 | |
| JP | H07123927 A | 5/1995 | |
| JP | H09238614 A * | 9/1997 | |
| JP | H10 218755 | 8/1998 | |
| JP | 2006508160 A | 3/2006 | |
| JP | 2008029292 A | 2/2008 | |
| JP | 2008525019 A | 7/2008 | |
| JP | 2009531044 A | 9/2009 | |
| JP | 2013053053 | 3/2013 | |

(56) References Cited

FOREIGN PATENT DOCUMENTS

| | | |
|---|---|---|
| JP | 2013509335 A | 3/2013 |
| JP | 2013521779 A | 6/2013 |
| JP | 2013532486 A | 8/2013 |
| JP | 2015530123 A | 10/2015 |
| KR | 20140106535 A | 9/2014 |
| WO | 1992011770 A1 | 7/1992 |
| WO | WO 1994022903 | 10/1994 |
| WO | WO 95/34216 | 12/1995 |
| WO | 1996036728 A1 | 11/1996 |
| WO | WO 99/29183 | 6/1999 |
| WO | WO 01/05243 | 1/2001 |
| WO | WO 01/52665 | 7/2001 |
| WO | WO 2002/056707 | 7/2002 |
| WO | 2004049819 A2 | 6/2004 |
| WO | WO 2004/049819 | 6/2004 |
| WO | WO 2005/004616 | 6/2004 |
| WO | WO 2007/110421 | 10/2007 |
| WO | WO-2008136671 A1 * | 11/2008 ........... A23C 9/1307 |
| WO | 2009038746 A1 | 3/2009 |
| WO | WO 2009/038746 | 3/2009 |
| WO | 2009082229 A2 | 7/2009 |
| WO | WO 2009/112036 | 9/2009 |
| WO | WO 2009/113845 | 9/2009 |
| WO | WO 2009/113858 | 9/2009 |
| WO | WO 2010/037736 | 4/2010 |
| WO | WO 2010/085957 | 8/2010 |
| WO | WO 2011/051436 | 5/2011 |
| WO | WO 2011/112695 | 9/2011 |
| WO | WO 2011119004 A2 | 9/2011 |
| WO | WO 2013167720 A1 | 11/2013 |
| WO | WO 2014/055830 | 4/2014 |
| WO | WO 2014/076252 | 5/2014 |
| WO | WO 2015/095542 | 6/2015 |
| WO | 2016054375 A1 | 10/2015 |
| WO | WO 2016/041988 | 3/2016 |
| WO | WO 2016/041995 | 3/2016 |
| WO | WO 2016/055064 | 4/2016 |
| WO | WO 2018/115520 | 6/2018 |
| WO | 2019234957 A1 | 12/2019 |
| WO | 2021126057 A1 | 6/2021 |

OTHER PUBLICATIONS

Chatterton et al.; "Bioactivity of β-lactoglobulin and α-lactalbumin—Technological implications for processing"; Nov. 2006; International Dairy Journal; https://www.sciencedirect.com/science/article/pii/S0958694606001439 (Year: 2006).*

Madureira AR, Pereira CI, Gomes AMP, Pintado ME, Xavier Malcata F. Bovine whey proteins—Overview on their main biological properties. Food Res Int. Dec. 2007;40(10):1197-1211. doi: 10.1016/j.foodres.2007.07.005. Epub Aug. 3, 2007. PMCID: PMC7126817. https://pmc.ncbi.nlm.nih.gov/articles/PMC7126817/ (Year: 2007).*

Mcmeekin Thomas L., et al: "The Hydration of β-Lactoglobulin Crystals", Journal of the American Chemical Society, vol. 64, No. 10, Oct. 1, 1942, pp. 2393-2398, XP093014909, Retrieved from the Internet: URL: https://pubs.acs.org/doi/pdf/10.1021/ja01262a049.

Briggs D R, et al: "Electrokinetics. XXVI. The Electroviscous Effect. III. In β-Lactoglobulin Systems. An Interpretation of the Meaning of Ko Values Obtained from Electroviscosity Data", The Journal of Physical Chemistry, vol. 48, No. 1, Jan. 1944, pp. 1-12, XP093014927, Retrieved from the Internet: URL: https://pubs.acs.org/doi/pdf/10.1021/i150433a001.

De Wit, J.N., van Kessel, Th., "Effects of ionic strength on the solubility of whey protein products. A colloid chemical approach", 1996, Food Hydrocolloids, vol. 10, No. 2, pp. 143-149 (Year: 1996).

Polis et al., "Isolation of an Electrophoretically Homogenous Crystalline Component of β-Lactoglobulin", 1950, Journal of the American Chemical Society, vol. 72, pp. 4965-4968 (Year: 1950).

Faraji Dizaji, N., "Minor Whey Protein Purification Using ion-Exchange Column Chromatography", Apr. 2016, Electronic Thesis and Dissertation Repository, West University, 3685 (Year: 2016).

"Rotary evaporators", 2015, https://scientificservices.eu/item/rotary-evaporators/1068 (Year: 2015).

Amundson et al., "Production of enriched protein fractions of beta-lactoglobulin and alpha-lactalbunin from cheese whey" Journal of Food Processing and Preservation 1982, 6: 55-71.

Anonymous: "Whey protein" Wikipedia, Dec. 20, 2016, pp. 1-5, retrieved on Feb. 15, 2018.

Aschaffenburg et al. "Improved Method for the Preparation of Crystalline beta-Lactoglobulin and alpha-Lactalbumin from Cow's Milk" Bioch. 1957, vol. 65, pp. 273-277.

Boland, Handbook of food proteins: Whey Proteins, Chapter 3, 1st ed.; Woodhead Publishing Limited, 2011; pp. 30-55.

Coquerel, "Crystallization of molecular systems from solution: phase diagrams, supersaturation and other basic concepts" Chem Soc Rev Jan. 2014, 43:2286-2300.

Czerwenka et al., "Investigation of the Lactosylation of Whey Proteins by Liquid Chromatography-Mass Spectrometry" J. Agric. Food Chem. 2006, 54: 8874-8882.

De Jongh et al., "Mild Isolation Procedure Discloses New Protein Structural Properties of β-Lactoglobulin" J. Dairy Sci. 2001, 84:562-571.

Doultani et al "Whey Protein Isolate and Glyco-macropeptide Recovery from Whey Using Ion Exchange Chromatography" Journal of Food Science May 1, 2003, 68(4): 1389-1395.

Etzel, "The emerging role of dairy proteins and bioactive peptides in nutrition and health" The Journal of Nutrition, American Society for Nutritional Sciences 2004, 996S-1002S.

Fox et al., "Fundamentals of Cheese Science" An Aspen Publication 2000, 1260-9. pp. 403-405, and pp. 517-519.

Fox et al., "Separation of beta-lactoglobulin from other milk serum proteins by trichloroacetic Acid" J. Dairy Science 1967, 50(9): 1364-1367.

Guerra-Hernandez et al., "Maillard Reaction Evaluation by Furosine Determination During Infant Cereal Processing" Journal of Cereal Science 1999, 29: 171-176.

Halford et al., "Satiety-enhancing products for appetite control: science and regulation of functional foods for weight management" Proceedings of the Nutrition Society 2012, 71: 350-362.

Hannigan "Super protein from acid whey" Food Engineering Mar. 1982, 54(3): 96-97.

Harrison et al., "Crystallization" in: "Bioseparations Science and Engineering", Jan. 27, 2015, Oxford University Press, pp. 362-383.

Jung et al., "Liquid Crystalline Phase Behavior of Protein Fibers in Water: Experiments versus Theory" Langmuir 2009, 26(1): 504-514.

Kim et al, "High-level expression of bovine b-lactoglobulin in Pichia pastoris and characterization of its physical properties" Protein Engineering 1997, 10(11): 1339-1345.

Kramer et al., "Effect of Oxidation and Protein Unfolding on Cross-Linking of beta-Lactoglobulin and alpha-Lactalbumin" J. Agric. Food Chem. 2017, 65:10258-10269.

Larson, B.L., et al. "Origin of the major specific proteins in milk"—From the Laboratory of Biochemistry, Department of Dairy Science, University of Illinois, Urbana, Illinois, Jan. 31, 1957, pp. 565-573.

Lien, "Infant formulas with increased concentrations of alpha-lactalbumin" Am J Clin Nutr 2003;77(suppl):1555S-8S.

Lovett et al. "Calcium Chloride and Vitamin D Bioavailability from Fortified Sports Drink in Wistar Rats" Int J Food Nutr 2014, Sci 1(1): 6-12.

Lozano et al., "An improved method for isolation of beta-lactoglobulin" International dairy journal 2008, 18:55-63.

Miranda, E.A., et al: "Crystallization of Lactose and Whey Protein"; "Chapter 6" in: Jane Selia dos Reis Coimbra and Jose A. Teixeira: "Engineering Aspects of Milk and Dairy Products" Nov. 24, 2009, Taylor & Francis, pp. 121-153.

Mulet-Cabero et al., "Structural mechanism and kinetics of in vitro gastric digestion are affected by process-induced changes in bovine milk" Food Hydrocolloids 2019, 86:172-183.

Muller et al., "Purification of α-lactalbumin from a prepurified acid whey: Ultrafiltration or precipitation" Lait 2003, 83:439-451.

(56) References Cited

OTHER PUBLICATIONS

Nicorescu et al., "Effect of dynamic heat treatment on the physical properties of whey protein foams" Food Hydrocolloids 2009, 23(4):1209-1219.
Oliveira et al., "Crystal structures of bovine β-Lactoglobulin in the orthorhombic space group C222-1. Structural differences between genetic variants A and B and features of the Tanford transition" Eur J. Biochem 2001, 268: 477-483.
Palmer "The preparation of a crystalline globulin from the albumin fraction of cow's milk" J. Biol. Chem., vol. 104, No. 2. Feb. 1, 1934, pp. 359-372.
Qin et al., "Functional implications for structural differences between variants A and B of bovine β-Lactoglobulin," Protein Science 1999, 8:75-83.
Sharma et al., "Functionality of milk powders and milk-based powders for end use applications—a review" Comprehensive Reviews in food science and food safety, Institute of Food Technologists, Chicago, IL, USA. vol. 11, No. 5, Sep. 1, 2012, pp. 518-528.
Siddique et al., "Influence of pulsed light treatment on the aggregation of whey protein isolate" Food Research International 2017, 99: 419-425.
Slack et al. "Production of Enriched Beta-Lactoglobulin and Alpha-Lactalbumin Whey Protein Fractions" Journal of Food Processing and Preservation 1986, vol. 10, pp. 19-30.
Slack et al., "Foaming and emulsifying characteristics of fractioned whey protein" Journal of Food Processing and Preservation 1986, vol. 10, pp. 81-88.
Soyeurt et al. "Mid-infrared prediction of lactoferrin content in bovine milk: potential indicator of mastitis" Animal 2012, 6:11, pp. 1830-1838.
Steinrauf "Preliminary X-ray data for some new crystalline forms of Beta-lactoglobulin and hen egg-white lysozyme" Acta Cryst. 1959, 12, 77, pp. 77-79.
Thermal technologies in food processing: Continuous heat processing, Chapter 3, Edited by Philip Richardson, Woodhead Publishing Limited, Cambridge, England, 2001, pp. 29-48.
Turhan et al., "Whey Protein Isolate and alpha-Lactalbumin Recovery from Lactic Acid Whey Using Cation-Exchange Chromatography" Journal of Food Science 2004, 69(2): 66-70.
Vyas et al "Scale-Up of Native beta-lactoglobulin Affinity separation process" J. Dairy Sci. 2002, 85:1639-1645.
C. Bramaud, et al., "Whey Protein Fractionation: Isoelectric Precipitation of a-Lactalbumin under Gentle Heat Treatment," Biotechnol Bioeng. Nov. 20, 1997;56(4):391-7.
Genevieve Gesan-Guiziou, et al. "Process steps for the preparation of purified fractions of a-lactalbumin and b-lactoglobulin from whey protein concentrates," Journal of Dairy Research (1999) 66 225-236, Jan. 1, 1999.
Larson & Jennes, "Beta-Lactoglobulin", Biochemical Preparations 1995, pp. 23-28.
Jongh et al., Mild isolation procedure discloses new protein structural properties of beta-lactoglobulin. J Dairy Sci. Mar. 2001;84(3):562-71.
H.F. Alomirah, et al., "Separation and characterization of beta-lactoglobulin and alpha-lactalbumin from whey and whey protein preparations," May 2004 International Dairy Journal 14(5):411-419, DOI:10.1016/j.idairyj.2003.09.006.
Hans Bertelsen, Expert Declaration for European Patent Application No. EP3858145A1, Aug. 2, 2023.
J.N. de Wit, "Effects of ionic strength on the solubility of whey protein products. A colloid chemical approach," Food Hydrocolloids, vol. 10, Issue 2, Apr. 1996, pp. 143-149.
World Health Organization, "Toluene," https://web.archive.org/web/20221007010454/https://inchem.org/documents/jecfa/jecmono/v16je24.htm (IPCS, INCHEM, Year: 2022).
New Jersey Department of Health, "Right to Know Hazardous substance Fact Sheet Common Name: Toluene," Apr. 2016.

Ke Chen, et al., "Prediction of protein crystallization using collocation of amino acid pairs," May 2007, Biochemical and Biophysical Research Communications 355(3):764-9, DOI:10.1016/j.bbrc.2007.02.040.
Gorska et al., "The influence of trehalose-maltodextrin and lactose-maltodextrin matrices on thermal and sorption properties of spray-dried β-lactoglobulin-vitamin D3 complexes", 2013, J Therm Anal Calorim, vol. 112, pp. 429-436 (Year: 2013).
Tanford, C., et al., "Physico-Chemical Comparison of β-Lactoglobulins A and B", 1959, The Journal of Biological Chemistry, vol. 234, pp. 2874-2877 (Year: 1959).
Kirkwood, J., et al. "Using isoelectric point to determine the pH for initial protein crystallization trials," Bioinformatics, 31(9), 2015, 1444-1451, Jan. 7, 2015; doi: 10.1093/bioinformatics/btv011.
Majhi, P.R., et al. "Electrostatically Driven Protein Aggregation: B-Lactoglobulin at Low Ionic Strength," Langmuir. Jul. 28, 2006; 22(22):9150-9. doi: 10.1021/la053528w.
Maria Dolores Pérez, et al., "Interaction of β-Lactoglobulin with Retinol and Fatty Acids and Its Role as a Possible Biological Function for This Protein: A Review," Journal of Dairy Science, vol. 78, Issue 5, May 1995, pp. 978-988.
Mayyada M H El-Sayed, et al., "Trends in whey protein fractionation," Biotechnol Lett. Aug. 2011;33(8):1501-11. doi: 10.1007/s10529-011-0594-8. Epub Mar. 19, 2011.
Mark R Etzel, "Manufacture and use of dairy protein fractions," J Nutr. Apr. 2004;134(4):996S-1002S. doi: 10.1093/in/134.4.996S. PMID: 15051860.
McSweeney, P., et al., editors, "Advanced Dairy Chemistry, vol. 1A, Proteins: Basic Aspects, 4th edition," Spinger, 2013, pp. 57-60, 216.217.
Armstrong, J., et al., "On the fractionation of beta-lactoglobulin and alpha-lactalbumin," Biochim Biophys Acta. Sep. 19, 1967;147(1):60-72. doi: 10.1016/0005-2795(67)90090-6.
Li Tiehong, et al., Dairy Industry, Functional Whey Protein Research and Application of Thermal Modification Technology—China Academic Journal Electronic Publishing House, 2009; DOI:10.16172/j.cnki.114768.2009.01.002.
Phan-Xuan, Tuan, et al. "Heat induced formation of beta-lactoglobulin microgels driven by addition of calcium ions" Food Hydrocolloids (2012), Sep. 19, 2012.
Phan-Xuan, Tuan, et al. "Tuning the Structure of Protein Particles and Gels with Calcium or Sodium Ions" ACS Publications, 2013 American Chemical Society, Apr. 25, 2013.
Saglam, Dilek, et al. "Relation between Gelation Conditions and the Physical Properties of Whey Protein Particles" Langmuir—ACS Pblications, 2012 American Chemical Society; published Apr. 3, 2012.
Taheri, Afsaneh, et al. "Rheological Characteristics of Soluble Cress Seed Mucilage and beta-Lactoglobulin Complexes with Salts Addition: Rheological Evidence of Structural Rearrangement" Gels 2023, 9, 485; published Jun. 13, 2023.
Xiu, Xiuling, et al. Aggregation Characteristics of beta-Lactoglubulin: a Review. China Academic Journal Electronic Publishing House, Jul. 28, 2014—translated Abstract.
Naofumi Kitabatake et al., Characteristics and Utilizaton of Process Whey Protein, Milk Science, 2001, vol. 50, No. 3, pp. 107-112. Translation of Introduction.
Huffman LM, et al. Maximizing the value of milk through separation technologies. J Dairy Sci. Oct. 1999;82(10):2238-44. doi: 10.3168/jds.s0022-0302(99)75471-8.
Agarwal, "Sodium content in retail Cheddar, Mozzarella, and process cheeses varies considerably in the United States", J. Dairy Sci . 2011, 94. pp. 1605-1615 (Year: 2011).
Eat This Much "100% Micellar Casein Protein", and "Micellar Casein Powder", https://www.eatthismuch.com/food/nutrition/100-micellar-casein-protein, 1856289/, and https://www.eatthismuch.com/food/nutrition/micellar-casein-powder,2269279/ (Year: 2023).
Mankun Pang, Natural Pharmaceutical Chemistry Foundation, China Press of Traditional Chinese Medicine, Aug. 2013, pp. 43-45, Chapter 1.
Bateman L, et al., "In vitro digestion of beta-lactoglobulin fibrils formed by heat treatment at low pH." J Agric Food Chem. Sep. 8, 2010; 58(17):9800-8. doi: 10.1021/jf101722t. PMID: 20684554.

(56) References Cited

OTHER PUBLICATIONS

Robertson, D. L., "Supersaturated Solution", 2010, https://home.miracosta.edu/dlr/info/super_saturation.htm (Year: 2010).
Kinekawa Y, et al. Purification of beta-lactoglobulin from whey protein concentrate by pepsin treatment. J Dairy Sci., Mar. 1996.
Nath, A et al. Studies on the separation of proteins and lactose from casein whey by cross-flow ultrafiltration. Desalination and Water Treatment. 2015. 54: 481-501. (Year: 2015).
Dumetz, AC et al. Effects of pH on protein-protein interactions and implications for protein phase behavior. Biochimica et Biophysica Acta. 2008. 1784: 600-610. (Year: 2008).
McPherson, A et al. Introduction to protein crystallization. Acta Crystallogr. F. Struct. Biol. Commun. 2014. 70(Pt 1): 2-20. (Year: 2014).
Camlab, Turbidity Standards—Quick Reference Guide, 2013, available at: https://www.camlab.co.uk/blog/turbidity-standards-quick-reference-guide.
Grant Clayton, et al., Third-Party Submission filed on Jul. 16, 2025 in U.S. Appl. No. 18/884,534.

* cited by examiner

BLG
pH 6.0, 94°C/14 minutes

WPI-B　　　　WPI A
pH 6.0　　　　pH 6.0

PH NEUTRAL BETA-LACTOGLOBULIN BEVERAGE PREPARATION

FIELD OF THE INVENTION

The present invention pertains to a new packaged, heat-treated beverage preparation having a pH in the range of 5.5-8.0. The invention furthermore relates to a method of producing a packaged, heat-treated beverage preparation and to different uses of the packaged heat-treated beverage preparation.

BACKGROUND

Beverages developed for sports nutrition are particularly likely to contain whey proteins which are incorporated for their unique nutritional benefits for athletes. Some medical and therapeutic nutritional beverages also include whey proteins because of their abundant supply of essential amino acids for protein synthesis, digestibility and health benefits.

Whey proteins can be isolated from milk serum or whey. Whey typically comprises a mixture of beta-lactoglobulin (BLG), alpha-lactalbumin (ALA), serum albumin and immunoglobulins, of which BLG is the most dominant. Whey protein concentrates (WPC) thus comprise a mixture of these proteins. Whey protein isolates (WPI) contain less fat and lactose than WPC.

Whey products may have a yellow colour. A number of attempts have therefore been performed in the past in order to remove or reduce the yellow colour of whey products.

The traditional way of whitening/bleaching whey has been by a chemical bleaching of the whey using hydrogen peroxide (HP, $H_2O_2$); these methods may have a negative effect on the taste and may enhance unfolding and aggregation of whey proteins (Kramer et al, 2017. "Effect of Oxidation and Protein Unfolding on Cross-Linking of beta-Lactoglobulin and alfa-Lactalbumin", J. Agric. Food Chem. 2017, 65, 10258-10269.

WO2005/004616 A1 describes a method of bleaching or whitening a dairy product, comprising adding a lipoxygenase (LOX) to the dairy product. The method may be used to whiten whey and milk products.

Other methods for whitening whey include addition of chlorophylls to the milk product or use of Titanium dioxide ($TiO_2$). Titanium dioxide is an inorganic, inert white pigment that is used in cheese milk, candies, chewing gum, toothpaste etc. and has been approved by the FDA as food grade.

WO 2018/115520 A1 discloses a method of producing edible isolated beta-lactoglobulin compositions and/or compositions containing crystallised beta-lactoglobulin based on crystallisation of BLG in salting-in mode. The crystallised BLG may subsequently be separated from the remaining mother liquour.

WO 2011/112695 A1 discloses nutritional compositions and methods of making and using the nutritional compositions. The nutritional compositions comprise whey protein micelles and leucine and provide a sufficient amount of leucine to improve protein synthesis in humans, while also maintaining a low-viscosity fluid matrix and acceptable organoleptic properties.

WO2011/051436 A1 discloses an at least partially transparent composition intended for human or animal consumption and relates to the packaging of such compositions. One embodiment of the present invention relates to an at least partially transparent container containing an at least partially transparent aqueous non-alcoholic composition. The container comprises at least one polarizer that makes liquid crystals present in the composition visible.

WO2004/049819 A2 discloses a method for improving the functional properties of globular proteins, comprising the steps of providing a solution of one or more globular proteins, in which solution the protein(s) is/are at least partially aggregated in fibrils; and performing one or more of the following steps in random order: increasing the pH; increasing the salt concentration; concentrating the solution; and changing the solvent quality of the solution. Preferably, the solution of the one or more globular protein is provided by heating at a low pH or the addition of a denaturing agent. Disclosed is also the protein additive thus obtained, the use thereof for food and non-food applications and to the food and non-food products containing the protein additive.

WO 2010/037736 A1 discloses isolation of whey proteins and the preparation of a whey product and a whey isolate. In particular the present invention relates to the isolation of a β-lactoglobulin product and the isolation of an α-enriched whey protein isolate from whey obtained from an animal. The α-enriched whey protein isolate provided by the present invention is besides from being low in β-lactoglobulin also high in α-lactalbumin and immunoglobulin G.

FR 2 296 428 discloses protein compositions for dietetic and therapeutic use based on lactoserum proteins obtained by any known separation process. The compositions can be used for the treatment or prophylaxis of digestive disorders in infants and adults (e.g. diarrhoea), to increase resistance to intestinal infections, and to treat certain metabolic disorders (e.g. hyperphylalaninaemia). They can also be used dermatologically or cosmetically, and can form part of a low-protein diet.

SUMMARY OF THE INVENTION

The present inventors have observed that the extent to which beverages comprising whey proteins are colour neutral or white affects the consumer's perception of a beverage comprising whey proteins. A transparent beverage having a yellow glance or a milky beverage having a yellowish colour is not attractive to the consumer.

An object of the present invention is to provide a packaged pH neutral heat-treated beverage preparation which is more colour neutral than traditional whey containing beverages.

Another object is to make use of a more gentle way of reducing the yellow colour. A further object is that it should not have a negative impact on the stability of the beverage.

The present inventors have now discovered that such packaged heat-treated beverages can be provided within a broad neutral pH range of 5.5-8.0, and within a broad protein concentration of 1-20 wt %, while still having a low viscosity, being stable and more colour neutral. The present invention provides both beverages that are transparent and in other embodiments opaque.

Thus, an aspect of the invention pertains to a packaged, heat-treated beverage preparation having a pH in the range of 5.5-8.0, the beverage comprising
 a total amount of protein of 1 to 20% w/w relative to the weight of the beverage, wherein at least 85% w/w of the protein is beta-lactoglobulin (BLG),
 optionally, sweetener and/or flavour.

Another aspect of the invention pertains to a method of producing a packaged, heat-treated beverage preparation having a pH in the range of 5.5-8.0, comprising the following steps:

a) Providing a liquid solution comprising:
   a total amount of protein of 1 to 20% by weight, wherein at least 85% of the protein is beta-lactoglobulin (BLG)
   optionally, sweetener and/or flavour
b) packaging the liquid solution,
wherein the liquid solution of step a) and/or the packaged liquid solution of step b) is subjected to a heat treatment comprising at least pasteurisation.

Yet another aspect of the invention pertains to the use of a protein solution comprising a total amount of protein of 1 to 20% w/w relative to the weight of the solution, wherein at least 85 w/w % of the protein is beta-lactoglobulin (BLG) for controlling the whiteness of a sterile beverage preparation having a pH in the range of 5.5-8.0.

Still another aspect of the invention pertains to the packaged heat-treated beverage preparation as defined herein, for use in a method for the treatment of diseases associated with protein deficiency.

A further aspect of the invention pertains to the use of the packaged heat-treated beverage preparation as defined herein as a dietary supplement.

DETAILED DESCRIPTION

Definitions

Figure 1:
FIG. 1 shows an image of a milky BLG sample, heated at 94° C. for 14 minutes at pH 6.0.

In the context of the present invention, the term "beta-lactoglobulin" or "BLG" pertains to beta-lactoglobulin from mammal species, e.g. in native, unfolded and/or glycosylated forms and includes the naturally occurring genetic variants. The term furthermore includes aggregated BLG, precipitated BLG and crystalline BLG. When referring to the amount of BLG reference is made to the total amount of BLG including aggregated BLG. The total amount of BLG is determined according to Example 1.31. The term "aggregated BLG" pertains to BLG which is at least partially unfolded and which furthermore has aggregated with other denatured BLG molecules and/or other denatured whey proteins, typically by means of hydrophobic interactions and/or covalent bonds.

BLG is the most predominant protein in bovine whey and milk serum and exists in several genetic variants, the main ones in cow milk being labelled A and B. BLG is a lipocalin protein, and can bind many hydrophobic molecules, suggesting a role in their transport. BLG has also been shown to be able to bind iron via siderophores and might have a role in combating pathogens. A homologue of BLG is lacking in human breast milk.

Bovine BLG is a relatively small protein of approx. 162 amino acid residues with a molecular weight of approx. 18.3-18.4 kDa. Under physiological conditions, it is predominantly dimeric, but dissociates to a monomer below about pH 3, preserving its native state as determined using Nuclear Magnetic Resonance spectroscopy. Conversely, BLG also occurs in tetrameric, octameric and other multimeric aggregation forms under a variety of natural conditions.

In the context of the present invention, the term "non-aggregated beta-lactoglobulin" or "non-aggregated BLG" also pertains to beta-lactoglobulin from mammal species, e.g. in native, unfolded and/or glycosylated forms and includes the naturally occurring genetic variants. However, the term does not include aggregated BLG, precipitated BLG or crystallised BLG. The amount or concentration of non-aggretated BLG is determined according to Example 1.6.

The percentage of non-aggregated BLG relative to total BLG is determined by calculate $(m_{total\ BLG} - m_{non-aggregate\ BLG})/m_{total\ BLG} * 100\%$. $m_{total\ BLG}$ is the concentration or amount of BLG determined according to Example 1.31 and $m_{non-aggregated\ BLG}$ is the concentration or amount of non-aggregated BLG determined according to Example 1.6.

In the context of the present invention, the term "crystal" pertains to a solid material whose constituents (such as atoms, molecules or ions) are arranged in a highly ordered microscopic structure, forming a crystal lattice that extends in all directions.

In the context of the present invention, the term "BLG crystal" pertains to protein crystals that primarily contain non-aggregated and preferably native BLG arranged in a highly ordered microscopic structure, forming a crystal lattice that extends in all directions. The BLG crystals may e.g. be monolithic or polycrystalline and may e.g. be intact crystals, fragments of crystals, or a combination thereof. Fragments of crystal are e.g. formed when intact crystals are subjected to mechanical shear during processing. Fragments of crystals also have the highly ordered microscopic structure of crystal but may lack the even surface and/or even edges or corners of an intact crystal. See e.g. FIG. 18 of PCT application no. PCT/EP2017/084553 for an example of many intact BLG crystals and FIG. 13 PCT application no. PCT/EP2017/084553 for an example of fragments of BLG crystals. In both cases, the BLG crystal or crystal fragments can be identified visually as well-defined, compact and coherent structures using light microscopy. BLG crystal or crystal fragments are often at least partially transparent. Protein crystals are furthermore known to be birefringent and this optical property can be used to identify unknown particles having a crystal structure. Non-crystalline BLG aggregates, on the other hand, often appear as poorly defined, non-transparent, and as open or porous lumps of irregular size.

In the context of the present invention, the term "crystallise" pertains to the formation of protein crystals. Crystallisation may e.g. happen spontaneously or be initiated by the addition of crystallisation seeds.

In the context of the present invention, the term "edible composition" pertains to a composition that is safe for human consumption and use as a food ingredient and that does not contain problematic amounts of toxic components, such as toluene or other unwanted organic solvents.

In the context of the present invention, the term "ALA" or "alpha-lactalbumin" pertains to alpha-lactalbumin from mammal species, e.g. in native and/or glycosylated forms and includes the naturally occurring genetic variants. The term furthermore includes aggregated ALA and precipitated BLG. When referring to the amount of ALA reference is made to the total amount of ALA including e.g. aggregated ALA. The total amount of ALA is determined according to Example 1.31. The term "aggregated ALA" pertains to ALA which typically is at least partially unfolded and which furthermore has aggregated with other denatured ALA molecules and/or other denatured whey proteins, typically by means of hydrophobic interactions and/or covalent bonds.

Alpha-lactalbumin (ALA) is a protein present in the milk of almost all mammalian species. ALA forms the regulatory subunit of the lactose synthase (LS) heterodimer and β-1, 4-galactosyltransferase (beta4Gal-T1) forms the catalytic component. Together, these proteins enable LS to produce lactose by transferring galactose moieties to glucose. One of the main structural differences with beta-lactoglobulin is that ALA does not have any free thiol group that can serve as the starting-point for a covalent aggregation reaction.

In the context of the present invention, the term "non-aggregated ALA" also pertains to ALA from mammal species, e.g. in native, unfolded and/or glycosylated forms and includes the naturally occurring genetic variants. However, the term does not include aggregated ALA or precipitated ALA. The amount or concentration of non-aggretated BLG is determined according to Example 1.6.

The percentage of non-aggregated ALA relative to total ALA is determined by calculate ($m_{total\ ALA} - m_{non-aggregate\ ALA})/m_{total\ ALA}*100\%$. $m_{total\ ALA}$ is the concentration or amount of ALA determined according to Example 1.31 and $m_{non-aggregated\ ALA}$ is the concentration or amount of non-aggregated ALA determined according to Example 1.6.

In the context of the present invention, the term "caseinomacropeptide" or "CMP" pertains to the hydrophilic peptide, residue 106-169, originated from the hydrolysis of "κ-CN" or "kappacasein" from mammal species, e.g. in native and/or glycosylated forms and includes the naturally occurring genetic variants, by an aspartic proteinase, e.g. chymosin.

In the context of the present invention, the term "BLG isolate" means a composition that contains BLG in an amount of at least 85% w/w relative to total protein. A BLG isolate preferably has a total protein content of a least 30% w/w, and preferably at least 80% w/w relative to total solids.

In the context of the present invention, the term "BLG isolate powder" pertains to a BLG isolate in powder form and preferably a free-flowing powder.

In the context of the present invention, the term "BLG isolate liquid" pertains to a BLG isolate in liquid form and preferably an aqueous liquid.

The term "whey" pertains to the liquid phase that is left after the casein of milk has been precipitated and removed. Casein precipitation may e.g. be accomplished by acidification of milk and/or by use of rennet enzyme. Several types of whey exist, such as "sweet whey", which is the whey product produced by rennet-based precipitation of casein, and "acid whey" or "sour whey", which is the whey product produced by acid-based precipitation of casein. Acid-based precipitation of casein may e.g. be accomplished by addition of food acids or by means of bacterial cultures.

The term "milk serum" pertains to the liquid which remains when casein and milk fat globules have been removed from milk, e.g. by microfiltration or large pore ultrafiltration. Milk serum may also be referred to as "ideal whey".

The term "milk serum protein" or "serum protein" pertains to the protein which is present in the milk serum.

In the context of the present invention, the term "whey protein" pertains to protein that is found in whey or in milk serum. Whey protein may be a subset of the protein species found in whey or milk serum, and even a single whey protein species or it may be the complete set of protein species found in whey or/and in milk serum.

In the context of the present invention, the main non-BLG proteins of a standard whey protein concentrate from sweet whey are ALA, CMP, bovine serum albumin, immunoglobulin, osteopontin, lactoferrin, and lactoperoxidase. In the context of the present invention, the weight percentages of the main non-BLG whey proteins of a standard whey protein concentrate from sweet whey are:

ALA in an amount of 18% w/w relative to total protein,
CMP in an amount of 18% w/w relative to total protein,
BSA in an amount of 4% w/w relative to total protein,
Casein species in an amount of 5% w/w relative to total protein,
Immunoglobulin in an amount of 6% w/w relative to total protein,
Osteopontin in an amount of 0.5% w/w relative to total protein,
Lactoferrin in an amount of 0.1% w/w relative to total protein, and
Lactoperoxidase in an amount of 0.1% w/w relative to total protein.

The term casein pertains to casein protein found in milk and encompasses both native micellar casein as found in raw milk, the individual casein species, and caseinates.

In the context of the present invention the term "mother liquor" pertains to the whey protein solution that remains after BLG has been crystallised and the BLG crystals have be at least partially removed. The mother liquor may still contain some BLG crystals but normally only small BLG crystals that have escaped the separation.

In the context of the present invention, a liquid which is "supersaturated" or "supersaturated with respect to BLG" contains a concentration of dissolved, non-aggregated BLG which is above the saturation point of non-aggregated BLG in that liquid at the given physical and chemical conditions. The term "supersaturated" is well-known in the field of crystallisation (see e.g. Gerard Coquerela, "Crystallization of molecular systems from solution: phase diagrams, supersaturation and other basic concepts", Chemical Society Reviews, p. 2286-2300, Issue 7, 2014) and supersaturation can be determined by a number of different measurement techniques (e.g. by spectroscopy or particle size analysis). In the context of the present invention, supersaturation with respect to BLG is determined by the following procedure.

Procedure for Testing Whether a Liquid at a Specific Set of Conditions is Supersaturated with Respect to BLG:

a) Transfer a 50 ml sample of the liquid to be tested to a centrifuge tube (VWR Catalogue no. 525-0402) having a height of 115 mm, an inside diameter of 25 mm and a capacity of 50 mL. Care should be taken to keep the sample and subsequent fractions thereof at the original physical and chemical conditions of the liquid during steps a)-h).

b) The sample is immediately centrifuged at 3000 g for 3.0 minutes with max. 30 seconds acceleration and max 30 seconds deceleration.

c) Immediately after the centrifugation, transfer as much as possible of the supernatant (without disturbing the pellet if a pellet has formed) to a second centrifuge tube (same type as in step a)

d) Take a 0.05 mL subsample of the supernatant (subsample A)

e) Add 10 mg of BLG crystals (at least 98% pure, non-aggregated BLG relative to total solids) having a particle size of at most 200 micron to a second centrifuge tube and agitate the mixture.

f) Allow the second centrifuge tube to stand for 60 minutes at the original temperature.

g) Immediately after step f), centrifuge the second centrifuge tube at 500 g for 10 minutes and then take another 0.05 mL subsample of the supernatant (subsample B).

h) Recover the centrifugation pellet of step g) if there is one, resuspend it in milliQ water and immediately inspect the suspension for presence of crystals that are visible by microscopy.

i) Determine the concentration of non-aggregated BLG in subsamples A and B using the method outlined in Example 1.6—the results are expressed as % BLG w/w relative to the total weight of the subsamples. The concentration of non-aggregated BLG of subsample A is referred to as $c_{BLG,\ A}$, and the concentration of non-aggregated BLG of subsample B is referred to as $c_{BLG,\ B}$.

j) The liquid from which the sample of step a) was taken was supersaturated (at the specific conditions) if $c_{BLG,\ B}$ is lower than $c_{BLG,\ A}$ and if crystals are observed in step i).

In the context of the present invention, the terms "liquid" and "solution" encompass both compositions that are free of particulate matter and compositions that contain a combination of liquid and solid and/or semi-solid particles, such as e.g. protein crystals or other protein particles. A "liquid" or a "solution" may therefore be a suspension or even a slurry. However, a "liquid" and "solution" are preferably pumpable.

In the context of the present invention, the terms "whey protein concentrate" (WPC) and "serum protein concentrate" (SPC) pertain to dry or aqueous compositions which contain a total amount of protein of 20-89% w/w relative to total solids.

A WPC or an SPC preferably contains:
20-89% w/w protein relative to total solids,
15-70% w/w BLG relative to total protein,
8-50% w/w ALA relative to total protein, and
0-40% w/w CMP relative to protein.

Alternatively, but also preferred, a WPC or an SPC may contain:
20-89% w/w protein relative to total solids,
15-90% w/w BLG relative to total protein,
4-50% w/w ALA relative to total protein, and
0-40% w/w CMP relative to protein.

Preferably, a WPC or an SPC contains:
20-89% w/w protein relative to total solids,
15-80% w/w BLG relative to total protein,
4-50% w/w ALA relative to total protein, and
0-40% w/w CMP relative to protein.

More preferably a WPC or an SPC contains:
70-89% w/w protein relative to total solids,
30-90% w/w BLG relative to total protein,
4-35% w/w ALA relative to total protein, and
0-25% w/w CMP relative to protein.

SPC typically contain no CMP or only traces of CMP.

The terms "whey protein isolate" (WPI) and "serum protein isolate" (SPI) pertain to dry or aqueous compositions which contain a total amount of protein of 90-100% w/w relative to total solids.

A WPI or an SPI preferably contains:
90-100% w/w protein relative to total solids,
15-70% w/w BLG relative to total protein,
8-50% w/w ALA relative to total protein, and
0-40% w/w CMP relative to total protein.

Alternatively, but also preferred, a WPI or an SPI may contain:
90-100% w/w protein relative to total solids,
30-95% w/w BLG relative to total protein,
4-35% w/w ALA relative to total protein, and
0-25% w/w CMP relative to total protein.

More preferably a WPI or an SPI may contain:
90-100% w/w protein relative to total solids,
30-90% w/w BLG relative to total protein,
4-35% w/w ALA relative to total protein, and
0-25% w/w CMP relative to total protein.

SPI typically contain no CMP or only traces of CMP.

In the context of the present invention, the term "additional protein" means a protein that is not BLG. The additional protein that is present in the whey protein solution typically comprises one or more of the non-BLG proteins that are found in milk serum or whey. Non-limiting examples of such proteins are alpha-lactalbumin, bovine serum albumin, immunoglobulines, caseinomacropeptide (CMP), osteopontin, lactoferrin, and milk fat globule membrane proteins.

The terms "consists essentially of" and "consisting essentially of" mean that the claim or feature in question encompasses the specified materials or steps and those that do not materially affect the basic and novel characteristic(s) of the claimed invention.

In the context of the present invention, the phrase "Y and/or X" means "Y" or "X" or "Y and X". Along the same line of logic, the phrase "$n_1$, $n_2$, . . . , $n_{i-1}$, and/or $n_i$" means "$n_1$" or "$n_2$" or . . . or "$n_{i-1}$" or "$n_i$" or any combination of the components: $n_1$, $n_2$, . . . $n_{i-1}$, and $n_i$.

In the context of the present invention, the term "dry" or "dried" means that the composition or product in question comprises at most 10% w/w water, preferably at most 6% w/w and more preferably even less.

In the context of the present invention, the term "physical microbial reduction" pertains to physical interaction with a composition which results in reduction of the total amount of viable microorganisms of the composition. The term does not encompass addition of chemicals that result in killing of microorganisms. The term furthermore does not encompass the heat exposure to which the atomized droplets of liquid are exposed to during spray-drying but include possible pre-heating prior to spray-drying.

In the context of the present invention, the pH of a powder refers to the pH of 10 g of the powder mixed into 90 g demineralised water and is measured according to Example 1.16.

In the context of the present invention, the weight percentage (% w/w) of a component of a certain composition, product, or material means the weight percentage of that component relative to the weight of the specific composition, product, or material unless another reference (e.g total solids or total protein) is specifically mentioned.

In the context of the present invention, the process step "concentration" and the verb "concentrate" pertain to concentration of protein and encompass both concentration of protein on total solids basis and concentration of protein on a total weight basis. This means e.g. that concentration does not necessarily require that the absolute concentration w/w of protein of a composition increases as long at the content of protein increases relative to total solids.

In the context of the present invention, the term "weight ratio" between component X and component Y means the value obtained by the calculation mx/my wherein mx is the amount (weight) of components X and my is the amount (weight) of components Y.

In the context of the present invention, the term "at least pasteurisation" pertains to a heat-treatment which has microbial killing effect equal to or higher than a heat-treatment of 70 degrees C. for 10 seconds. The reference for determining the bacteria killing effect is *E. coli* O157:H7.

In the context of the present invention, the term "whey protein feed" pertains to whey protein source from which the liquid BLG isolate is derived. The whey protein feed has a lower content of BLG relative to total protein than the liquid BLG isolate and is typically a WPC, a WPI, an SPC or an SPI.

In the context of the present invention, the term "BLG-enriched composition" pertains to the BLG-enriched composition resulting from isolating BLG from the whey protein feed. The BLG-enriched composition typically comprises the same whey proteins as the whey protein feed but BLG is present in significantly higher concentration relative to total protein than in whey protein feed. The BLG-enriched composition may e.g. be prepared from the whey protein feed by chromatography, protein crystallisation and/or membrane-based protein fractionation. The BLG-enriched composition comprises BLG in an amount of at least 85% w/w relative to total protein, and preferably at least 90% w/w. In some cases the BLG-enriched composition can be used directly as the liquid BLG isolate. However, often additional processing is required to convert the BLG-enriched composition to the liquid BLG isolate.

In the context of the present invention, the term "whey protein solution" is used to describe the special aqueous whey protein composition that is supersaturated with respect to BLG in salting-in mode and useful for preparing BLG crystals.

In the context of the present invention, the term "sterile" means that the sterile composition or product in question does not contain any viable microorganisms and therefore is devoid of microbial growth during storage at room temperature. A composition that has been sterilised is sterile.

When a liquid, such as a beverage preparation, is sterilized and packaged aseptically in a sterile container it typically has a shelf life of at least six months at room temperature. The sterilization treatment kills spores and microorganisms that could cause spoilage of the liquid.

In the context of the present invention the term "energy content" means the total content of energy contained in a food product. The energy content can be measured in kilojoule (kJ) or kilo calories (kcal) and are referred to as calories per amount of food product, e.g. kcal per 100 gram of the food product. One example is a beverage having an energy content of 350 kcal/100 gram of the beverage.

The total energy content of a food product includes the energy contribution from all the macronutrients present in the food product, e.g. energy from protein, lipid and carbohydrate. The distribution of energy from the macronutrients in the food product can be calculated based on the amount of the macronutrients in the food product and the contribution of the macronutrient to the total energy content of the food product. The energy distribution can be stated as energy percent (E %) of the total energy content of the food product. For example for a beverage comprising 20 E % protein, 50 E % carbohydrate and 30 E % lipid, this means that 20% of the total energy comes from protein, 50% of the total energy comes from carbohydrate and 30% of the total energy comes from fat (lipid).

In the context of the present invention the term "nutritionally complete nutritional supplement" is understood as a food product comprising protein, lipid and carbohydrate and further comprising vitamins, minerals and trace elements, where the beverage has a nutrient profile matching a complete and healthy diet.

In the context of the present invention the term "nutritionally incomplete supplement" means food products comprising one or more macro nutrients and optionally further comprising vitamins, minerals and trace elements. A nutritionally incomplete beverage may comprise protein as the only nutrient or may for example comprise protein and a carbohydrate.

The term "food for special medical purposes (FSMP)" or "medical food" are food products for oral ingestion or tube feeding, which are used for specific medical disorders, diseases or conditions for which there are distinctive nutritional requirements and which are used under medical supervision. A medical food can be a nutritionally complete supplement/beverage or an nutritionally incomplete supplement/beverage.

The term "nutrient" means a substance used by an organism to survive, grow and reproduce. Nutrients can be either macronutrients or micronutrients. Macronutrients are nutrients that provide energy when consumed e.g. protein, lipid and carbohydrate. Micronutrients are nutrients like vitamins, minerals and trace elements.

The term "nutrient" means a substance used by an organism to survive, grow and reproduce. Nutrients can be either macronutrients or micronutrients. Macronutrients are nutrient that provide energy when consumed e.g. protein, lipid and carbohydrate. Micronutrients are nutrients are vitamins, minerals and trace elements.

By the term "instant beverage powder" or "instant beverage powder product" is meant a powder which can be converted to a liquid beverage by addition of a liquid, such as water.

In the context of the present invention the terms "beverage preparation" and "preparation" used as a substantive relate to any water-based liquid which can be ingested as a drink, e.g. by pouring, sipping or tube-feeding.

In the context of the present invention the term "protein fraction" relates to proteins of the composition in question e.g. the proteins of a powder or a beverage preparation.

In the context of the present invention the term "astringency" relates to a mouthfeeling. Astringency feels like a contraction of cheek muscles and results in increased saliva production. Thus, astringency is not a taste as such, but a physical mouth feeling and time-dependent feeling in the mouth.

In the context of the present invention the term "drying mouthfeeling" relates to a feeling in the mouth, it feels like a drying of the mouth and teeth and results in minimization of the saliva production.

Thus drying mouthfeeling is not a taste as such, but a physical mouth feeling and time-dependent feeling in the mouth.

In the context of the present invention the term "minerals" as used herein, unless otherwise specified, refers to any one of major minerals, trace or minor minerals, other minerals, and combinations thereof. Major minerals include calcium, phosphorus, potassium, sulfur, sodium, chlorine, magnesium. Trace or minor minerals include iron, cobalt, copper, zinc, molybdenum, iodine, selenium, manganese and other minerals include chromium, fluorine, boron, lithium, and strontium.

In the context of the present invention the terms "lipid", "fat", and "oil" as used herein unless otherwise specified, are used interchangeably to refer to lipid materials derived or processed from plants or animals. These terms also include synthetic lipid materials so long as such synthetic materials are suitable for human consumption.

In the context of the present invention the term "transparent" encompasses a beverage preparation having a visibly clear appearance and which allows light to pass and through which distinct images appear. A transparent beverage has a turbidity of at most 200 NTU.

In the context of the present invention the terms "opaque" encompasses a beverage preparation having a visibly unclear appearance and it has a turbidity of more than 200 NTU.

An aspect of the invention pertains to a packaged, heat-treated beverage preparation having a pH in the range of 5.5-8.0, the beverage comprising
  a total amount of protein of 1 to 20% w/w relative to the weight of the beverage, wherein at least 85% w/w of the protein is beta-lactoglobulin (BLG),
  optionally, sweetener and/or flavour.

An advantage of the invention is that drinkable beverages can be produced having a neutral pH and a low viscosity.

It is very beneficial for a number of reasons that at least 85% w/w of the protein of the packaged, heat-treated beverage preparation is BLG.

An advantage is that the packaged, heat-treated beverage preparation according to the invention is more stable and less coloured compared to similar WPI beverages.

This is obtained by the packaged, heat-treated beverage preparation of the invention. It was thus surprisingly found that the packaged, heat-treated beverage was less coloured even when a high protein concentration is applied as compared to a heat-treated pH neutral WPI beverage which has a more yellowish colour.

It is thus an advantage that due to the inventive composition of the packaged heat-treated beverage of the invention, no bleaching or additional whitening are needed in order to remove or reduce a yellow colour.

In some preferred embodiments of the packaged, heat-treated beverage preparation of the invention, at least 85% w/w of the protein is BLG. Preferably, at least 88% w/w of the protein is BLG, more preferably at least 90% w/w, even more preferably at least 91% w/w, and most preferably at least 92% w/w of the protein is BLG.

Even higher relative amounts of BLG are both feasible and desirable thus in some preferred embodiments of the invention at least 94% w/w of the protein of the packaged, heat-treated beverage preparation is BLG, more preferably at least 96% w/w of the protein is BLG, even more preferably at least 98% w/w of the protein is BLG, and most preferably approx. 100% w/w of the protein is BLG.

For example, the packaged, heat-treated beverage preparation preferably comprises BLG in an amount of at least 97.5% w/w relative to total protein, preferably at least 98.0% w/w, more preferably at least 98.5% w/w, even more preferably at least 99.0%, and most preferably BLG in an amount of at least 99.5% w/w relative to total protein, such as approx. 100.0% w/w relative to total protein.

The protein of the packaged, heat-treated beverage preparation is preferably prepared from mammal milk, and preferably from ruminant milk such as e.g. milk from cow, sheep, goat, buffalo, camel, llama, horse and/or deer. Protein derived from bovine milk is particularly preferred. The protein of the packaged, heat-treated beverage preparation is therefore preferably bovine milk protein.

The protein of the packaged, heat-treated beverage preparation is preferably whey protein or milk serum protein and even more preferably bovine whey protein or milk serum protein.

In some preferred embodiments of the invention, the packaged, heat-treated beverage preparation is at least pasteurised.

In some preferred embodiments of the invention, the packaged heat-treated beverage preparation is sterile.

The visual appearance of the beverage preparation is of importance to the consumer both with respect to transparent and opaque beverages. Particularly for clear, water-like beverages, or white, milky beverages, inventors have found it advantageous to be able to control the colour of the beverage—or rather to control the lack of colour of the beverage.

However, even if dedicated colouring agents are added during the production of the beverage, the inventors have found it advantageous to be able to avoid additional sources of colour to avoid unwanted variation or changes in the visual appearance of the beverage. The present inventors have found that the high BLG protein profile described herein is more colour neutral/colourless than conventional WPI and contributes with less colour variation than conventional WPI. Conventional WPI has a yellowish appearance which may be diminished to some extend by addition of an oxidizing agent such as bleach. However, addition of oxidising agents is often not desirable, and with the present invention it is not even necessary anymore.

The CIELAB colour scale as described in example 1.9 is used to determine the colour of a beverage. As an example, a positive delta b*value indicates a colour that is more yellow than demineralised water whereas a negative delta b*value indicates a beverage that is more blue than demineralised water. It is therefore often preferred by the consumer that the colour delta b*value should be close to 0, in order to have a beverage that is neither yellow nor blue.

In some preferred embodiments of the present invention, the packaged, heat-treated beverage preparation has a colour value delta b* in the range of −0.10 to +0.51 at the CIELAB colour scale, particularly if the preparation has a turbidity of at most 200 NTU, and more preferably at most 40 NTU.

In other preferred embodiments of the invention, the packaged heat-treated beverage preparation has a colour value delta b* in the range of 0.0 to 0.40 at the CIELAB colour scale, preferably in the range of +0.10 to +0.25.

For opaque beverage preparations, e.g. having a turbidity above 200 NTU and preferably above 1000 NTU, the packaged, heat-treated beverage preparation preferably has a colour value delta b* at the CIELAB colour scale, in the range of −6 to −1.7; preferably in the range of −5.0 to −2.0.

In some preferred embodiments of the invention, the protein fraction of the packaged heat-treated beverage preparation has a colour value delta b* in the range of −0.10 to +0.51 at the CIELAB colour scale, particularly if the preparation has a turbidity of at most 200 NTU, and more preferably at most 40 NTU.

These beverages have a less yellow colour compared to a beverage comprising WPI which had a higher delta b* value and a more yellow colour.

In some other preferred embodiments of the invention, the protein fraction of the packaged heat-treated beverage preparation has a colour value delta b* in the range of 0.0 to 0.40 at the CIELAB colour scale, preferably in the range of +0.10 to +0.25.

The a*-value represents the green-red component, with green in the negative direction and red in the positive direction. It is often preferred that the colour delta a*value should be around zero in order to have a beverage that is not red nor green.

It is typically preferred that the protein fraction of the packaged heat-treated beverage preparation has a delta a* in the range of −0.2 to 0.2 at the CIELAB colour scale, particularly if the preparation has a turbidity of at most 200 NTU, and more preferably at most 40 NTU. Preferably, the packaged, heat-treated beverage preparation has a colour value delta a* in the range of −0.15 to 0.15 at the CIELAB colour scale, preferably in the range of −0.10 to 0.10.

The present inventors have found that it can be advantageous to control the mineral content to reach some of the desired properties of the packaged heat-treated beverage preparation.

The present inventors have surprisingly found that when a BLG isolate is used as defined herein beverage preparations having a high mineral concentration can be produced, without compromising the viscosity and avoiding gelling (see e.g. Example 2). This provides the possibility that packaged heat-treated beverage preparations can be produced having a high mineral content, and that beverages that are nutritionally complete nutritional supplements or nutritionally incomplete supplements can be produced.

In some embodiments of the invention, the packaged heat-treated beverage preparation comprises a plurality of minerals. In one exemplary embodiment, the packaged heat-treated beverage preparation comprises at least four minerals. In one embodiment, the four minerals are sodium, potassium, magnesium and calcium.

In some preferred embodiments of the invention, the sum of the amounts of Na, K, Mg and Ca is within the range of 0 to 400 mM in the packaged, heat-treated beverage preparation, preferably within the range of 10-200 mM or preferably within the range of 20-100 mM.

In other preferred embodiments of the invention, the sum of the amounts of Na, K, Mg and Ca is in the range of 0 to 100 mM in the packaged, heat-treated beverage preparation, more preferably in the range of 5-50 mM, and even more preferably in the range of 10-35 mM.

In some preferred embodiments of the invention, the sum of the amounts of Na, K, Mg and Ca is at most 400 mM in the packaged, heat-treated beverage preparation.

In other preferred embodiments of the invention, the sum of the amounts of Na, K, Mg and Ca is at most 300 mM in the packaged, heat-treated beverage preparation, preferably at most 200 mM, or preferably at most 100 mM, or preferably at most 80 mM or preferably at most 60 mM or preferably at most 40 mM or preferably at most 30 mM or preferably at most 20 mM or preferably at most 20 mM or preferably at most 10 mM or preferably at most 5 mM or preferably at most 1 mM.

In some preferred embodiments of the invention, the sum of the amounts of Mg and Ca is at most 75 mM in the packaged, heat-treated beverage preparation, more preferably at most 40 mM in the packaged, heat-treated beverage preparation, more preferably at most 20 mM in the packaged, heat-treated beverage preparation.

In other preferred embodiments of the invention, the sum of the amounts of Mg and Ca is at most 10 mM in the packaged, heat-treated beverage preparation, more preferably at most 8.0 mM in the packaged, heat-treated beverage preparation, more preferably at most 6.0 mM in the packaged, heat-treated beverage preparation, even more preferably at most 4.0 mM in the packaged, heat-treated beverage preparation and most preferably at most 2.0 mM in the packaged, heat-treated beverage preparation.

In another exemplary embodiment of the invention, the packaged heat-treated beverage preparation comprises a plurality of minerals selected from the group consisting of: Calcium, Iodine, Zinc, Copper, Chromium, Iron, Phosphorus, Magnesium, Selenium, Manganese, Molybdenum, Sodium, Potassium, and combinations thereof.

In other preferred embodiments of the invention, the heat-treated beverage preparation is a low mineral beverage.

In the context of the present invention, the term "low mineral" pertains to a composition, e.g. a liquid, beverage, a powder or another food product, that has at least one, preferably two, and even more preferably all, of the following:
  an ash content of at most 1.2% w/w transparent relative to total solids,
  a total content of calcium and magnesium of at most 0.3% w/w relative to total solids,
  a total content of sodium and potassium of at most 0.10% w/w relative to total solids,
  a total content of phosphorus of at most 100 mg phosphorus per 100 g protein.

Preferably, a low mineral composition has at least one, preferably two or more, and even more preferably all, of the following:
  an ash content of at most 0.7% w/w relative to total solids,
  a total content of calcium and magnesium of at most 0.2% w/w relative to total solids,
  a total content of sodium and potassium of at most 0.08% w/w relative to total solids,
  a total content of phosphorus of at most 80 mg phosphorus per 100 g protein.

Even more preferably, a low mineral composition has at least one, preferably two or more, and even more preferably all, of the following:
  an ash content of at most 0.5% w/w relative to total solids,
  a total content of calcium and magnesium of at most 0.15% w/w relative to total solids,
  a total content of sodium and potassium of at most 0.06% w/w relative to total solids,
  a total content of phosphorus of at most 50 mg phosphorus per 100 g protein.

It is particularly preferred that a low mineral composition has the following:
  an ash content of at most 0.5% w/w relative to total solids,
  a total content of calcium and magnesium of at most 0.15% w/w relative to total solids,
  a total content of sodium and potassium of at most 0.06% w/w relative to total solids, a total content of phosphorus of at most 50 mg phosphorus per 100 g protein.

In another exemplary embodiment of the invention, the packaged heat-treated beverage preparation comprises a plurality of minerals selected from the group consisting of: Calcium, Iodine, Zinc, Copper, Chromium, Iron, Phosphorus, Magnesium, Selenium, Manganese, Molybdenum, Sodium, Potassium, and combinations thereof.

The present inventors have found that the present invention makes it possible to prepare a packaged heat-treated beverage preparation having a very low content of phosphorus and other minerals such as Potassium, which is advantageous for patients suffering from kidney diseases or otherwise having a reduced kidney function.

The packaged heat-treated beverage preparation is preferably a low phosphorus beverage preparation.

The packaged heat-treated beverage preparation is preferably a low Potassium beverage preparation.

The packaged heat-treated beverage preparation is preferably a low phosphorus and a low Potassium beverage preparation In the context of the present invention, the term "low phosphorus" pertains to a composition, e.g. a liquid, a powder or another food product, that has a total content of phosphorus of at most 100 mg phosphorus per 100 g protein. Preferably, a low phosphorus composition has a total content of at most 80 mg phosphorus per 100 g protein. More preferably, a low phosphorus composition may have a total content of at most 50 mg phosphorus per 100 g protein. Even more preferably, a low phosphorus composition may have a total content of phosphorus of at most 20 mg phosphorus per 100 g protein. Even more preferably, a low phosphorus composition may have a total content of phosphorus of at most 5 mg phosphorus per 100 g protein. Low phosphorus compositions according to the present invention may be used as a food ingredient for the production of a food product for patients groups that have a reduced kidney function.

Thus, in some particularly preferred embodiments of the invention, the packaged heat-treated beverage preparation comprises at most 80 mg phosphorus per 100 g protein. Preferably, the packaged heat-treated beverage preparation comprises at most 30 mg phosphorus per 100 g protein. More preferably, the packaged heat-treated beverage preparation comprises at most 20 mg phosphorus per 100 g protein. Even more preferably, the packaged heat-treated beverage preparation comprises at most 10 mg phosphorus per 100 g protein. Most preferably, the packaged heat-treated beverage preparation comprises at most 5 mg phosphorus per 100 g protein.

The content of phosphorus relates to the total amount of elemental phosphorus of the composition in question and is determined according to Example 1.19.

In the context of the present invention, the term "low potassium" pertains to a composition, e.g. a liquid, a powder or another food product, that has a total content of potassium of at most 700 mg potassium per 100 g protein. Preferably, a low potassium composition has a total content of at most 600 mg potassium per 100 g protein. More preferably, a low potassium composition may have a total content of at most 500 mg potassium per 100 g protein. More preferably, a low potassium composition may have a total content of potassium of at most 400 mg potassium per 100 g protein. More preferably, a low potassium composition may have a total content of potassium of at most 300 mg potassium per 100 g protein. Even more preferably, a low potassium composition may have a total content of potassium of at most 200 mg potassium per 100 g protein. Even more preferably, a low potassium composition may have a total content of potassium of at most 100 mg potassium per 100 g protein. Even more preferably, a low potassium composition may have a total content of potassium of at most 50 mg potassium per 100 g protein and even more preferably, a low potassium composition may have a total content of potassium of at most 10 mg potassium per 100 g protein Low potassium compositions according to the present invention may be used as a food ingredient for the production of a food product for patients groups that have a reduced kidney function.

Thus, in some particularly preferred embodiments of the invention, the packaged heat-treated beverage preparation comprises at most 600 mg potassium per 100 g protein. More preferably, the packaged heat-treated beverage preparation comprise at most 500 mg potassium per 100 g protein. More preferably, the packaged heat-treated beverage preparation comprises at most 400 mg potassium per 100 g protein. More preferably, the packaged heat-treated beverage preparation comprises at most 300 mg potassium per 100 g protein. Even more preferably, the packaged heat-treated beverage preparation comprises at most 200 mg potassium per 100 g protein. Even more preferably, the packaged heat-treated beverage preparation comprises at most 100 mg potassium per 100 g protein. Even more preferably, the packaged heat-treated beverage preparation comprises at most 50 mg potassium per 100 g protein and even more preferably, the packaged heat-treated beverage preparation comprises at most 10 mg potassium per 100 g protein The content of potassium relates to the total amount of elemental potassium of the composition in question and is determined according to Example 1.19.

In some preferred embodiments of the invention, the packaged, heat-treated beverage preparation comprises at most 100 mg phosphorus/100 g protein and at most 700 mg potassium/100 g protein, preferably at most 80 mg phosphorus/100 g protein and at most 600 mg potassium/100 g protein, more preferably at most 60 mg phosphorus/100 g protein and at most 500 mg potassium/100 g protein, more preferably at most 50 mg phosphorus/100 g protein and at most 400 mg potassium/100 g protein, or more preferably at most 20 mg phosphorus/100 g protein and at most 200 mg potassium/100 g protein, or even more preferably at most 10 mg phosphorus/100 g protein and at most 50 mg potassium/ 100 g protein. In some preferred embodiments of the invention, the packaged, heat-treated beverage preparation comprises at most 100 mg phosphor/100 g protein and at most 340 mg potassium/100 g protein.

The heat-treated beverage preparation comprising low amounts of phosphorus and potassium may advantageously be supplemented with carbohydrates and lipids, the heat-treated beverage preparation preferably furthermore comprises a total amount of carbohydrates in a range between 30-60% of the total energy content of the beverage, preferably in a range between 35-50 E % and a total amount of lipid in the range of 20-60% of the total energy content, preferably in a range between 30-50 E %.

In one embodiment of the invention, the packaged heat-treated beverage preparation comprises a plurality of vitamins. In one exemplary embodiment, the packaged heat-treated beverage preparation comprises at least ten vitamins. In one exemplary embodiment, the substantially clear liquid nutritional composition comprises a plurality of vitamins selected from the group consisting of: Vitamin A, vitamin B1, vitamin B2, vitamin B3, vitamin B5, vitamin B6, vitamin B7, vitamin B9, vitamin B12, vitamin C, vitamin D, vitamin K, Riboflavin, pantothenic Acid, vitamin E, thiamin, niacin, folic acid, biotin, and combinations thereof.

In one embodiment of the invention, the packaged heat-treated beverage comprises a plurality of vitamins and a plurality of minerals.

In some embodiments of the invention, the packaged, heat-treated beverage preparation contains one or more food acids selected from the group consisting of citric acid, malic acid, tartaric acid, acetic acid, benzoic acid, butyric acid, lactic acid, lactobionic acid, fumaric acid, succinic acid, ascorbic acid, adipic acid, phosphoric acid, and mixtures thereof.

In some preferred embodiments the packaged, heat-treated beverage preparation optionally comprises sweetener, sugar polymers and/or flavour.

In an embodiment of the present invention, the packaged, heat-treated beverage preparation comprises a flavour selected from the group consisting of salt, flavourings, flavour enhancers and/or spices. In a preferred embodiment of the invention, the flavour comprises chocolate, cocoa, lemon, orange, lime, strawberry, banana, forrest fruit flavour or combinations thereof. The choice of flavour may depend on the beverage to be produced In some preferred embodiments of the invention, the packaged, heat-treated beverage preparation has a pH in the range of 6.5-7.5. Most preferably the pH employed is a pH of 6.5 to 7.0 or a pH of 6.8 to 7.2.

Regarding the appearance it was surprisingly found that use of whey protein beverages wherein at least 85% w/w of the protein is BLG enables the possibility to provide improvements in both visual perception (colour and turbidity) and in viscosity when compared to heat-treated WPI beverages.

The packaged, heat-treated beverage preparation preferably has a pH in the range of 5.5 to 6.2, alternatively the packaged, heat-treated beverage preparation has a pH in the range of 6.2-8.0.

Alternatively the packaged, heat-treated beverage preparation has a pH in the range of 6.8 to 8.0, more preferably the packaged, heat-treated beverage preparation has a pH in the range of 6.2-8.0.

The packaged, heat-treated beverage preparation of the invention was found preferably to be clear and transparent having a low viscosity at a pH in the range of 6.2-8.0, pref. pH 6.3-7.6, more preferably a pH of 6.5 to 7.2

The packaged, heat-treated beverage preparation of the invention was found preferably to have a low viscosity and a milky appearance at a pH in the range of pH 5.5-8.0, preferably at a pH of 5.7 to 6.8, more preferably 5.8-6.0.

In some preferred embodiments of the intention, the beverage preparation of the invention was found preferably to be heat treated at a pH in the range of pH 5.6-6.2, preferably at a pH of 5.6-8.0, optionally mixed with sources of carbohydrates, fats, minerals and vitamins, adjusted to a preferred pH of 6.2-8.0 and subjected to a second heat treatment (UHT).

In some preferred embodiments of the invention, the packaged, heat-treated beverage preparation has a turbidity of at most 200 NTU.

The visual appearance of packaged, heat-treated beverage preparation is of interest to the consumer. Transparency is a parameter that the consumer uses to evaluate the product. One way of determining the transparency of the beverage preparation is by measuring the turbidity of the beverage as described in example 1.7.

In some embodiments of the packaged heat-treated beverage preparation, it is beneficial that the beverage preparation is transparent. This may for example be advantageous when the beverage is used as a sport beverage or in "protein water", in which case it is beneficial that the beverage resemble water in appearance.

In a preferred embodiment of the present invention, the packaged heat-treated beverage preparation has a turbidity of at most 200 NTU, such a beverage is transparent and/or transparent.

It has surprisingly been found by the inventors that transparent heat-treated, beverage preparations having a turbidity of at most 200 NTU could be obtained by the heat-treated beverage preparation according to the invention.

This was both found when the heat-treatment applied was sterilisation and pasteurisation.

In some preferred embodiment of the present invention, the packaged, heat-treated beverage preparation has a turbidity of at most 150 NTU, or preferably a turbidity of at most 100 NTU, or preferably a turbidity of at most 80 NTU, or preferably a turbidity of at most 60 NTU or more preferably a turbidity of at most 40 NTU, or a turbidity of at most 30 NTU, preferably a turbidity of at most 20 NTU, more preferably a turbidity of at most 10 NTU, and more preferably a turbidity of at most 5 NTU, even more preferably it has a turbidity of at most 2 NTU.

In a preferred embodiment of the present invention, the packaged heat-treated beverage preparation has a turbidity of more than 200 NTU, such a beverage is opaque.

In some embodiments of the packaged heat-treated beverage preparation, it is beneficial that the beverage preparation is opaque. This is for example advantageous when the beverage should resemble milk and have a milky appearance. The appearance of nutritionally complete nutritional supplements is also typically opaque.

In some preferred embodiments of the invention, the packaged, heat-treated beverage preparation has a turbidity of more than 250 NTU. Preferably the packaged, heat-treated beverage preparation has a turbidity of more than 300 NTU, more preferably it has a turbidity of more than 500 NTU, more preferably it has a turbidity of more than 1000, preferably a turbidity of more than 1500 NTU, even more preferably it has a turbidity of more than 2000 NTU The amount of insoluble matter in the heat-treated beverage preparation is a measure of the instability of the beverage and to which extend sedimentation of precipitated matter takes place over time. Beverages having a high amount of insoluble matter are typically considered unstable.

In the context of the present invention, whey protein beverage preparations are considered "stable" if at most 15% of total protein in heated samples precipitates upon centrifugation at 3000 g for 5 minutes. See analysis method in example 1.10.

It has surprisingly been found that when BLG is used as the protein source in an amount of at least 85 w/w %, compared to when WPI having a lower BLG content is used as the protein source, then the protein fraction contains at most 15% insoluble matter after centrifugation at 3000 g for 5 minutes demonstrating that the beverage preparation is stable Therefore, in some preferred embodiments of the present invention, the protein fraction of the heat-treated beverage preparation contains at most 15% insoluble matter.

In some preferred embodiments of the present invention, the packaged, heat-treated beverage preparation contains at most 15% insoluble matter.

In some preferred embodiments of the present invention, the packaged, heat-treated beverage preparation contains preferably at most 12% insoluble matter, more preferably at most 10% insoluble matter, even more preferably at most 8% insoluble matter, and most preferably at most 6% insoluble matter.

Even lower levels of insoluble matter are often preferred and in some preferred embodiments, the packaged, heat-treated beverage preparation contains at most 4% insoluble matter, preferably at most 2% insoluble matter, more preferably at most 1% insoluble matter, and most preferably no detectable insoluble matter at all.

In some preferred embodiments of the invention, the packaged, heat-treated beverage preparation has a viscosity of at most 200 cP centipoise, measured at 22 degrees Celsius at a shear rate of 100/s.

The consumer prefers that the heat-treated beverage is a liquid and not a gel.

One way of determining the viscosity of the beverage preparation is by measuring the viscosity of the beverage as described in example 1.8.

In some embodiments of the packaged heat-treated beverage preparation, it is beneficial that the beverage preparation is having a low viscosity. This is advantageous when the beverage is used as a sport beverage or in some embodiments as a nutritionally complete beverage.

It has surprisingly been found by the inventors that beverage preparations having a neutral pH and which has been subjected to a heat treatment such as pasteurisation and even to sterilisation had a viscosity of at most 200 centipoise, measured at 22 degrees Celsius at a shear rate of 100/s.

Therefore, in some preferred embodiments of the present invention the packaged, heat-treated beverage preparation has a viscosity of at most 200 cP.

Preferably, the viscosity of the packaged, heat-treated beverage preparation is at most 150 cP, preferably at most 100 cP, more preferably at most 80 cP, even more preferably at most 50 cP, and most preferably at most 40 cP.

Even lower viscosity is often preferred, thus in some preferred embodiments of the invention the viscosity of the packaged, heat-treated beverage preparation is at most 20 cP, preferably at most 10 cP, more preferably at most 5 cP, even more preferably at most 3 cP, even more preferably at most 2 cP, and even more preferably at most 1 cP.

In some preferred embodiments of the invention, the packaged, heat-treated beverage preparation comprises a total amount of protein of 2 to 18% w/w relative to the weight of the beverage preparation.

In other preferred embodiments of the present invention the packaged, heat-treated beverage preparation comprises a total amount of protein of 3 to 20% w/w relative to the weight of the beverage, more preferably 3 to 18% w/w, even more preferably 3 to 15% w/w, and most preferred 3 to 10% w/w.

In some embodiments of the invention, it is advantageous that the packaged heat-treated beverage preparation has a protein content of 1.0 to 10.0% w/w relative to the weight of the beverage.

In some preferred embodiments of the invention, the packaged, heat-treated beverage preparation comprises a total amount of protein of 1 to 10% w/w relative to the weight of the beverage preparation.

The packaged, heat-treated beverage preparation preferably comprises a total amount of protein of 2.0 to 9.0% w/w relative to the weight of the beverage, or the packaged, heat-treated beverage preparation preferably comprises a total amount of protein of 3.0 to 8.0% w/w relative to the weight of the beverage, or the packaged, heat-treated, beverage preparation preferably comprises a total amount of protein of 5.0 to 7.5% w/w relative to the weight of the beverage, or the packaged, heat-treated beverage preparation preferably comprises a total amount of protein of 4.0 to 6.0% w/w relative to the weight of the beverage.

Most preferably the packaged, heat-treated beverage preparation comprises a total amount of protein of 4.0 to 6.0% w/w relative to the weight of the beverage. This protein range is particular relevant when the heat-treated beverage preparation is a sport beverage. However, this range is also relevant for some medical applications of the beverage.

In some preferred embodiments of the invention, the packaged, heat-treated beverage preparation comprises a total amount of protein of 10 to 20% w/w relative to the weight of the beverage preparation.

In some embodiments of the invention, the packaged, heat-treated beverage preparation preferably comprises a total amount of protein of 10 to 18% w/w relative to the weight of the beverage, or preferably comprises a total amount of protein of 12.0 to 16.0% w/w relative to the weight of the beverage, or preferably comprises a total amount of protein of 13.0 to 15.0% w/w relative to the weight of the beverage.

In some preferred embodiments, the packaged, heat-treated beverage preparation comprises a total amount of protein of 1.0 to 6.0% w/w relative to the weight of the beverage, in other preferred embodiments, the packaged, heat-treated beverage preparation comprises a total amount of protein of 6.0 to 12.0% w/w relative to the weight of the beverage.

Or in other preferred embodiments, the packaged, heat-treated beverage preparation comprises a total amount of protein of 12.0 to 20.0% w/w relative to the weight of the beverage.

All protein of the beverage is preferably whey protein and/or milk serum protein.

The packaged heat-treated beverage preparation of the invention is particularly useful as a sport beverage in which case it preferably contains optionally only a limited amount of lipid and/or optionally also a limited amount of carbohydrates.

In some preferred embodiments of the present invention, the preparation is particularly useful as a sport beverage and comprises e.g. a total amount of protein in the range of 1-20% w/w relative to the weight of the beverage, preferably 2-15% w/w relative to the weight of the beverage, or preferably 2-10% w/w relative to the weight of the beverage, most preferably 2-6% w/w relative to the weight of the beverage.

In some preferred embodiments of the present invention, the packaged heat-treated beverage preparation is particularly useful as a nutritionally incomplete nutritional supplement and comprises e.g. a total amount of protein in the range of 2-20% w/w relative to the weight of the beverage, or preferably 3-10% w/w relative to the weight of the beverage.

In some preferred embodiments of the present invention, the packaged heat-treated beverage preparation is particularly useful as a nutritionally complete nutritional supplement and comprises e.g. a total amount of protein in the range of 4-20% w/w relative to the weight of the beverage or preferably 5-18% w/w relative to the weight of the beverage.

In some preferred embodiments of the present invention, the packaged heat-treated beverage preparation is particularly advantageous for patients suffering from kidney diseases or otherwise having a reduced kidney function.

In some preferred embodiments of the present invention, the packaged heat-treated beverage preparation comprises e.g. a total amount of protein in the range of 2-20% w/w relative to the weight of the beverage, or preferably 3-12% w/w relative to the weight of the beverage, or preferably 3-10% w/w relative to the weight of the beverage.

It is particularly preferred that the packaged heat-treated beverage preparation comprises a BLG isolate, e.g. in combination with other protein sources, preferably as the main protein source and possibly even as the only protein source.

The degree of protein nativeness depends on a number of factors including protein concentration, pH, temperature and time of heat treatment.

The intrinsic tryptophan fluorescence emission ratio (I330 nm/I350 nm) is a measure of the degree of unfolding of BLG, and the inventors have found that at high BLG tryptophan fluorescence emission ratios, which correlate with low or no unfolding of BLG, the intrinsic tryptophan fluorescence emission ratio (I330 nm/I350 nm) is measured according to Example 1.1.

In some preferred embodiments of the invention, the BLG isolate powder has an intrinsic tryptophan fluorescence emission ratio (I330 nm/I350 nm) of at least 1.11.

In some preferred embodiments of the invention, the BLG isolate powder has an intrinsic tryptophan fluorescence emission ratio (I330 nm/I350 nm) of at least 1.12, preferably at least 1.13, more preferably at least 1.15, even more preferably at least 1.17, and most preferably at least 1.19.

If BLG isolate powder contains considerable amounts of non-protein matter, it is preferred to isolate the protein fraction before measuring the intrinsic tryptophan fluorescence emission ratio. Thus in some preferred embodiments of the invention, the protein fraction of the BLG isolate powder has an intrinsic tryptophan fluorescence emission ratio of at least 1.11.

In some preferred embodiments of the invention, the protein fraction of the BLG isolate powder has an intrinsic tryptophan fluorescence emission ratio (I330 nm/I350 nm) of at least 1.12, preferably at least 1.13, more preferably at least 1.15, even more preferably at least 1.17, and most preferably at least 1.19.

The protein fraction can e.g. be separated from the BLG isolate powder by dissolving the BLG isolate powder in demineralised water and subjecting the solution to dialysis or ultrafiltration-based diafiltration using a filter that retains the protein.

Protein denaturation may also be described by another analysis method than by Trp fluorescence. This method is described in example 1.3. The principle of this method is that denatured whey protein is known to have a lower solubility at pH 4.6 than at pH values below or above pH 4.6, therefore the degree of denaturation of a whey protein composition is determined by measuring the amount of soluble protein at pH 4.6 relative to the total amount of protein at a pH where the proteins in the solution are stable.

Thus the degree of protein denaturation, D, of the whey protein composition is calculated as:

$$D = ((P_{pH\ 7.0\ or\ 3.0} - S_{pH\ 4.6}) / P_{pH\ 7.0\ or\ 3.0}) * 100\%$$

Wherein ($P_{pH\ 7.0\ or\ 3.0}$) is the total protein content at pH 7.0 or 3.0 and ($S_{pH\ 4.6}$) is the total protein content in the supernatant at pH 4.6. See example 1.3.

In some preferred embodiments of the invention, the BLG isolate powder has a degree of protein denaturation of at most 10%, preferably at most 8%, more preferably at most 6%, even more preferably at most 3%, even more preferably at most 1%, and most preferably at most 0.2%.

In some embodiments of the invention, when the protein fraction and or the beverage preparation have been subjected for example to a high temperature heat treatment, then the degree of protein denaturation is more than 10%, preferably more than 20%, preferably more than 30%, preferably more than 40%, or preferably more than 50%, or preferably more than 70%, or preferably more than 80%, or preferably more than 90%, or preferably more than 95%, or preferably more than 99%.

The packaged, heat-treated beverage preparation of the present invention may comprise other macronutrients than proteins. In some embodiments of the invention, the packaged, heat-treated beverage preparation furthermore comprises carbohydrates. The total carbohydrate content in the heat-treated beverage preparation of the invention depends on the intended use of the heat-treated, beverage preparation.

In some embodiments of the invention, the packaged heat-treated beverage preparation furthermore comprises at least one source of carbohydrate. In one exemplary embodiment, the at least one source of carbohydrate is selected from the group consisting of: sucrose, saccharose, maltose, dextrose, galactose, maltodextrin, corn syrup solids, sucromalt, glucose polymers, corn syrup, modified starches, resistant starches, rice-derived carbohydrates, isomaltulose, white sugar, glucose, fructose, lactose, high fructose corn syrup, honey, sugar alcohols, fructo-oligosaccharides, soy fiber, corn fiber, guar gum, konjac flour, polydextrose, Fibersol, and combinations thereof. In some embodiments of the invention, the packaged heat-treated beverage preparation comprises non-digestible sugars like fructans, the fructan comprises inulin or fructo-oligosaccharides.

In some preferred embodiments of the invention the packaged heat-treated, beverage preparation and the liquid solution comprise sugar polymers, i.e. oligosaccharides and/or polysaccharides.

In some preferred embodiments of the invention, the packaged, heat-treated beverage preparation comprises carbohydrate between 0 to 95% of the total energy content of the preparation, preferably in a range between 10 to 85% of the total energy content of the preparation, preferably in a range between 20 to 75% of the total energy content of the preparation or preferably in a range between 30 to 60% of the total energy content of the preparation.

Even lower carbohydrate content is often preferred, thus in some preferred embodiments of the invention preferably in a range between 0 to 30% of the total energy content of the preparation more preferably in a range between 0 to 20% of the total energy content of the preparation even more preferably in a range between 0 to 10% of the total energy content of the preparation.

In some preferred embodiments of the invention the carbohydrate content of the packaged, heat-treated beverage preparation is at most 3% of the total energy content of the preparation, more preferably at most 1% of the total energy content of the preparation, and even more preferably at most 0.1% of the total energy content of the preparation.

In some preferred embodiments of the present invention, the preparation is particularly useful as a sport beverage and comprises e.g. a total amount of carbohydrate of at most 75% of the total energy content of the beverage (E), preferably at most 40 E %, preferably at most 10 E % or preferably at most 5 E %.

In some preferred embodiments of the present invention, the packaged heat-treated beverage preparation is particularly useful as a nutritionally incomplete nutritional supplement and comprises e.g. a total amount of carbohydrate in a range between 70-95% of the total energy content of the beverage (E), preferably 80-90 E %.

In some preferred embodiments of the present invention, the packaged heat-treated beverage preparation is particularly useful as a nutritionally complete nutritional supplement and comprises e.g. a total amount of carbohydrate in a range between 30-60% of the total energy content of the beverage, preferably in a range between 35-50 E %.

In some preferred embodiments of the present invention, the packaged heat-treated beverage preparation is particularly advantageous for patients suffering from kidney diseases or otherwise having a reduced kidney function.

In some preferred embodiments of the present invention, the packaged heat-treated beverage preparation comprises e.g. a total amount of carbohydrate in a range between 30-60% of the total energy content of the beverage, preferably in a range between 35-50 E %.

In one embodiment of the invention, the packaged, heat-treated beverage preparation furthermore comprises at least one additional ingredient selected from the group consisting of vitamins, flavouring agent, minerals, sweeteners, antioxidants, food acid, lipids, carbohydrate, prebiotics, probiotics and non-whey protein.

The further ingredient ensures that the packaged, heat-treated beverage preparation contains the desired nutrients, i.e. nutrients specifically adapted to a patient suffering from protein deficiency or an athlete wanting to build up muscles.

In one embodiment of the invention, the liquid solution furthermore comprises at least one high intensity sweetener. In one embodiment, the at least one high intensity sweetener is selected from the group consisting of aspartame, cyclamate, sucralose, acesulfame salt, neotame, saccharin, stevia extract, a steviol glycoside such as e.g. rebaudioside A, or a combination thereof.

In some embodiments of the invention, it is particularly preferred that the sweetener comprises or even consists of one or more high intensity sweeteners (HIS).

HIS are both found among both natural and artificial sweeteners and typically have a sweetening intensity of at least 10 times that of sucrose.

If used, the total amount of HIS is typically in the range of 0.01-2% w/w. For example, the total amount of HIS may be in the range of 0.05-1.5% w/w. Alternatively, the total amount of HIS may be in the range of 0.1-1.0% w/w.

The choice of the sweetener may depend on the beverage to be produced, e.g. high-intensity sweeteners (e.g. aspartame, acesulfame-K or sucralose) may be used in beverage where no energy contribution from the sweetener is desired, whereas for beverages having a natural profile natural sweeteners (e.g. steviol glycosides, sorbitol or sucrose) may be used.

It may furthermore be preferred that the sweetener comprises or even consists of one or more polyol sweetener(s). Non-limiting examples of useful polyol sweetener are maltitol, mannitol, lactitol, sorbitol, inositol, xylitol, threitol, galactitol or combinations thereof. If used, the total amount of polyol sweetener is typically in the range of 1-20% w/w. For example, the total amount of polyol sweetener may be in the range of 2-15% w/w. Alternatively, the total amount of polyol sweetener may be in the range of 4-10% w/w.

The packaged, heat-treated beverage preparation of the present invention may comprise other macronutrients than proteins. In some embodiments of the invention, the packaged, heat-treated beverage preparation furthermore comprises lipids. The total lipid content in the heat-treated beverage preparation of the invention depends on the intended use of the heat-treated, beverage preparation.

In some preferred embodiments of the invention, the packaged, heat-treated beverage preparation has a lipid content between 0 to 50% of the total energy content of the preparation, or preferably in a range between 0 to 40% of the total energy content of the preparation, or preferably in a range between 0 to 30% of the total energy content of the preparation or preferably in a range between 0 to 20% of the total energy content of the preparation or preferably in a range between 0 to 10% of the total energy content of the preparation or preferably in a range between 0 to 5% of the total energy content of the preparation.

The amount of lipid is determined according to ISO 1211:2010 (Determination of Fat Content—Röse-Gottlieb Gravimetric Method).

In some preferred embodiments of the invention the lipid content of the packaged, heat-treated beverage preparation is at most 3% of the total energy content of the preparation, more preferably at most 1% of the total energy content of the preparation, and even more preferably at most 0.1% of the total energy content of the preparation.

In some preferred embodiments of the present invention, the preparation is particularly useful as a sport beverage and comprises e.g. a total amount of lipid of at most 10 E %, preferably at most at most 1 E %.

In some preferred embodiments of the present invention, the packaged heat-treated beverage preparation is particularly useful as a nutritionally incomplete nutritional supplement and comprises e.g. a total amount of lipid of at most 10% of the total energy content of the beverage, preferably at most at most 1 E %.

In some preferred embodiments of the present invention, the packaged heat-treated beverage preparation is particularly useful as a nutritionally complete nutritional supplement and comprises e.g. a total amount of lipid in the range of 20-50% of the total energy content, preferably in a range between 30-40 E % or more preferably 25-40 E %.

In some preferred embodiments of the present invention, the packaged heat-treated beverage preparation is particularly advantageous for patients suffering from kidney diseases or otherwise having a reduced kidney function.

In some preferred embodiments of the present invention, the packaged heat-treated beverage preparation comprises e.g. a total amount of lipid in the range of 20-60% of the total energy content, preferably in a range between 30-50 E %.

In an embodiment of the invention, the packaged heat treated beverage preparation contains food grade fat, e.g. canola oil and/or MCT (medium chain triglycerides), preferably in an amount of 2-10 wt. %. Preferably, these fats contain a substantial proportion, e.g. at least 40%, preferably at least 60% of unsaturated, most preferably poly-unsaturated fatty acids. Most preferred, the drink is in emulsified form, and lipid is preferably present as droplets emulsified into the water-phase of the beverage preparation.

The beverage preparation typically contains a total amount of water in the range of 50-99% w/w, preferably in the range of 45-97% w/w, more preferably in the range of 40-95% w/w, even more preferably in the range of 35-90% w/w, and most preferably in the range of 30-85% w/w.

In some preferred embodiments of the invention the beverage preparation contains a total amount of water in the range of 55-90% w/w, preferably in the range of 57-85% w/w, more preferably in the range of 60-80% w/w, even more preferably in the range of 62-75% w/w, and most preferably in the range of 65-70% w/w.

In some preferred embodiments of the invention the beverage preparation contains a total amount of water in the range of 90-99% w/w, preferably in the range of 92-98.5% w/w, more preferably in the range of 94-98% w/w, even more preferably in the range of 95-98% w/w, and most preferably in the range of 96-98% w/w. These embodiments are e.g. useful for transparent, water-like beverages.

In some preferred embodiments of the invention the beverage preparation is non-alcoholic meaning that it contains at most 1.0% w/w ethanol, more preferably at most 0.5% w/w, even more preferably at most 0.1% w/w, and most preferably no detectable ethanol.

The beverage preparation typically contains an amount of total solids in the range of 1-45% w/w, preferably in the range of 5-40% w/w, more preferably in the range of 10-35% w/w, even more preferably in the range of 12-30% w/w, and most preferably in the range of 16-25% w/w.

In some preferred embodiments of the invention the beverage preparation contains an amount of total solids in the range of 10-45% w/w, preferably in the range of 15-43% w/w, more preferably in the range of 20-40% w/w, even more preferably in the range of 25-38% w/w, and most preferably in the range of 30-35% w/w.

In some preferred embodiments of the invention the beverage preparation contains an amount of total solids in the range of 1-10% w/w, preferably in the range of 1.5-8% w/w, more preferably in the range of 2-6% w/w, even more preferably in the range of 2-5% w/w, and most preferably in the range of 2-4% w/w. These embodiments are e.g. useful for transparent, water-like beverages.

The part of the beverage preparation that is not solids is preferably water.

In some preferred embodiments of the invention, the sum of alpha-lactalbumin (ALA) and caseinomacropeptide (CMP) comprises at least 40% w/w of the non-BLG protein of the beverage, preferably at least 60% w/w, even more preferably at least 70% w/w, and most preferably at least 90% w/w of the non-BLG protein of the beverage In some preferred embodiments of the invention, ALA comprises at most 80% w/w of the non-BLG protein of the beverage preparation, preferably at most 60% w/w, even more preferably at most 40% w/w, and most preferably at most 30% w/w of the non-BLG protein of the beverage preparation.

Even lower contents of ALA may be preferred, thus in some preferred embodiments of the invention, ALA comprises at most 20% w/w of the non-BLG protein of the beverage preparation, preferably at most 15% w/w, even more preferably at most 10% w/w, and most preferably at most 5% w/w of the non-BLG protein of the beverage preparation.

In other preferred embodiments of the invention, each main non-BLG whey protein is present in a weight percentage relative to total protein which is at most 25% of its weight percentage relative to total protein in a standard whey protein concentrate from sweet whey, preferably at most 20%, more preferably at most 15%, even more preferably at most 10%, most preferably at most 6%.

Even lower concentrations of the main non-BLG whey proteins may be desirable. Thus, in additional preferred embodiments of the invention, each main non-BLG whey protein is present in a weight percentage relative to total protein which is at most 4% of its weight percentage relative to total protein in a standard whey protein concentrate from sweet whey, preferably at most 3%, more preferably at most 2%, even more preferably at most 1%.

The inventors have seen indications that reduction of lactoferrin and/or lactoperoxidase is particularly advantageous for obtaining a colour-neutral whey protein product.

Thus in some preferred embodiments of the invention, lactoferrin is present in a weight percentage relative to total protein which is at most 25% of its weight percentage relative to total protein in a standard whey protein concentrate from sweet whey, preferably at most 20%, more preferably at most 15%, even more preferably at most 10%, most preferably at most 6%. Even lower concentrations of lactoferrin may be desirable. Thus, in additional preferred embodiments of the invention, lactoferrin is present in a weight percentage relative to total protein which is at most 4% of its weight percentage relative to total protein in a standard whey protein concentrate from sweet whey, preferably at most 3%, more preferably at most 2%, even more preferably at most 1%.

Similarly, in some preferred embodiments of the invention, lactoperoxidase is present in a weight percentage relative to total protein which is at most 25% of its weight percentage relative to total protein in a standard whey protein concentrate from sweet whey, preferably at most 20%, more preferably at most 15%, even more preferably at most 10%, most preferably at most 6%. Even lower concentrations of lactoperoxidase may be desirable. Thus, in additional preferred embodiments of the invention, lactoperoxidase is present in a weight percentage relative to total protein which is at most 4% of its weight percentage relative to total protein in a standard whey protein concentrate from sweet whey, preferably at most 3%, more preferably at most 2%, even more preferably at most 1%.

Lactoferrin and lactoperoxidase are quantified according to Example 1.29.

In an embodiment of the invention, the packaged heat-treated beverage preparation is a nutritionally complete nutritional supplement.

In an embodiment of the invention, the packaged heat-treated beverage preparation is a nutritionally incomplete nutritional supplement.

In an embodiment of the invention, the packaged heat-treated beverage preparation is a sports beverage.

In an embodiment of the invention, the packaged heat-treated beverage preparation is a low phosphorus and low potassium beverage suitable for patients suffering from kidney diseases or otherwise having a reduced kidney function.

The packaged heat-treated beverage preparation of the invention is particularly useful as a sport beverage in which case it preferably contains optionally only a limited amount of lipid and/or optionally also a limited amount of carbohydrates.

In some preferred embodiments of the present invention, the preparation is particularly useful as a sport beverage and comprises e.g.:
 a total amount of protein in the range of 1-20% w/w relative to the weight of the beverage, preferably 2-15% w/w relative to the weight of the beverage, or preferably 2-10% w/w relative to the weight of the beverage, most preferably 2-6% w/w relative to the weight of the beverage a total amount of carbohydrate of at most 75% of the total energy content of the beverage (E), preferably at most 40 E %, preferably at most 10 E % or preferably at most 5 E %, and a total amount of lipid of at most 10 E %, preferably at most at most 1 E %.

In some preferred embodiments of the present invention, the packaged heat-treated beverage preparation is particularly useful as a nutritionally incomplete nutritional supplement and comprises e.g.:

a total amount of protein in the range of 2-20% w/w relative to the weight of the beverage, or preferably 3-10% w/w relative to the weight of the beverage.

a total amount of carbohydrate in a range between 70-95% of the total energy content of the beverage (E), preferably 80-90 E %, and a total amount of lipid of at most 10% of the total energy content of the beverage, preferably at most at most 1 E %.

In some preferred embodiments of the present invention, the packaged heat-treated beverage preparation is particularly useful as a nutritionally complete nutritional supplement and comprises e.g.:

a total amount of protein in the range of 4-20% w/w relative to the weight of the beverage or preferably 5-18% w/w relative to the weight of the beverage a total amount of carbohydrate in a range between 30-60% of the total energy content of the beverage, preferably in a range between 35-50 E % and a total amount of lipid in the range of 20-50% of the total energy content, preferably in a range between 30-40 E % or preferably 25-45 E %.

In some preferred embodiments of the present invention, the packaged heat-treated beverage preparation is particularly advantageous for patients suffering from kidney diseases or otherwise having a reduced kidney function. The beverage preparation is having a very low content of phosphorus and other minerals such as Potassium.

In some preferred embodiments of the present invention, the packaged heat-treated beverage preparation comprises e.g.:

a total amount of protein in the range of 2-20% w/w relative to the weight of the beverage, or preferably 3-12% w/w relative to the weight of the beverage, or preferably 3-10% w/w relative to the weight of the beverage, a total amount of carbohydrate in a range between 30-60% of the total energy content of the beverage, preferably in a range between 35-50 E % and a total amount of lipid in the range of 20-60% of the total energy content, preferably in a range between 30-50 E %.

The inventors have seen indications that beverages having a high content of protein nanogels relative to total protein develop less viscosity when they arrive in the stomach than beverages which contain a considerable amount of soluble whey protein aggregates (see Example 9). Soluble whey protein aggregates are often formed upon sterilization of beverages containing conventional whey protein isolates. The ability of food stuffs to development of viscosity and/or structure in the stomach has previously (Halford et al; *Satiety-enhancing products for appetite control: science and regulation of functional foods for weight management; Proceedings of the Nutrition Society* (2012), 71, 350-362) been linked to the sensation of satiety and the present inventors have seen indications that beverages having a high content of protein nanogels therefore invoke less satiety upon ingestion than a comparable beverage containing soluble whey protein aggregates. This is highly advantageous for persons having no or low appetite but require high energy nutrition for their recovery and/or maintenance of muscle mass or other body functions.

In context of the present invention the term "protein protein nanogels" or "protein nanogels" pertains to submicron sized particles of denatured whey protein, typically spherical or nearly spherical in shape. Protein nanogels have also been referred to as whey protein micelles and are e.g. discussed in WO2007/110421A2 while their micellar nature is questionable. The amount of soluble whey protein aggregate is quantified according to Example 1.32. Protein nanogels have an opaque, milky appearance when suspended and are therefore very well-suited for opaque beverages.

In the context of the present invention the term "soluble whey protein aggregate" pertains to small aggregates of denatured whey proteins which aggregates are capable of forming strong gels (much stronger than native whey protein) during acidification to pH 4.6 and which aggregates typically have linear, worm-like, branched or chain-like shapes and are typically of submicron size. Soluble whey protein aggregates are well-known to the skilled person and are e.g. described in WO2007/110421A2 where they are referred to as linear aggregates. The amount of soluble whey protein aggregate is quantified according to Example 1.32. Soluble whey protein aggregates typically form transparent solutions when dissolved in water and are therefore very well-suited for transparent beverages.

By controlling the pH, the mineral content (and particularly the content of $Ca^{2+}$), and the protein concentration of a protein solution it is possible to control whether gel, large gel fragments, protein nanogels or soluble whey protein aggregates are formed. This is well-known to the skilled person. Protein nanogels are typically formed by heating whey protein solutions having a pH in the range of about 5.5—about 6.5, and preferably about 5.8-6.2 and are favoured by whey protein solutions having reduced mineral content relative to a traditional whey protein concentrate. Soluble whey protein aggregates are typically formed by heating whey protein solutions having a pH in the range of about 6.5-8.5, and preferably about 6.6-7.5 and are favoured by a higher content of monovalent cations such as sodium. Such monovalent cations are often added when increasing the pH.

Thus, in some particularly preferred embodiments of the invention the packaged, heat-treated beverage preparation comprises at least 50% w/w protein nanogels relative to total protein, preferably at least 60% w/w, more preferably at least 70% w/w, even more preferably at least 80% w/w, and most preferably at least 90% w/w protein nanogels relative to total protein.

It is for example preferred that the packaged, heat-treated beverage preparation comprises:

a total amount of protein of 5 to 20% w/w relative to the weight of the beverage, preferably 8-19% w/w, more preferably 9-18% w/w, even more preferably 10-17% w/w, and most preferably 11-16%, a total amount of BLG of at least 85% w/w relative to total protein, preferably at least 88% w/w, more preferably at least 90% w/w, even more preferably at least 90% w/w, and most preferably at least 92% w/w, a total amount of protein nanogels of at least 50% w/w relative to total protein, preferably at least 60% w/w, more preferably at least 70% w/w, and even more preferably at least 80% w/w relative to total protein.

It is particularly preferred that the packaged, heat-treated beverage preparation comprises:
- a total amount of protein of 10 to 20% w/w relative to the weight of the beverage, preferably 11-19% w/w, more preferably 12-18% w/w, even more preferably 13-17% w/w, and most preferably 14-16%,
- a total amount of BLG of at least 90% w/w relative to total protein, preferably at least 92% w/w, more preferably at least 94% w/w, and most preferably at least 96% w/w,
- a total amount of protein nanogels of at least 50% w/w relative to total protein, preferably at least 60% w/w, more preferably at least 70% w/w, and even more preferably at least 80% w/w relative to total protein.

The inventors have furthermore found that protein nanogels are less prone to development viscosity than native whey protein and therefore makes it possible to produce sterile, pH-neutral beverages having a high protein content but a sufficiently low viscosity to make them easily drinkable.

Protein nanogels made by heat-denaturation of whey protein that contain at least 85% w/w BLG appear to be particularly advantageous to use for high protein beverages, and without being bound by theory, it is believed that the high BLG protein nanogel offers a more compact protein nanogel structure than protein nanogel based on normal WPI, and that this difference makes it possible to include more protein into a beverage without affecting its drinkability.

In some preferred embodiments of the invention the packaged, heat-treated beverage preparation comprises:
- at least 50% w/w protein nanogels relative to total protein,
- at most 30% w/w soluble whey protein aggregates relative to total protein,
- at most 5% w/w insoluble protein matter.

In some more preferred embodiments of the invention the packaged, heat-treated beverage preparation comprises:
- at least 60% w/w protein nanogels relative to total protein,
- at most 20% w/w soluble whey protein aggregates relative to total protein,
- at most 5% w/w insoluble protein matter.

In some even more preferred embodiments of the invention the packaged, heat-treated beverage preparation comprises:
- at least 70% w/w protein nanogels relative to total protein,
- at most 15% w/w soluble whey protein aggregates relative to total protein,
- at most 5% w/w insoluble protein matter.

The inventors have observed that beverages having an increased content of soluble whey protein aggregates relative to total protein develop more viscosity when they arrive in a stomach-like environment than beverages containing less soluble whey protein aggregates (see Example 9). The ability of food stuffs to development of viscosity and/or structure in the stomach has previously been linked to the sensation of satiety and beverages having a high content of soluble whey protein aggregates therefore invoke increased satiety upon ingestion. This is highly advantageous for persons wishing to lose weight, and is particularly useful for patients suffering from obesity.

Thus, in other particularly preferred embodiments of the invention the packaged, heat-treated beverage preparation comprises at least 60% w/w soluble whey protein aggregates relative to total protein, preferably at least 70% w/w, more preferably at least 80% w/w, and even more preferably at least 90% w/w soluble whey protein aggregates relative to total protein.

Alternatively but also preferred, the packaged, heat-treated beverage preparation comprises:
- a total amount of protein of 5 to 12% w/w relative to the weight of the beverage, preferably 6-11% w/w, more preferably 7-10% w/w, even more preferably 8-10% w/w, and most preferably 11-16%,
- a total amount of BLG of at least 94% w/w relative to total protein, preferably at least 96% w/w relative to total protein, even more preferably at least 98% w/w relative to total protein, and
- at least 60% w/w soluble whey protein aggregates relative to total protein, preferably at least 70% w/w, more preferably at least 80% w/w, and even more preferably at least 90% w/w soluble whey protein aggregates relative to total protein, said packaged, heat-treated beverage preparation preferably having:
- a turbidity of at most 100 NTU, preferably at most 40 NTU, and even more preferably at most 10 NTU, and
- a viscosity at 22 degrees C. and a shear rate of 100 $s^{-1}$ of at most 100 cP, preferably at most 50 cP, more preferably 20 cP and more preferably at most 10 cP.

For example, it is preferred that the packaged, heat-treated beverage preparation comprises:
- a total amount of protein of 5 to 20% w/w relative to the weight of the beverage, preferably 8-19% w/w, more preferably 9-18% w/w, even more preferably 10-17% w/w, and most preferably 11-16%,
- a total amount of BLG of at least 85% w/w relative to total protein, preferably at least 90% w/w relative to total protein, even more preferably at least 94% w/w relative to total protein, and most preferably at least 6% w/w relative to total protein, and
- at least 60% w/w soluble whey protein aggregates relative to total protein, preferably at least 70% w/w, more preferably at least 80% w/w, and even more preferably at least 90% w/w soluble whey protein aggregates relative to total protein.

Soluble whey protein aggregates made from heat-denaturation of whey protein that contain at least 85% w/w BLG appear to be particularly advantageous to use for protein beverages, and without being bound by theory, it is believed that the high BLG soluble aggregates provides a stronger gel upon acidification than soluble aggregates based on normal WPI. This difference makes is possible to produce a beverage that forms a more gel/higher viscosity in the stomach upon digestion and thereby promotes a sensation of satiety.

In some preferred embodiments of the invention the packaged, heat-treated beverage preparation comprises:
- at least 60% w/w soluble whey protein aggregates relative to total protein,
- at most 20% w/w protein nanogels relative to total protein,
- at most 2% w/w insoluble protein matter.

In some more preferred embodiments of the invention the packaged, heat-treated beverage preparation comprises:
- at least 80% w/w soluble whey protein aggregates relative to total protein,
- at most 5% w/w protein nanogels relative to total protein,
- at most 2% w/w insoluble protein matter.

An aspect of the invention pertains to a method of producing a packaged, heat-treated beverage preparation having a pH in the range of 5.5-8.0, comprising the following steps:
a) Providing a liquid solution comprising:
- a total amount of protein of 1 to 20% by weight, wherein at least 85 w/w % of the protein is beta-lactoglobulin (BLG)

optionally, sweetener and/or flavour
b) packaging the liquid solution,
wherein the liquid solution of step a) and/or the packaged liquid solution of step b) is subjected to a heat treatment comprising at least pasteurisation.

Preferably the method of producing a packaged, heat-treated beverage preparation having a pH in the range of 5.5-8.0, comprises the following steps:
a) Providing a liquid solution comprising:
    a total amount of protein of 1 to 20% by weight, wherein at least 85 w/w % of the protein is beta-lactoglobulin (BLG)
    optionally, sweetener, sugar polymers and/or flavour
b) packaging the liquid solution,
wherein the liquid solution of step a) and/or the packaged liquid solution of step b) is subjected to a heat treatment comprising at least pasteurisation.

The liquid solution of step a) preferably has the same composition as the heat-treated beverage preparation except for the changes that the heat-treatment has caused. Features mentioned in the context of the heat-treated beverage preparation therefore apply equally to the liquid solution with the main exception that the liquid solution typically has a lower degree of protein denaturation than the heat-treated beverage preparation.

In some preferred embodiments of the liquid solution of the invention at least 85% w/w of the protein is BLG. Preferably, at least 88% w/w of the protein is BLG, more preferably at least 90% w/w, even more preferably at least 91% w/w, and most preferably at least 92% w/w of the protein is BLG.

Even higher relative amounts of BLG are both feasible and desirable thus in some preferred embodiments of the invention at least 94% w/w of the protein of the liquid solution is BLG, more preferably at least 96% w/w of the protein is BLG, even more preferably at least 98% w/w of the protein is BLG, and most preferably approx. 100% w/w.

For example, the liquid solution preferably comprises BLG in an amount of at least 97.5% w/w relative to total protein, preferably at least 98.0% w/w, more preferably at least 98.5% w/w, even more preferably at least 99.0%, and most preferably BLG in an amount of at least 99.5% w/w relative to total protein, such as approx. 100.0% w/w relative to total protein.

In some preferred embodiments of the invention, the sum of alpha-lactalbumin (ALA) and caseinomacropeptide (CMP) comprises at least 40% w/w of the non-BLG protein of the liquid solution, preferably at least 60% w/w, even more preferably at least 70% w/w, and most preferably at least 90% w/w of the non-BLG protein of the liquid solution.

In some preferred embodiments of the invention, ALA comprises at most 80% w/w of the non-BLG protein of the liquid solution, preferably at most 60% w/w, even more preferably at most 40% w/w, and most preferably at most 30% w/w of the non-BLG protein of the liquid solution.

Even lower contents of ALA may be preferred, thus in some preferred embodiments of the invention, ALA comprises at most 20% w/w of the non-BLG protein of the liquid solution, preferably at most 15% w/w, even more preferably at most 10% w/w, and most preferably at most 5% w/w of the non-BLG protein of the liquid solution.

In other preferred embodiments of the invention, each main non-BLG whey protein is present in a weight percentage relative to total protein which is at most 25% of its weight percentage relative to total protein in a standard whey protein concentrate from sweet whey, preferably at most 20%, more preferably at most 15%, even more preferably at most 10%, most preferably at most 6%.

Even lower concentrations of the main non-BLG whey proteins may be desirable. Thus, in additional preferred embodiments of the invention, each main non-BLG whey protein is present in a weight percentage relative to total protein which is at most 4% of its weight percentage relative to total protein in a standard whey protein concentrate from sweet whey, preferably at most 3%, more preferably at most 2%, even more preferably at most 1%.

The inventors have seen indications that reduction of lactoferrin and/or lactoperoxidase is particularly advantageous for obtaining a colour-neutral whey protein product.

Thus in some preferred embodiments of the invention, lactoferrin is present in a weight percentage relative to total protein which is at most 25% of its weight percentage relative to total protein in a standard whey protein concentrate from sweet whey, preferably at most 20%, more preferably at most 15%, even more preferably at most 10%, most preferably at most 6%. Even lower concentrations of lactoferrin may be desirable. Thus, in additional preferred embodiments of the invention, lactoferrin is present in a weight percentage relative to total protein which is at most 4% of its weight percentage relative to total protein in a standard whey protein concentrate from sweet whey, preferably at most 3%, more preferably at most 2%, even more preferably at most 1%.

Similarly, in some preferred embodiments of the invention, lactoperoxidase is present in a weight percentage relative to total protein which is at most 25% of its weight percentage relative to total protein in a standard whey protein concentrate from sweet whey, preferably at most 20%, more preferably at most 15%, even more preferably at most 10%, most preferably at most 6%. Even lower concentrations of lactoperoxidase may be desirable. Thus, in additional preferred embodiments of the invention, lactoperoxidase is present in a weight percentage relative to total protein which is at most 4% of its weight percentage relative to total protein in a standard whey protein concentrate from sweet whey, preferably at most 3%, more preferably at most 2%, even more preferably at most 1%.

The protein of the liquid solution is preferably prepared from mammal milk, and preferably from ruminant milk such as e.g. milk from cow, sheep, goat, buffalo, camel, llama, horse and/or deer. Protein derived from bovine milk is particularly preferred. The protein of the liquid solution is therefore preferably bovine milk protein.

The protein of the liquid solution is preferably whey protein and/or milk serum protein and even more preferably bovine whey protein and/or milk serum protein.

In some preferred embodiments of the invention the liquid solution has an intrinsic tryptophan fluorescence emission ratio (I330/I350) of at least 1.11, more preferably at least 1.13, even more preferably at least 1.15 and most preferably at least 1.17.

In some preferred embodiments of the invention the liquid solution has a degree of protein denaturation of at most 20%, more preferably at most 10%, even more preferably at most 5%, and most preferably at most 1%.

The low degree of protein denaturation and the fluorescence emission ratio are both characteristic for liquid solutions in which the proteins primarily are in native conformation. The native protein conformation is particularly preferred for producing transparent beverages.

The packaging of step b) may be any suitable packaging techniques, and any suitable container may be used for packaging the liquid solution.

However, in a preferred embodiment of the invention, the packaging of step b) is aseptic packaging, i.e. the liquid solution is packaged under aseptic conditions. For example, the aseptic packaging may be performed by using an aseptic filling system, and it preferably involves filling the liquid solution into one or more aseptic container(s).

Aseptic filling and sealing is particularly preferred if the liquid solution already is sterile or very low in microorganisms prior to filling.

Examples of useful containers are e.g. bottles, cartons, bricks, and/or bags.

In some preferred embodiments of the invention, the container wall has a light transmission at any wave length in the range of 250-500 nm of at most 10%, preferably at most 1%, more preferably at most 0.1%, even more preferably at most 0.01%, and most preferably at most 0.001%.

In other preferred embodiments of the invention, the container wall has an average light transmission in the range of 250-500 nm of at most 10%, preferably at most 1%, more preferably at most 0.1%, even more preferably at most 0.01%, and most preferably at most 0.001%.

The light transmission of the container wall is measured by providing a planar piece of container wall and measuring the light transmission through the container wall at any relevant wave length. The measurement is performed using a standard spectrophotometer and by inserting a piece of container wall into the light path (e.g. using a cuvette or a similar arrangement) so the plane of the piece of container wall is arranged perpendicular to the light path. The transmission at wavelength i is calculated as $T_i = I_{i,after}/I_{i,before}*100\%$ where $I_{i,before}$ is the light intensity at wavelength i before reaching the container wall and $I_{i,after}$ is the intensity of the wavelength i after the light beam of the light path has passed the piece of container wall.

The average light transmission is calculated by calculating the sum of all the transmission measurements $T_i$ made within the given range of wave lengths and dividing the sum with the number of transmission measurements within the given range of wave lengths.

In some preferred embodiments of the invention, the container wall has a light transmission at any wave length in the range of 250-800 nm of most 10%, preferably at most 1%, more preferably at most 0.1%, even more preferably at most 0.01%, and most preferably at most 0.001%.

In other preferred embodiments of the invention, the container wall has an average light transmission in the range of 250-800 nm of most 10%, preferably at most 1%, more preferably at most 0.1%, even more preferably at most 0.01%, and most preferably at most 0.001%.

No-light or low-light transmission containers may e.g. be produced using pigmented, absorbant-containing or coated polymers or coloured or coated glass, or alternatively incorporating a metal layer in the container wall, e.g. in the form of an aluminium foil. Such no-light or low-light transmission containers are known in the food and pharma industry.

Non-limiting examples of suitable polymer materials are e.g. polyethylene terephthalate (PET) or PET-like polymers.

In other preferred embodiments of the invention at least a portion of the container wall is transparent, and preferably the entire container is transparent. In some preferred embodiments of the invention, at least a portion of the container wall, and preferably the entire container wall has an average light transmission in the range of 400-700 nm of at least 11%, preferably at least 20%, more preferably at least 50%, even more preferably at least 60%, and most preferably at least 80%.

In some preferred embodiments of the inventive method, the liquid solution of step a) is subjected to a heat treatment comprising at least pasteurisation and then packaged in step b).

In another embodiment of the inventive method, the packaged liquid solution of step b) is subjected to a heat treatment comprising at least pasteurisation.

In particularly embodiments, heat-treatment involves heating the beverage preparation to a temperature in the range of 70-80 degrees C.

In some preferred embodiments of the invention, the temperature of the heat-treatment is in the range 70-80 degrees C., preferably in the range 70-79 degrees C., more preferably in the range 71-78 degrees C., even more preferably in the range 72-77 degrees C., and most preferably in the range 73-76 degrees C., such as approx. 75 degrees C.

Preferably, the duration of the heat-treatment, when performed in the temperature range 70-80, for 1 second to 60 minutes. The highest exposure times are best suited for the lowest temperatures of the temperature range and vice versa.

In other preferred embodiments the temperature of the heat-treatment is at 70 degrees C. for at least 60 minutes or preferably at 75 degrees C. for at least 45 minutes or preferably at 80 degrees C. for at least 30 minutes or preferably at 85 degrees C. for at least 22 minutes or preferably at 90 degrees C. for at least 10 minutes.

In particularly preferred embodiments of the invention, the heat-treatment provides 70-78 degrees C. for 1 second to 30 minutes, more preferably 71-77 degrees C. for 1 minute to 25 minutes, and even more preferred 72-76 degrees C. for 2 minute to 20 minutes.

In some preferred embodiments of the invention, the method the heat-treatment involves heating to a temperature of 85° C.-95 degrees C. for 1 to 3 minutes.

Higher temperatures may also be preferred in some embodiments, especially if unfolding and optionally also aggregation for BLG is required. For example, the temperature of the heat-treatment may be at least 81 degrees C., preferably at least 91 degrees C., preferably at least 95 degrees C., more preferred at least 100 degrees C., even more preferred at least 120 degrees C., and most preferred at least 140 degrees C.

In some preferred embodiments of the invention, the sterilisation involves a temperature in the range of 120 to 150 degrees C. for 4 to 30 seconds.

The heat-treatment may for example involve a temperature in the range of 90-130 degrees C. and a duration in the range of 5 seconds-10 minutes. The heat-treatment may e.g. involve heating to a temperature in the range of 90-95 degrees C. for a duration of 1-10 minutes, e.g. approx. 120 degrees C. for 20 approx. seconds. Alternatively, the heat-treatment may involve heating to a temperature in the range of 115-125 degrees C. for a duration of 5-30 seconds, e.g. approx. 120 degrees C. for 20 approx. seconds.

Alternatively, the heat-treatment may for example be a UHT-type treatment which typically involves a temperature in the range of 135-144 degrees C. and a duration in the range of 2-10 seconds.

Alternatively, but also preferred, the heat-treatment may involve a temperature in the range of 145-180 degrees C. and a duration in the range of 0.01-2 seconds, and more preferably a temperature in the range of 150-180 degrees C. and a duration in the range of 0.01-0.3 seconds.

The implementation of the heat-treatment may involve the use of equipment such as a plate or tubular heat exchanger, scraped surface heat exchanger or a retort system. Alternatively, and particularly preferred for heat-treatments above 95 degrees C., direct steam-based heating may be employed, e.g. using direct steam injection, direct steam infusion, or spray-cooking. Additionally, such direct steam-based heating is preferably used in combination with flash cooling. Suitable examples of implementation of spray-cooking are found in WO2009113858A1, which are incorporated herein for all purposes. Suitable examples of implementation of direct steam injection and direct steam infusion are found in WO2009113858A1 and WO 2010/085957 A3, which are incorporated herein for all purposes. General aspects of high temperature treatment are e.g. found in "Thermal technologies in food processing" ISBN 185573558 X, which is incorporated herein by reference for all purposes.

In some preferred embodiments of the invention, the pasteurisation is combined with a physical microbial reduction.

Useful examples of physical microbial reduction involve one or more of germ filtration, UV radiation, high pressure treatment, pulsed electric field treatment, and ultrasound.

In some preferred embodiments of the invention, the heat-treatment is a sterilisation resulting in a sterile liquid beverage preparation. Such a sterilisation may preferably be obtained by combining germ filtration and pasteurisation.

In the context of the present invention the term "germ filtration" relates to filtration performed with pore size sufficient to retain microorganisms such as bacteria and spores yet with a pore size that does not retain native BLG. Germ filtration is also sometimes referred to a sterile filtration and involves microfiltration of the liquid in question. The germ filtration is typically performed with a membrane having a pore size of at most 1 micron, preferably at most 0.8 micron, more preferably at most 0.6 micron, even more preferably at most 0.4 micron, and most preferably at most 0.2 micron.

The germ filtration may for example involve a membrane having a pore size of 0.02-1 micron, preferably 0.03-0.8 micron, more preferably 0.04-0.6 micron, even more preferably 0.05-0.4 micron, and most preferably 0.1-0.2 micron.

In some preferred embodiments of the invention the liquid solution is subjected to a germ filtration and subsequently to the heat-treatment using a temperature of at most 80 degrees C., and preferably at most 75 degrees C. The combination of temperature and duration of this heat-treatment is preferably chosen to provide a sterile beverage preparation.

In other preferred embodiments of the invention the liquid solution is subjected to a germ filtration and subsequently to the heat-treatment using a temperature of at least 150 degrees C. for a duration of at most 0.2 seconds, and preferably at most 0.1 seconds. The combination of temperature and duration of this heat-treatment is preferably chosen to provide a sterile beverage preparation.

Depending on the used heat-treatment temperatures, it is beneficial that the beverage preparation is subjected to cooling. According to a preferred aspect of the inventive process, following the heat-treatment, the heat-treated beverage preparation is in an optional step cooled to preferably 0 to 50° C., preferably 0 to 25° C. or preferably 0 to 20° or preferably 0 to 15° C., preferably 0 to 10° C. or preferably 4 to 8° C. or preferably 2 to 5° C. or preferably 1 to 5° C.

If the beverage preparation has been pasteurised, it is preferably cooled to 0 to 15° C., more preferably 1 to 5° C. after the heat-treatment.

According to an embodiment of the method, generally any acid or base may be used to adjust the pH of the liquid solution. Those skilled in the art will recognize suitable means for adjusting the pH. Such as sodium or potassium carbonate, sodium or potassium hydrocarbonate or ammonium hydroxide. Preferably, a base such as KOH or NaOH is employed to adjust the pH, although other bases including NaOH may also be employed to adjust the pH. Those skilled in the art will recognize other means suitable for adjusting the pH. Suitable acids include e.g. citric acid, hydrochloric acid, malic acid or tartaric acid or phosphoric acid most preferably citric acid and/or phosphoric acid.

In some preferred embodiments of the invention, the liquid solution has a pH in the range of 6.5-7.5. Most preferably the pH employed is a pH of 6.5 to 7.0 or a pH of 6.8 to 7.2.

The liquid solution preferably has a pH in the range of 5.5 to 6.2, alternatively the liquid solution has a pH in the range of 6.2-8.0.

Alternatively the liquid solution may have pH in the range of 6.8 to 8.0, more preferably the liquid solution has a pH in the range of 6.2-8.0.

The liquid solution of the invention was found preferably to be clear and transparent having a low viscosity at a pH in the range of 6.2-8.0, pref. pH 6.3-7.6, more preferably a pH of 6.5 to 7.2

The liquid solution of the invention was found preferably to have a low viscosity and a milky appearance at a pH in the range of pH 5.5-8.0, preferably at a pH of 5.7 to 6.8, more preferably 5.8-6.0.

In some preferred embodiments of the intention, the liquid solution of the invention was found preferably to be heat-treated at a pH in the range of pH 5.6-6.2, preferably at pH of 5.6-8.0, optionally mixed with sources of carbohydrates, fats, minerals and vitamins, adjusted to a preferred pH of 6.2-8.0 and subjected to a second heat treatment (UHT).

In some preferred embodiments of the present invention, the liquid solution comprises a total amount of protein of 4.0 to 20% w/w relative to the weight of the beverage.

In some embodiments of the invention, it is advantageous that the liquid solution has a protein content of 2.0 to 10.0% w/w relative to the weight of the solution.

Therefore, in some embodiments of the invention, the liquid solution, preferably comprises a total amount of protein of 2.0 to 10% w/w relative to the weight of the liquid solution, preferably a total amount of protein of 3.0 to 10% w/w relative to the weight of the liquid solution, preferably a total amount of protein of 5.0 to 9.0% w/w relative to the weight of the liquid solution, preferably a total amount of protein of 6.0 to 8.0% w/w relative to the weight of the liquid solution.

In some embodiments of the invention, it is advantageous that the protein content of the liquid solution is high such as 10.0 to 20% w/w relative to the weight of the liquid solution.

Therefore, in some preferred embodiments of the present invention, the liquid solution preferably comprises a total amount of protein of 10.0 to 20% w/w relative to the weight of the liquid solution, more preferably a total amount of protein of 12 to 19% w/w relative to the weight of the liquid solution, even more preferably a total amount of protein of 15 to 18% w/w relative to the weight of the liquid solution, and most preferably a total amount of protein of 16 to 17% w/w relative to the weight of the liquid solution.

It is particularly preferred that the liquid solution comprises a BLG isolate, e.g. in combination with other protein sources, preferably as the main protein source and possibly even as the only protein source.

The BLG isolate is preferably a BLG isolate powder or a liquid BLG isolate contain water and the solids of the BLG isolate powder in an amount in the range from 1-50% w/w.

The beta-lactoglobulin (BLG) isolate powder, preferably prepared by spray-drying, has a pH in the range of i) 2-4.9, ii) 6.1-8.5, or iii) 5.0-6.0 and comprises:
- total protein in an amount of at least 30% w/w,
- BLG in an amount of at least 85% w/w relative to total protein, and
- water in an amount of at most 10% w/w.

The BLG isolate powder preferably has one or more of the following:
- a bulk density of at least 0.2 g/cm$^3$,
- an intrinsic tryptophan fluorescence emission ratio (I330/I350) of at least 1.11,
- a degree of protein denaturation of at most 10%,
- a heat-stability at pH 3.9 of at most 200 NTU, and
- at most 1000 colony-forming units/g.

The BLG isolate powder is preferably an edible composition.

In some preferred embodiments of the invention, the BLG isolate powder has a pH in the range of 2-4.9. Such powders are particularly useful for acidic food products and particularly acidic beverages.

In other preferred embodiments of the invention, BLG isolate powder has a pH in the range of 6.1-8.5.

In some preferred embodiments of the invention, the BLG isolate powder comprises total protein in an amount of at least 40% w/w, preferably at least 50% w/w, at least 60% w/w, more preferably at least 70% w/w, even more preferably at least 80% w/w.

Even higher protein contents may be required and in some preferred embodiments of the invention, the BLG isolate powder comprises total protein in an amount of at least 85% w/w, preferably at least 90% w/w, at least 92% w/w, more preferably at least 94% w/w, and even more preferably at least 95% w/w.

Total protein is measured according to Example 1.5.

In some preferred embodiments of the invention, the BLG isolate powder comprises BLG in an amount of at least 92% w/w relative to total protein, preferably at least 95% w/w, more preferably at least 97% w/w, even more preferably at least 98%, and most preferably BLG in an amount of at least 99.5% w/w relative to total protein.

In some preferred embodiments of the invention, the sum of alpha-lactalbumin (ALA) and caseinomacropeptide (CMP) comprises at least 40% w/w of the non-BLG protein of the powder, preferably at least 60% w/w, even more preferably at least 70% w/w, and most preferably at least 90% w/w of the non-BLG protein of the powder.

In other preferred embodiments of the invention, each main non-BLG whey protein is present in a weight percentage relative to total protein which is at most 25% of its weight percentage relative to total protein in a standard whey protein concentrate from sweet whey, preferably at most 20%, more preferably at most 15%, even more preferably at most 10%, most preferably at most 6%.

Even lower concentrations of the main non-BLG whey proteins may be desirable. Thus, in additional preferred embodiments of the invention, each main non-BLG whey protein is present in a weight percentage relative to total protein which is at most 4% of its weight percentage relative to total protein in a standard whey protein concentrate from sweet whey, preferably at most 3%, more preferably at most 2%, even more preferably at most 1%.

The inventors have seen indications that reduction of lactoferrin and/or lactoperoxidase is particularly advantageous for obtaining a colour-neutral whey protein product.

Thus in some preferred embodiments of the invention, lactoferrin is present in a weight percentage relative to total protein which is at most 25% of its weight percentage relative to total protein in a standard whey protein concentrate from sweet whey, preferably at most 20%, more preferably at most 15%, even more preferably at most 10%, most preferably at most 6%. Even lower concentrations of lactoferrin may be desirable. Thus, in additional preferred embodiments of the invention, lactoferrin is present in a weight percentage relative to total protein which is at most 4% of its weight percentage relative to total protein in a standard whey protein concentrate from sweet whey, preferably at most 3%, more preferably at most 2%, even more preferably at most 1%.

Similarly, in some preferred embodiments of the invention, lactoperoxidase is present in a weight percentage relative to total protein which is at most 25% of its weight percentage relative to total protein in a standard whey protein concentrate from sweet whey, preferably at most 20%, more preferably at most 15%, even more preferably at most 10%, most preferably at most 6%. Even lower concentrations of lactoperoxidase may be desirable. Thus, in additional preferred embodiments of the invention, lactoperoxidase is present in a weight percentage relative to total protein which is at most 4% of its weight percentage relative to total protein in a standard whey protein concentrate from sweet whey, preferably at most 3%, more preferably at most 2%, even more preferably at most 1%.

Lactoferrin and lactoperoxidase are quantified according to Example 1.29.

In some preferred embodiments of the invention, the BLG isolate powder has a water content in an amount of at most 10% w/w, preferably at most 7% w/w, more preferably at most 6% w/w, even more preferably at most 4% w/w, and most preferred at most 2% w/w.

In some preferred embodiments of the invention the BLG isolate powder comprises carbohydrate in an amount of at most 60% w/w, preferably at most 50% w/w, more preferably at most 20% w/w, even more preferably at most 10% w/w, even more preferably at most 1% w/w, and most preferably at most 0.1%. The BLG isolate powder may for example contain carbohydrates, such as e.g. lactose, oligosaccharides and/or hydrolysis products of lactose (i.e. glucose and galactose), sucrose, and/or maltodextrin.

In some preferred embodiments of the invention, the BLG isolate powder comprises lipid in an amount of at most 10% w/w, preferably at most 5% w/w, more preferably at most 2% w/w, and even more preferably at most 0.1% w/w.

The present inventors have found that it can be advantageous to control the mineral content to reach some of the desired properties of the BLG isolate powder.

In some preferred embodiments of the invention, the sum of the amounts of Na, K, Mg, and Ca of the BLG isolate powder is at most 10 mmol/g protein. Preferably, the sum of the amounts of Na, K, Mg, and Ca of the BLG isolate powder is at most 6 mmol/g protein, more preferably at most 4 mmol/g protein, even more preferably at most 2 mmol/g protein.

In other preferred embodiments of the invention, the the sum of the amounts of Na, K, Mg, and Ca of the BLG isolate powder is at most 1 mmol/g protein. Preferably, the sum of the amounts of Na, K, Mg, and Ca of the BLG isolate powder is at most 0.6 mmol/g protein, more preferably at most 0.4 mmol/g protein, even more preferably at most 0.2 mmol/g protein, and most preferably at most 0.1 mmol/g protein.

In other preferred embodiments of the invention, the sum of the amounts of Mg and Ca of the BLG isolate powder is at most 5 mmol/g protein. Preferably, the sum of the amounts of Mg and Ca of the BLG isolate powder is at most 3 mmol/g protein, more preferably at most 1.0 mmol/g protein, even more preferably at most 0.5 mmol/g protein.

In other preferred embodiments of the invention, the sum of the amounts of Mg and Ca of the BLG isolate powder is at most 0.3 mmol/g protein. Preferably, the sum of the amounts of Mg and Ca of the BLG isolate powder is at most 0.2 mmol/g protein, more preferably at most 0.1 mmol/g protein, even more preferably at most 0.03 mmol/g protein, and most preferably at most 0.01 mmol/g protein.

The inventors have found that it is possible to use low phosphorus/low potassium variants of the BLG isolate powder that are particularly useful to patients with kidney diseases. To make such a product, the BLG isolate powder has to have an equally low content of phosphorus and potassium.

Thus, in some preferred embodiments of the invention, the BLG isolate powder has a total content of phosphorus of at most 100 mg phosphorus per 100 g protein. Preferably, the BLG isolate powder has a total content of at most 80 mg phosphorus per 100 g protein. More preferably, the BLG isolate powder has a total content of at most 50 mg phosphorus per 100 g protein. Even more preferably, the BLG isolate powder has a total content of phosphorus of at most 20 mg phosphorus per 100 g protein. The BLG isolate powder has a total content of phosphorus of at most 5 mg phosphorus per 100 g protein.

In some preferred embodiments of the invention, the BLG isolate powder comprises at most 600 mg potassium per 100 g protein. More preferably, the BLG isolate powder comprise at most 500 mg potassium per 100 g protein. More preferably, the BLG isolate powder comprises at most 400 mg potassium per 100 g protein. More preferably, the BLG isolate powder comprises at most 300 mg potassium per 100 g protein. Even more preferably, the BLG isolate powder at most 200 mg potassium per 100 g protein. Even more preferably, the BLG isolate powder comprises at most 100 mg potassium per 100 g protein. Even more preferably, the BLG isolate powder comprises at most 50 mg potassium per 100 g protein and even more preferably, the BLG isolate powder comprises at most 10 mg potassium per 100 g protein.

The content of phosphorus relates to the total amount of elemental phosphorus of the composition in question and is determined according to Example 1.19. Similarly, the content of potassium relates to the total amount of elemental potassium of the composition in question and is determined according to Example 1.19.

In some preferred embodiments of the invention, the BLG isolate powder comprises at most 100 mg phosphorus/100 g protein and at most 700 mg potassium/100 g protein, preferably at most 80 mg phosphorus/100 g protein and at most 600 mg potassium/100 g protein, more preferably at most 60 mg phosphorus/100 g protein and at most 500 mg potassium/100 g protein, more preferably at most 50 mg phosphorus/100 g protein and at most 400 mg potassium/100 g protein, or more preferably at most 20 mg phosphorus/100 g protein and at most 200 mg potassium/100 g protein, or even more preferably at most 10 mg phosphorus/100 g protein and at most 50 mg potassium/100 g protein. In some preferred embodiments of the invention the BLG isolate powder comprises at most 100 mg phosphor/100 g protein and at most 340 mg potassium/100 g protein.

The low phosphorus and/or low potassium compositions according to the present invention may be used as a food ingredient for the production of a food product for patients groups that have a reduced kidney function.

In the context of the present invention, a transparent liquid has a turbidity of at most 200 NTU measured according to Example 1.7.

Thus, in some preferred embodiments of the invention, the BLG isolate powder has a pH in the range of 2-4.9. Preferably, the BLG isolate powder has a pH in the range of 2.5-4.7, more preferably 2.8-4.3, even more preferably 3.2-4.0, and most preferably 3.4-3.9. Alternatively, but also preferred, the BLG isolate powder may have a pH in the range of 3.6-4.3.

The present inventors have found that for some applications, e.g. pH-neutral food products and particularly pH-neutral beverages, it is particularly advantageous to have a pH-neutral BLG isolate powder. This is especially true for high protein, transparent or opaque pH-neutral beverages.

Thus, in some preferred embodiments of the invention, BLG isolate powder has a pH in the range of 6.1-8.5. Preferably, the powder has a pH in the range of 6.1-8.5, more preferably 6.2-8.0, even more preferably 6.3-7.7, and most preferably 6.5-7.5.

In other preferred embodiments of the invention, BLG isolate powder has a pH in the range of 5.0-6.0. Preferably, the powder has a pH in the range of 5.1-5.9, more preferably 5.2-5.8, even more preferably 5.3-5.7, and most preferably 5.4-5.6.

Advantageously, the BLG isolate powder used in the present invention may have bulk density of at least 0.20 g/cm$^3$, preferably at least 0.30 g/cm$^3$, more preferably at least 0.40 g/cm$^3$, even more preferably at least 0.45 g/cm$^3$, even more preferably at least 0.50 g/cm$^3$, and most preferably at least 0.6 g/cm$^3$.

Low density powders such as freeze-dried BLG isolates are fluffy and easily drawn into the air of the production site during use. This is problematic as it increases the risk of cross-contamination of the freeze-dried powder to other foods products and a dusty environment is known to be a cause of hygiene issues. In extreme cases, a dusty environment also increases the risk of dust explosions.

The high density variants of the present invention are easier to handle and less prone to flow into the surrounding air.

An additional advantage of the high density variants of the present invention is that they take up less space during transportation and thereby increase weight of BLG isolate powder that can be transported in one volume unit.

Yet an advantage of the high density variants of the present invention is that they are less prone to segregation when used in powder mixtures with other powdered food ingredients, such as e.g. powdered sugar (bulk density of approx. 0.56 g/cm$^3$), granulated sugar (bulk density of approx. 0.71 g/cm$^3$), powdered citric acid (bulk density of approx. 0.77 g/cm$^3$).

The BLG isolate powder of the present invention may have bulk density in the range of 0.2-1.0 g/cm$^3$, preferably in the range of 0.30-0.9 g/cm$^3$, more preferably in the range of 0.40-0.8 g/cm$^3$, even more preferably in the range of 0.45-0.75 g/cm$^3$, even more preferably in the range of 0.50-0.75 g/cm$^3$, and most preferably in the range of 0.6-0.75 g/cm$^3$.

The bulk density of a powder is measured according to Example 1.17.

The present inventors have found that it is advantageous to maintain the native conformation of BLG and have seen indications that increased unfolding of BLG gives rise to an increased level of drying mouthfeel when the BLG is used for acidic beverages.

The intrinsic tryptophan fluorescence emission ratio (I330/I350) is a measure of degree of unfolding of BLG and the inventors have found that at high intrinsic tryptophan fluorescence emission ratios, which correlate with low or no unfolding of BLG, less drying mouthfeel was observed. The intrinsic tryptophan fluorescence emission ratio (I330/I350) is measured according to Example 1.1.

In some preferred embodiments of the invention, the BLG isolate powder has an intrinsic tryptophan fluorescence emission ratio (I330/I350) of at least 1.11.

In some preferred embodiments of the invention, the BLG isolate powder has an intrinsic tryptophan fluorescence emission ratio (I330/I350) of at least 1.12, preferably at least 1.13, more preferably at least 1.15, even more preferably at least 1.17, and most preferably at least 1.19.

If BLG isolate powder contains considerable amounts of non-protein matter it is preferred to isolate the protein fraction before measuring the intrinsic tryptophan fluorescence emission ratio. Thus in some preferred embodiments of the invention, the protein fraction of the BLG isolate powder has an intrinsic tryptophan fluorescence emission ratio of at least 1.11.

In some preferred embodiments of the invention, the protein fraction of the BLG isolate powder has an intrinsic tryptophan fluorescence emission ratio (I330/I350) of at least 1.12, preferably at least 1.13, more preferably at least 1.15, even more preferably at least 1.17, and most preferably at least 1.19.

The protein fraction can e.g. be separated from the BLG isolate powder by dissolving the BLG isolate powder in demineralised water and subjecting the solution to dialysis or ultrafiltration-based diafiltration using a filter that retains the protein. If the BLG isolate powder contains interfering levels of lipid such lipid can e.g. be removed by microfiltration. Steps of microfiltration and ultrafiltration/diafiltration can be combined to remove both lipid and small molecules from the protein fraction.

It is often preferred that a substantial amount of the BLG of the BLG isolate powder is non-aggregated BLG. Preferably at least 50% of the BLG is non-aggregated BLG. More preferably at least at least 80% of the BLG is non-aggregated BLG. Even more preferred at least 90% of the BLG is non-aggregated BLG. Most preferred, at least 95% of the BLG is non-aggregated BLG.

Even more preferred approx. 100% of the BLG of the BLG isolate powder is non-aggregated BLG.

In some preferred embodiments of the invention, the BLG isolate powder has a degree of protein denaturation of at most 10%, preferably at most 8%, more preferably at most 6%, even more preferably at most 3%, even more preferably at most 1%, and most preferably at most 0.2%.

However, it may also be preferred that the BLG isolate powder has a significant level of protein denaturation, e.g. if an opaque beverage is desired. Thus, in other preferred embodiments of the invention, the BLG isolate powder has a degree of protein denaturation of at least 11%, preferably at least 20%, more preferably at least 40%, even more preferably at least 50%, even more preferably at least 75%, and most preferably at least 90%.

If BLG isolate powder has a significant level of protein denaturation it is often preferred to keep a low level of insoluble protein matter, i.e. precipitated protein matter that would settle in a beverage during storage. The level of insoluble matter is measure according to Example 1.10.

In some preferred embodiments of the invention the BLG isolate powder comprises at most 20% w/w insoluble protein matter, preferably at most 10% w/w insoluble protein matter, more preferably at most 5% w/w insoluble protein matter, even more preferred at most 3% w/w insoluble protein matter, and most preferred at most 1% w/w insoluble protein matter. It may even be preferred that the BLG isolate powder does not contain any insoluble protein matter at all.

The present inventors have found that the heat-stability at pH 3.9 of a BLG isolate powder is a good indicator for its usefulness for transparent high protein beverages. The heat-stability at pH 3.9 is measured according to Example 1.2.

It is particularly preferred that the BLG isolate powder has a heat-stability at pH 3.9 of at most 200 NTU, preferably at most 100 NTU, more preferred at most 60 NTU, even more preferred at most 40 NTU, and most preferred at most 20 NTU. Even better heat-stabilities are possible and the BLG isolate powder preferably has a heat-stability at pH 3.9 of at most 10 NTU, preferably at most 8 NTU, more preferred at most 4 NTU, even more preferred at most 2 NTU.

The content of microorganisms of the BLG isolate powder is preferably kept to a minimum. However, it is a challenge to obtain both a high degree of protein nativeness and a low content of microorganism as processes for microbial reduction tend to lead to protein unfolding and denaturation. The present invention makes it possible to obtain a very low content of microorganism while at the same time maintain a high level of the nativeness of BLG.

Thus, in some preferred embodiments of the invention, the BLG isolate powder contains at most 15000 colony-forming units (CFU)/g. Preferably, the BLG isolate powder contains at most 10000 CFU/g. More preferably, the BLG isolate powder contains at most 5000 CFU/g. Even more preferably, the BLG isolate powder contains at most 1000 CFU/g. Even more preferably, the BLG isolate powder contains at most 300 CFU/g. Most preferably, the BLG isolate powder contains at most 100 CFU/g such as e.g. at most 10 CFU/g. In a particularly preferred embodiment the powder is sterile. A sterile BLG isolate powder may e.g. be prepared by combining several physical microbial reduction processes during the production of the BLG isolate powder, such as e.g. microfiltration and heat-treatment at acidic pH.

In some preferred embodiments of the invention, the BLG isolate powder has a pH in the range of i) 2-4.9, ii) 6.1-8.5, or iii) 5.0-6.0 and comprises:
  total protein in an amount of at least 30% w/w, preferably at least 80% w/w, and even more preferably at least 90% w/w
  beta-lactoglobulin (BLG) in an amount of at least 85% w/w relative to total protein, preferably at least 90% w/w,
  water in an amount of at most 6% w/w,
  lipid in an amount of at most 2% w/w, preferably at most 0.5% w/w,
  said BLG isolate powder having:
  an intrinsic tryptophan fluorescence emission ratio (I330/I350) of at least 1.11,
  a degree of protein denaturation of at most 10%, and
  a heat-stability at pH 3.9 of at most 200 NTU.

In some preferred embodiments of the invention, the BLG isolate powder has a pH in the range of i) 2-4.9 or ii) 6.1-8.5 and comprises:
  total protein in an amount of at least 30% w/w, preferably at least 80% w/w, and even more preferably at least 90% w/w
  beta-lactoglobulin (BLG) in an amount of at least 85% w/w relative to total protein, preferably at least 90% w/w, and more preferably at least 94% w/w relative to total protein water in an amount of at most 6% w/w,
lipid in an amount of at most 2% w/w, preferably at most 0.5% w/w,
said BLG isolate powder having:
an intrinsic tryptophan fluorescence emission ratio (I330/I350) of at least 1.11,
a degree of protein denaturation of at most 10%, preferably at most 5%, and
a heat-stability at pH 3.9 of at most 70 NTU, preferably at most 50 NTU and even more preferably at most 40 NTU.

In some preferred embodiments of the invention the BLG isolate powder has a pH in the range of i) 2-4.9 or ii) 6.1-8.5 and comprises:
total protein in an amount of at least 30% w/w,
beta-lactoglobulin (BLG) in an amount of at least 85% w/w relative to total protein, preferably at least 90% w/w,
water in an amount of at most 6% w/w,
said BLG isolate powder having:
a bulk density of at least 0.2 g/cm$^3$,
an intrinsic tryptophan fluorescence emission ratio (I330/I350) of at least 1.11,
a degree of protein denaturation of at most 10%, and
a heat-stability at pH 3.9 of at most 200 NTU.

In other preferred embodiments of the invention, the BLG isolate powder has a pH in the range of 2-4.9 and comprises:
total protein in an amount of at least 80% w/w, preferably at least 90% w/w, and even more preferably at least 94% w/w
beta-lactoglobulin (BLG) in an amount of at least 85% w/w relative to total protein, preferably at least 90% w/w, and even more preferably at least 94% w/w relative to total protein,
water in an amount of at most 6% w/w,
lipid in an amount of at most 2% w/w, preferably at most 0.5% w/w,
said BLG isolate powder having:
a bulk density of at least 0.2 g/cm$^3$, preferably at least 0.3 g/cm$^3$, and more preferably at least 0.4 g/cm$^3$,
an intrinsic tryptophan fluorescence emission ratio (I330/I350) of at least 1.11,
a degree of protein denaturation of at most 10%, preferably at most 5%, and more preferably at most 2%, and
a heat-stability at pH 3.9 of at most 50 NTU, preferably at most 30 NTU and even more preferably at most 10 NTU.

In yet other preferred embodiments of the invention, the BLG isolate powder has a pH in the range of 6.1-8.5 and comprises:
total protein in an amount of at least 80% w/w, preferably at least 90% w/w, and even more preferably at least 94% w/w
beta-lactoglobulin (BLG) in an amount of at least 85% w/w relative to total protein, preferably at least 90% w/w, and even more preferably at least 94% w/w relative to total protein,
water in an amount of at most 6% w/w,
lipid in an amount of at most 2% w/w, preferably at most 0.5% w/w,
said BLG isolate powder having:
a bulk density of at least 0.2 g/cm$^3$, preferably at least 0.3 g/cm$^3$, and more preferably at least 0.4 g/cm$^3$,
a degree of protein denaturation of at most 10%, preferably at most 5%, and more preferably at most 2%, and
a heat-stability at pH 3.9 of at most 50 NTU, preferably at most 30 NTU, and even more preferably at most 10 NTU.

In further preferred embodiments of the invention, the BLG isolate powder has a pH in the range of 6.1-8.5 and comprises:
total protein in an amount of at least 80% w/w, preferably at least 90% w/w, and even more preferably at least 94% w/w
beta-lactoglobulin (BLG) in an amount of at least 85% w/w relative to total protein, preferably at least 90% w/w, and even more preferably at least 94% w/w relative to total protein,
water in an amount of at most 6% w/w,
lipid in an amount of at most 2% w/w, preferably at most 0.5% w/w,
said BLG isolate powder having:
a bulk density of at least 0.2 g/cm$^3$, preferably at least 0.3 g/cm$^3$, and more preferably at least 0.4 g/cm$^3$,
a degree of protein denaturation of at most 10%, preferably at most 5%, and more preferably at most 2%, and
a heat-stability at pH 3.9 of at most 50 NTU, preferably at most 30 NTU, and even more preferably at most 10 NTU.

In further preferred embodiments of the invention, the BLG isolate powder has a pH in the range of 5.0-6.0 and comprises:
total protein in an amount of at least 80% w/w, preferably at least 90% w/w, and even more preferably at least 94% w/w,
beta-lactoglobulin (BLG) in an amount of at least 85% w/w relative to total protein, preferably at least 90% w/w, and even more preferably at least 94% w/w relative to total protein,
water in an amount of at most 6% w/w,
lipid in an amount of at most 2% w/w, preferably at most 0.5% w/w,
said BLG isolate powder having:
a bulk density of at least 0.2 g/cm$^3$, preferably at least 0.3 g/cm$^3$, and more preferably at least 0.4 g/cm$^3$,
a degree of protein denaturation of at most 10%, preferably at most 5%, and more preferably at most 2%,
a heat-stability at pH 3.9 of at most 50 NTU, preferably at most 30 NTU, and even more preferably at most 10 NTU, and
preferably, a BLG crystallinity of less than 10%.

The BLG isolate powder containing BLG in an amount of at least 85% w/w relative to total protein, is typically provided by a method comprising the steps of:
a) providing a liquid BLG isolate having
    i) a pH in the range of 2-4.9,
    ii) a pH of in the range of 6.1-8.5, or
    iii) a pH of in the range of 5.0-6.0 said liquid BLG isolate containing BLG in an amount of at least 85 w/w relative to total protein,
b) optionally, subjecting the liquid BLG isolate to a physical microbial reduction,
c) drying the liquid BLG isolate, preferably by spray-drying.

The BLG isolate is preferably prepared from mammal milk, and preferably from ruminant milk such as e.g. milk from cow, sheep, goat, buffalo, camel, llama, mare and/or deer. Protein derived from bovine milk is particularly preferred. The BLG is therefore preferably bovine BLG.

The liquid BLG isolate may be provided in a number of different ways.

Typically, the provision of the liquid BLG isolate involves, or even consists of, isolating BLG from a whey protein feed to provide a BLG-enriched composition by one or more of the following methods:
   crystallisation or precipitation of BLG by salting-in,
   crystallisation or precipitation of BLG of BLG by salting-out,
   ion exchange chromatography, and
   fractionation of whey proteins by ultrafiltration.

A particularly preferred way of providing the BLG-enriched composition is by crystallisation of BLG, preferably by salting-in or alternatively by salting-out.

The whey protein feed is preferably a WPC, a WPI, an SPC, an SPI, or a combination thereof.

The term "whey protein feed" pertains to the composition from which the BLG-enriched composition and subsequently the liquid BLG isolate are derived.

In some embodiments of the invention, the preparation of the BLG-enriched composition includes, or even consist of, high salt BLG crystallisation in the pH range 3.6-4.0 according to U.S. Pat. No. 2,790,790 A1.

In other embodiments of the invention the preparation of the BLG-enriched composition includes, or even consists of, the method described by de Jongh et al (Mild Isolation Procedure Discloses New Protein Structural Properties of β-Lactoglobulin, J Dairy Sci., vol. 84(3), 2001, pages 562-571) or by Vyas et al (Scale-Up of Native β-Lactoglobulin Affinity Separation Process, J. Dairy Sci. 85:1639-1645, 2002).

However, in particularly preferred embodiments of the invention, the BLG-enriched composition is prepared by crystallisation at pH 5-6 under salting-in conditions as described in the PCT application PCT/EP2017/084553, which is incorporated herein by reference for all purposes.

In some preferred embodiments of the invention, the BLG-enriched composition is an edible BLG composition according to PCT/EP2017/084553 containing at least 90% BLG relative to total protein and preferably containing BLG crystals.

If it does not already have the required characteristics to be used as liquid BLG isolate, the BLG-enriched composition which has been isolated from whey protein feed may be subjected to one or more steps selected from the group of:
   demineralisation,
   addition of minerals
   dilution,
   concentration,
   physical microbioal reduction, and
   pH adjustment
as part of providing the liquid BLG isolate.

Non-limiting examples of demineralisation include e.g. dialysis, gel filtration, UF/diafiltration, NF/diafiltration, and ion exchange chromatography.

Non-limiting examples of addition of minerals include addition of soluble, food acceptable salts, such as e.g. salts of Na, K, Ca, and/or Mg. Such salts may e.g. be phosphate-salts, chloride salts or salts of food acids, such as e.g. citrate salt or lactate salt. The minerals may be added in solid, suspended, or dissolved form.

Non-limiting examples of dilution include e.g. addition of liquid diluent such as water, demineralised water, or aqueous solutions of minerals, acids or bases.

Non-limiting examples of concentration include e.g. evaporation, reverse osmosis, nanofiltration, ultrafiltration and combinations thereof.

If the concentration has to increase the concentration of protein relative to total solids, it is preferred to use concentration steps such as ultrafiltration or alternatively dialysis. If the concentration does not have to increase the concentration of protein relative to total solids, methods such as e.g. evaporation, nanofiltration and/or reverse osmosis can be useful.

Non-limiting examples of physical microbial reduction include e.g. heat-treatment, germ filtration, UV radiation, high pressure treatment, pulsed electric field treatment, and ultrasound. These methods are well-known to the person skilled in the art.

Non-limiting examples of pH adjustment include e.g. addition of bases and/or acids, and preferably food acceptable bases and/or acids. It is particularly preferred to employ acids and/or bases that are capable of chelating divalent metal cations. Examples of such acids and/or bases are citric acid, citrate salt, EDTA, lactic acid, lactate salt, phosphoric acid, phosphate salt, and combinations thereof.

In some preferred embodiments of the present invention, the liquid solution has a colour value delta b* in the range of −0.10 to +0.51 at the CIELAB colour scale, particularly if the preparation has a turbidity of at most 200 NTU, and more preferably at most 40 NTU.

In other preferred embodiments of the invention, the liquid solution has a colour value delta b* in the range of 0.0 to 0.40 at the CIELAB colour scale, preferably in the range of +0.10 to +0.25.

The liquid solution of the present invention may comprise other macronutrients than proteins.

In some embodiments of the invention, the liquid solution furthermore comprises carbohydrates. The total carbohydrate content in the liquid solution of the invention depends on the intended use of the final heat-treated, beverage preparation.

In some embodiments of the invention, the packaged heat-treated beverage preparation furthermore comprises at least one source of carbohydrate. In one exemplary embodiment, the at least one source of carbohydrate is selected from the group consisting of: sucrose, saccharose, maltose, dextrose, galactose, maltodextrin, corn syrup solids, sucromalt, glucose polymers, corn syrup, modified starches, resistant starches, rice-derived carbohydrates, isomaltulose, white sugar, glucose, fructose, lactose, high fructose corn syrup, honey, sugar alcohols, fructo-oligosaccharides, soy fiber, corn fiber, guar gum, konjac flour, polydextrose, Fibersol, and combinations thereof. In some embodiments of the invention, the packaged heat-treated beverage preparation comprises non-digestible sugars like fructans, the fructan comprises inulin or fructo-oligosaccharides.

In some preferred embodiments, the liquid solution furthermore comprises carbohydrates in a range between 0 to 95% of the total energy content of the liquid solution, preferably in a range between 10 to 85% of the total energy content of the liquid solution, preferably in a range between 20 to 75% of the total energy content of the liquid solution or preferably in a range between 30 to 60% of the total energy content of the liquid solution.

Even lower carbohydrate content is often preferred, thus in some preferred embodiments of the invention preferably in a range between 0 to 30% of the total energy content of the preparation more preferably in a range between 0 to 20% of the total energy content of the preparation even more preferably in a range between 0 to 10% of the total energy content of the preparation.

In some preferred embodiments of the invention the carbohydrate content of the liquid solution is at most 3% of the total energy content of the liquid solution, more preferably at most 1% of the total energy content of the liquid solution, and even more preferably at most 0.1% of the total energy content of the liquid solution.

In one embodiment of the invention, the liquid solution furthermore comprises at least one additional ingredient selected from the group consisting of vitamins, flavouring agent, minerals, sweeteners, antioxidants, food acid, lipids, carbohydrate, prebiotics, probiotics and non-whey protein.

The further ingredient ensures that the final packaged, heat-treated beverage preparation contains the desired nutrients, i.e. nutrients specifically adapted to a patient suffering from protein deficiency or an athlete wanting to build up muscles.

In one embodiment of the invention, the liquid solution furthermore comprises at least one high intensity sweetener. In one embodiment, the at least one high intensity sweetener is selected from the group consisting of aspartame, cyclamate, sucralose, acesulfame salt, neotame, saccharin, stevia extract, a steviol glycoside such as e.g. rebaudioside A, or a combination thereof.

In some embodiments of the invention, it is particularly preferred that the sweetener comprises or even consists of one or more high intensity sweeteners (HIS).

HIS are both found among both natural and artificial sweeteners and typically have a sweetening intensity of at least 10 times that of sucrose.

If used, the total amount of HIS is typically in the range of 0.01-2% w/w. For example, the total amount of HIS may be in the range of 0.05-1.5% w/w. Alternatively, the total amount of HIS may be in the range of 0.1-1.0% w/w.

The choice of the sweetener may depend on the beverage to be produced, e.g. high-intensity sweeteners (e.g. aspartame, acesulfame-K or sucralose) may be used in beverage where no energy contribution from the sweetener is desired, whereas for beverages having a natural profile natural sweeteners (e.g. steviol glycosides, sorbitol or sucrose) may be used.

Alternatively or additionally, a carbohydrate sweetener may be used.

It may furthermore be preferred that the sweetener comprises or even consists of one or more polyol sweetener(s). Non-limiting examples of useful polyol sweeteners are maltitol, mannitol, lactitol, sorbitol, inositol, xylitol, threitol, galactitol or combinations thereof. If used, the total amount of polyol sweetener is typically in the range of 1-20% w/w. For example, the total amount of polyol sweetener may be in the range of 2-15% w/w. Alternatively, the total amount of polyol sweetener may be in the range of 4-10% w/w.

The liquid solution of the present invention may comprise other macronutrients than proteins. In some embodiments of the invention, the liquid solution furthermore comprises lipids. The total lipid content in the final heat-treated beverage preparation of the invention depends on the intended use of the heat-treated, beverage preparation.

In some preferred embodiments of the invention, the liquid solution has a lipid content between 0 to 50% of the total energy content of the liquid solution, or preferably in a range between 0 to 45% of the total energy content of the liquid solution, or preferably in a range between 0 to 30% of the total energy content of the liquid solution or preferably in a range between 0 to 20% of the total energy content of the liquid solution or preferably in a range between 0 to 10% of the total energy content of the liquid solution or preferably in a range between 0 to 5% of the total energy content of the liquid solution.

The amount of lipid is determined according to ISO 1211:2010 (Determination of Fat Content—Röse-Gottlieb Gravimetric Method).

In some preferred embodiments of the invention the lipid content of the liquid solution is at most 3% of the total energy content of the liquid solution, more preferably at most 1% of the total energy content of the liquid solution, and even more preferably at most 0.1% of the total energy content of the liquid solution.

The liquid solution typically contains a total amount of water in the range of 50-99% w/w, preferably in the range of 45-97% w/w, more preferably in the range of 40-95% w/w, even more preferably in the range of 35-90% w/w, and most preferably in the range of 30-85% w/w.

In some preferred embodiments of the invention the liquid solution contains a total amount of water in the range of 55-90% w/w, preferably in the range of 57-85% w/w, more preferably in the range of 60-80% w/w, even more preferably in the range of 62-75% w/w, and most preferably in the range of 65-70% w/w.

In some preferred embodiments of the invention the liquid solution contains a total amount of water in the range of 90-99% w/w, preferably in the range of 92-98.5% w/w, more preferably in the range of 94-98% w/w, even more preferably in the range of 95-98% w/w, and most preferably in the range of 96-98% w/w.

In some preferred embodiments of the invention the liquid solution is non-alcoholic meaning that it contains at most 1.0% w/w ethanol, more preferably at most 0.5% w/w, even more preferably at most 0.1% w/w, and at most preferably no detectable ethanol.

The liquid solution typically contains an amount of total solids in the range of 1-45% w/w, preferably in the range of 5-40% w/w, more preferably in the range of 10-35% w/w, even more preferably in the range of 12-30% w/w, and most preferably in the range of 16-25% w/w.

In some preferred embodiments of the invention the liquid solution contains an amount of total solids in the range of 10-45% w/w, preferably in the range of 15-43% w/w, more preferably in the range of 20-40% w/w, even more preferably in the range of 25-38% w/w, and most preferably in the range of 30-35% w/w.

In some preferred embodiments of the invention the liquid solution contains an amount of total solids in the range of 1-10% w/w, preferably in the range of 1.5-8% w/w, more preferably in the range of 2-6% w/w, even more preferably in the range of 2-5% w/w, and most preferably in the range of 2-4% w/w.

The part of the liquid solution that is not solids is preferably water.

The present inventors have found that it can be advantageous to control the mineral content to reach some of the desired properties of the packaged heat-treated beverage preparation.

The present inventors have surprisingly found that when a BLG isolate is used as defined herein and in example 2 and 3 heat-treated beverage preparations can be produced, without compromising the viscosity and avoiding gelling. This provides the possibility that packaged heat-treated beverage preparations can be produced having a high mineral content, and that beverages that are nutritionally complete nutritional supplements or nutritionally incomplete supplements can be produced.

In some embodiments of the invention, the liquid solution comprises a plurality of minerals. In one exemplary embodiment, the liquid solution comprises at least four minerals. In one embodiment, the four minerals are sodium, potassium, magnesium and calcium.

In some preferred embodiments of the invention, the sum of the amounts of Na, K, Mg and Ca is within the range of 0 to 400 mM in the liquid solution, preferably within the range of 10-200 mM or preferably within the range of 20-100 mM.

In some preferred embodiments of the invention, the sum of the amounts of Na, K, Mg and Ca is at most 400 mM in the liquid solution.

In other preferred embodiments of the invention, the sum of the amounts of Na, K, Mg and Ca is at most 300 mM in the liquid solution, preferably at most 200 mM, or preferably at most 100 mM, or preferably at most 80 mM or preferably at most 60 mM or preferably at most 40 mM or preferably at most 30 mM or preferably at most 20 mM or preferably at most 20 mM or preferably at most 10 mM or preferably at most 5 mM or preferably at most 1 mM.

In some preferred embodiments of the invention, the sum of the amounts of Mg and Ca is at most 75 mM in the liquid solution, more preferably at most 40 mM in the liquid solution, more preferably at most 20 mM in the liquid solution.

In other preferred embodiments of the invention, the sum of the amounts of Mg and Ca is at most 10 mM in the liquid solution, more preferably at most 8.0 mM in the liquid solution, more preferably at most 6.0 mM in the liquid solution, even more preferably at most 4.0 mM in the liquid solution and most preferably at most 2.0 mM in the liquid solution.

In another exemplary embodiment of the invention, the liquid solution comprises a plurality of minerals selected from the group consisting of: Calcium, Iodine, Zinc, Copper, Chromium, Iron, Phosphorus, Magnesium, Selenium, Manganese, Molybdenum, Sodium, Potassium, and combinations thereof.

In other preferred embodiments of the invention, the liquid solution is a low mineral solution.

In the context of the present invention, the term "low mineral" pertains to a composition, e.g. a liquid, beverage, a powder or another food product, that has at least one, preferably two, and even more preferably all, of the following:
- an ash content of at most 1.2% w/w transparent relative to total solids,
- a total content of calcium and magnesium of at most 0.3% w/w relative to total solids,
- a total content of sodium and potassium of at most 0.10% w/w relative to total solids,
- a total content of phosphorus of at most 100 mg phosphorus per 100 g protein.

Preferably, a low mineral composition has at least one, preferably two or more, and even more preferably all, of the following:
- an ash content of at most 0.7% w/w relative to total solids,
- a total content of calcium and magnesium of at most 0.2% w/w relative to total solids,
- a total content of sodium and potassium of at most 0.08% w/w relative to total solids,
- a total content of phosphorus of at most 80 mg phosphorus per 100 g protein.

Even more preferably, a low mineral composition has at least one, preferably two or more, and even more preferably all, of the following:
- an ash content of at most 0.5% w/w relative to total solids,
- a total content of calcium and magnesium of at most 0.15% w/w relative to total solids,
- a total content of sodium and potassium of at most 0.06% w/w relative to total solids,
- a total content of phosphorus of at most 50 mg phosphorus per 100 g protein.

It is particularly preferred that a low mineral composition has the following:
- an ash content of at most 0.5% w/w relative to total solids,
- a total content of calcium and magnesium of at most 0.15% w/w relative to total solids,
- a total content of sodium and potassium of at most 0.06% w/w relative to total solids,
- a total content of phosphorus of at most 50 mg phosphorus per 100 g protein.

In another exemplary embodiment of the invention, the liquid solution comprises a plurality of minerals selected from the group consisting of: Calcium, Iodine, Zinc, Copper, Chromium, Iron, Phosphorus, Magnesium, Selenium, Manganese, Molybdenum, Sodium, Potassium, and combinations thereof.

The present inventors have found that the present invention makes it possible to prepare a packaged heat-treated beverage preparation having a very low content of phosphorus and other minerals such as Potassium, which is advantageous for patients suffering from kidney diseases or otherwise having a reduced kidney function.

The liquid solution is preferably a low phosphorus beverage preparation.

The liquid solution is preferably a low Potassium beverage preparation.

The liquid solution is preferably a low phosphorus and a low Potassium beverage preparation In the context of the present invention, the term "low phosphorus" pertains to a composition, e.g. a liquid, a powder or another food product, that has a total content of phosphorus of at most 100 mg phosphorus per 100 g protein. Preferably, a low phosphorus composition has a total content of at most 80 mg phosphorus per 100 g protein. More preferably, a low phosphorus composition may have a total content of at most 50 mg phosphorus per 100 g protein. Even more preferably, a low phosphorus composition may have a total content of phosphorus of at most 20 mg phosphorus per 100 g protein. Even more preferably, a low phosphorus composition may have a total content of phosphorus of at most 5 mg phosphorus per 100 g protein. Low phosphorus compositions according to the present invention may be used as a food ingredient for the production of a food product for patients groups that have a reduced kidney function.

The content of phosphorus relates to the total amount of elemental phosphorus of the composition in question and is determined according to Example 1.19.

The content of potassium relates to the total amount of elemental potassium of the composition in question and is determined according to Example 1.19.

In some preferred embodiments of the invention, the liquid solution comprises at most 100 mg phosphorus/100 g protein and at most 700 mg potassium/100 g protein, preferably at most 80 mg phosphorus/100 g protein and at most 600 mg potassium/100 g protein, more preferably at most 60 mg phosphorus/100 g protein and at most 500 mg potassium/100 g protein, more preferably at most 50 mg phosphorus/100 g protein and at most 400 mg potassium/100 g protein, or more preferably at most 20 mg phosphorus/100 g protein and at most 200 mg potassium/100 g protein, or even more preferably at most 10 mg phosphorus/100 g protein and at most 50 mg potassium/100 g protein. In some preferred embodiments of the invention, the packaged, heat-treated beverage preparation comprises at most 100 mg phosphor/100 g protein and at most 340 mg potassium/100 g protein.

The liquid solution comprising low amounts of phosphorus and potassium may advantageously be supplemented with carbohydrates and lipids, the heat-treated beverage preparation preferably furthermore comprises a total amount of carbohydrates in a range between 30-60% of the total energy content of liquid solution, preferably in a range between 35-50 E % and a total amount of lipid in the range of 20-60% of the total energy content, preferably in a range between 30-50 E %.

In one embodiment of the invention, the liquid solution comprises a plurality of vitamins. In one exemplary embodiment, the liquid solution comprises at least ten vitamins. In one exemplary embodiment, the liquid solution comprises a plurality of vitamins selected from the group consisting of: Vitamin A, vitamin B1, vitamin B2, vitamin B3, vitamin B5, vitamin B6, vitamin B7, vitamin B9, vitamin B12, vitamin C, vitamin D, vitamin K, Riboflavin, pantothenic Acid, vitamin E, thiamin, niacin, folic acid, biotin, and combinations thereof.

In one embodiment of the invention, the liquid solution comprises a plurality of vitamins and a plurality of minerals.

In some preferred embodiments of the present invention, the liquid solution contains one or more food acids selected from the group consisting of citric acid, malic acid, tartaric acid, acetic acid, benzoic acid, butyric acid, lactic acid, fumaric acid, succinic acid, ascorbic acid, adipic acid, phosphoric acid, and mixtures thereof.

In an embodiment of the present invention, the liquid solution furthermore comprises a flavour selected from the group consisting of salt, flavourings, flavour enhancers and/or spices. In a preferred embodiment of the invention, the flavour comprises chocolate, cocoa, lemon, orange, lime, strawberry, banana, forrest fruit flavour or combinations thereof. The choice of flavour may depend on the beverage to be produced.

The inventors have discovered that the present invention, and particularly the use of a protein fraction that comprises at least 85% w/w BLG relative to total protein, makes it possible to form protein nanogels at a surprisingly high protein concentration which previously was thought to lead to uncontrollable gel formation. This is advantageous as it allows for producing a high protein beverage directly without the need for concentrating the protein content after denaturation or concentrating the protein nanogels.

Thus, in some preferred embodiments of the invention the liquid solution, or an earlier solution used to prepared the liquid solution, comprises:
 a total amount of protein in the range of 5-20% w/w, preferably in the range of 8-19% w/w, more preferably in the range of 10-18% w/w, and most preferably 12-16% w/w,
 BLG in an amount of at least 85% w/w relative to total protein, preferably at least 90% w/w, and more preferably at least 92% w/w relative to total protein, and most preferably at least 96% w/w relative to total protein,
and having:
 a degree of protein denaturation of at most 30%, preferably at most 20%, even more preferably at most 10%, and most preferably at most 5%, and
 a pH in the range of 5.6-6.5, preferably 5.8-6.2, and more preferably 5.9-6.1.

In the context of the present invention, the term "earlier solution" or "earlier solution used to prepare the liquid solution" pertains to an aqueous solution used for the preparation of the liquid solution, and typically has the same protein content as the liquid solution or a slightly higher protein content. The use of an earlier solution is e.g. preferred when the protein and particularly native BLG, has to be modified by e.g. heat-denaturation prior to forming the liquid solution.

In some preferred embodiments of the invention the liquid solution, or an earlier solution used to prepare the liquid solution, comprises a total amount of protein in the range of 10-20% w/w, preferably in the range of 10-19% w/w, more preferably in the range of 10-18% w/w, and most preferably 10-16% w/w.

In other preferred embodiments of the invention the liquid solution, or an earlier solution used to prepare the liquid solution, comprises a total amount of protein in the range of 5-20% w/w, preferably in the range of 8-19% w/w, more preferably in the range of 10-18% w/w, and most preferably 12-16% w/w.
 a pH in the range of 5.6-6.5, preferably 5.8-6.2, and more preferably 5.9-6.1.

In some preferred embodiments of the invention the liquid solution, or an earlier solution used to prepare the liquid solution, has a degree of protein denaturation of at most 30%, preferably at most 20%, even more preferably at most 10%, and most preferably at most 5%.

Even lower degrees of protein denaturation may be preferred, thus in some preferred embodiments of the invention the liquid solution, or an earlier solution used to prepare the liquid solution, has a degree of protein denaturation of at most 4%, preferably at most 2%, even more preferably at most 1%, and most preferably at most 0.2%.

In some preferred embodiments of the invention the liquid solution, or an earlier solution used to prepare the liquid solution, has a lipid content of at most 5% w/w, more preferably at most 2% w/w, even more preferably at most 0.5% w/w, and most preferably at most 0.1% w/w.

In some preferred embodiments of the invention the liquid solution, or an earlier solution used to prepare the liquid solution, has a carbohydrate content of at most 12% w/w, more preferably at most 6% w/w, even more preferably at most 2% w/w, and most preferably at most 0.1% w/w.

However, in other preferred embodiments of the invention the liquid solution, or an earlier solution used to prepare the liquid solution, has a carbohydrate content of 2-25% w/w, more preferably 4-20% w/w, even more preferably at most 5-18% w/w, and most preferably at most 6-15% w/w. These embodiments are e.g. useful if the final beverage has to contain a significant content of carbohydrate. Alternatively, the carbohydrate may be added to the heat-treated earlier solution after the protein nanogels have been formed.

In some preferred embodiments of the invention which e.g. are useful for the formation of protein nanogels, the liquid solution, or an earlier solution used to prepare the liquid solution, has a pH in the range of 5.6-6.5, preferably 5.8-6.2, and more preferably 5.9-6.1.

The liquid solution, or the earlier solution used to prepare the liquid solution, is preferably subjected to first heat-treatment using a temperature in the range of 70-145 degrees C., preferably 75-120 degrees C., more preferably 80-98 degrees C., even more preferably 82-96 degrees C., and most preferably 85-95 degrees C.

While the first heat-treatment causing the protein nanogelation may take place under high shear conditions, e.g. using scraped surface heat exchangers or similar high shear equipment, it is surprisingly also possible to form the protein nanogel by heating under low-shear or even no-shear conditions, e.g. by immersion of a packaged liquid solution into an oil bath or by use of a plate heat exchanger.

The first heat-treatment preferably has a duration sufficient to provide a degree of protein denaturation of at least 40%, preferably at least 60%, more preferably at least 70%, and most preferably at least 80% Even higher degrees of protein denaturation may be obtained by the first heat-treatment, preferably at least 90%, and more preferably at least 95%.

The first heat-treatment may e.g. have a duration in the range of 0.1 second-2 hour, preferably 0.5 minute-1 hour, more preferably 2 minutes-30 minutes, and most preferably 5-20 minutes.

In some preferred embodiments the first heat-treatment is the only heat-treatment of the method of producing the packaged, heat-treated beverage preparation. In this case the first heat-treatment is applied to the liquid solution, either prior to packaging or after packaging.

In other preferred embodiments the first heat-treatment is used to form protein nanogels and is followed by a second heat-treatment which preferably serves the purpose of final pasteurisation or sterilisation of the liquid solution. In this case the first heat-treatment is preferably applied to an earlier solution used to prepare the liquid solution. This earlier solution may then be processed, e.g. by mixing with other ingredients mentioned herein, such as e.g. carbohydrates, fats, minerals, and/or vitamins, to form the liquid solution. Such processing may also involve other steps such as e.g. pH-adjustment, homogenisation, and/or emulsification. Preferably, the liquid solution will comprise earlier solution, and optionally additional ingredients mixed with the earlier solution.

In some preferred embodiments of the invention:
the first heat-treatment is applied to an earlier solution used to prepare the liquid solution, thereby forming protein nanogels,
optionally, the heated earlier solution is combined with other ingredients, e.g. by mixing,
the liquid solution, in the form of the heated earlier solution as such or the combination of the heated earlier solution and other ingredients, is packaged in suitable containers, and
the packaged liquid solution is subjected to a second heat-treat which involves at least pasteurisation and which preferably is sufficient to provide a sterile beverage preparation.

In some preferred embodiments of the invention minerals, such as e.g. Ca, Mg, K and/or K are added to the nanogel-containing, heat-treated earlier solution. The inventors have observed that whey protein is more tolerant to pasteurisation or even sterilising heat-treatment in the presence of high mineral contents when the whey protein previously has been converted to nanogels.

The term "beverage preparation" describes the liquid solution which has been subjected to a heat-treatment which at least involves pasteurisation.

The total amount of Ca and Mg of the liquid solution, or the earlier solution used to prepare the liquid solution, is preferably in the range of 0.001-0.1% w/w, more preferably 0.005-0.06% w/w, and most preferably in the range of 0.02-0.04% w/w.

The total amount of Na and K of the liquid solution, or the earlier solution used to prepare the liquid solution, is preferably in the range of 0.001-0.2% w/w, more preferably 0.01-0.1% w/w, and most preferably in the range of 0.04-0.06% w/w.

In some preferred embodiments of the invention minerals, such as e.g. Ca, Mg, K and/or K are added to the nanogel-containing, heat-treated earlier solution. The inventors have observed that whey protein is more tolerant to pasteurisation or even sterilising heat-treatment in the presence of high mineral contents when the whey protein previously has been converted to nanogels.

Thus, it is often preferred that the nanogel-containing, heat-treated earlier solution is mixed with other ingredients that include mineral in an amount sufficient to provide a liquid solution comprising a total amount of Ca and Mg of at least 0.1% w/w, preferably at least 0.3% w/w and more preferably at least 0.5% w/w.

The nanogel-containing, heat-treated earlier solution is preferably mixed with other ingredients that include mineral in an amount sufficient to provide a liquid solution comprising a total amount of Ca and Mg of 0.1-1.5% w/w, more preferably 0.3-1.2% w/w and even more preferably 0.5-1.0% w/w.

Additionally, it is often preferred that the nanogel-containing, heat-treated earlier solution is mixed with other ingredients that include mineral in an amount sufficient to provide a liquid solution comprising a total amount of Na and K of at least 0.2% w/w, preferably at least 0.5% w/w and more preferably at least 0.7% w/w.

The nanogel-containing, heat-treated earlier solution is preferably mixed with other ingredients that include mineral in an amount sufficient to provide a liquid solution comprising a total amount of Na and K of 0.2-1.5% w/w, more preferably 0.5-1.2% w/w and even more preferably 0.7-1.0% w/w.

It is particularly preferred that the liquid solution, or an earlier solution used to prepare the liquid solution, is prepared by mixing a BLG isolate as described herein, preferably obtained according to WO 2018/115520 A1, with water, preferably demineralised or pH-adjusted water, and optionally adjust the pH to obtain the desired protein content and a pH in the range of 5.6-6.4. It is preferred to stop the pH adjustment as soon as the liquid becomes transparent.

Soluble whey protein aggregates are preferably formed by heat-treatment at a pH in the range of 6.6-8.0, more preferably in the range of 6.7-7.5, and even more preferably in the range of 6.9-7.3. The heat-treatment described in the context of the protein nanogel is equally useful for the formation of soluble whey protein aggregates. However, the protein content of liquid solution is preferably in the range of 1-12% w/w, more preferably in the range of 3-11% w/w, and even more preferably in the range of 5-10% w/w, and most preferably in the range of 6-9% w/w.

In order to prepare soluble whey protein aggregates using a liquid solution having a high protein concentration the total amount of Ca and Mg of the liquid solution is preferably at most 0.01% w/w, more preferably at most 0.005% w/w, and even more preferably at most 0.001% w/w.

In order to prepare soluble whey protein aggregates using a liquid solution having a high protein concentration the total amount of Na and K of the liquid solution is preferably at most 0.05% w/w, more preferably at most 0.01% w/w, and most preferably at most 0.005% w/w.

An aspect of the invention pertains to use of a protein solution comprising a total amount of protein of 1 to 20% w/w relative to the weight of the solution, wherein at least 85 w/w % of the protein is beta-lactoglobulin (BLG) for controlling the whiteness of a sterile beverage preparation having a pH in the range of 5.5-8.0.

Another aspect of the invention pertains to a packaged heat-treated beverage preparation as defined herein, for use in a method for the treatment of diseases associated with protein deficiency.

Another aspect of the invention pertains to use of the packaged heat-treated beverage preparation as defined herein as a dietary supplement.

In a preferred embodiment of the invention, the packaged heat-treated beverage preparation as defined herein is used as a dietary supplement and it is ingested before, during or after exercise.

In some preferred embodiments of the invention, the packaged, heat-treated beverage preparation having a pH in the range of 5.8-8.0, the beverage comprises
- a total amount of protein of 1 to 20% w/w relative to the weight of the beverage preparation, wherein at least 85 w/w % of the protein is beta-lactoglobulin (BLG), preferably at least 90% w/w and
- optionally, sweetener and/or flavour,
- wherein the protein fraction of the beverage preparation has a colour value delta b* in the range of −0.10 to +0.51 at the CIELAB colour scale, wherein delta $b^* = b^*_{sample\ standardised\ to\ 6.0\ w/w\ \%\ protein} - b^*_{demin.\ water}$, measured at room temperature.

In some preferred embodiments of the invention, the packaged, heat-treated beverage preparation having a pH in the range of 5.8-8.0, the beverage comprises
- a total amount of protein of 1 to 20% w/w relative to the weight of the beverage preparation, wherein at least 85 w/w % of the protein is beta-lactoglobulin (BLG), preferably at least 90% w/w and
- optionally, sweetener and/or flavour,
- wherein the protein fraction of the beverage preparation has a colour value delta b* in the range of −0.10 to +0.51 at the CIELAB colour scale, wherein delta $b^* = b^*_{sample\ standardised\ to\ 6.0\ w/w\ \%\ protein} - b^*_{demin.\ water}$, measured at room temperature.

and a lipid content of at most 5% of the total energy content of the preparation.

In some preferred embodiments of the invention, the packaged, heat-treated beverage preparation having a pH in the range of 5.8-8.0, the beverage comprises
- a total amount of protein of 1 to 20% w/w relative to the weight of the beverage preparation, wherein at least 85 w/w % of the protein is beta-lactoglobulin (BLG), preferably at least 90% w/w and
- optionally, sweetener and/or flavour,
- wherein the protein fraction of the beverage preparation has a colour value delta b* in the range of −0.10 to +0.51 at the CIELAB colour scale, wherein delta $b^* = b^*_{sample\ standardised\ to\ 6.0\ w/w\ \%\ protein} - b^*_{demin.\ water}$, measured at room temperature.

and a lipid content of more than 5% of the total energy content of the preparation, preferably more than 20 E %.

In some preferred embodiments of the invention, the packaged, heat-treated beverage preparation having a pH in the range of 5.8-8.00, the beverage comprises
- a total amount of protein of 1 to 20% w/w relative to the weight of the beverage preparation, wherein at least 85 w/w % of the protein is beta-lactoglobulin (BLG), preferably at least 90% w/w and
- optionally, sweetener and/or flavour,
- having a turbidity of more than 200 NTU, preferably more than 40 NTU.

In some preferred embodiments of the invention, the packaged, heat-treated beverage preparation having a pH in the range of 5.8-8.0, the beverage comprises
- a total amount of protein of 1 to 20% w/w relative to the weight of the beverage preparation, wherein at least 85 w/w % of the protein is beta-lactoglobulin (BLG), preferably at least 90% w/w and
- optionally, sweetener and/or flavour,
- having a turbidity of at most 200 NTU, preferably at most 40 NTU.

In some preferred embodiments of the invention, the packaged, heat-treated beverage preparation having a pH in the range of 5.8-8.0, the beverage comprises
- a total amount of protein of 3 to 20% w/w relative to the weight of the beverage preparation more preferably 3 to 18% w/w, even more preferably 3 to 15% w/w, and most preferred 3 to 10% w/w, wherein at least 85 w/w % of the protein is beta-lactoglobulin (BLG), preferably at least 90% w/w and
- optionally, sweetener and/or flavour,
- having a turbidity of more than 200 NTU, preferably more than 40 NTU.

In some preferred embodiments of the invention, the packaged, heat-treated beverage preparation having a pH in the range of 5.8-8.0, the beverage comprises
- a total amount of protein of 3 to 20% w/w relative to the weight of the beverage preparation more preferably 3 to 18% w/w, even more preferably 3 to 15% w/w, and most preferred 3 to 10% w/w, wherein at least 85 w/w % of the protein is beta-lactoglobulin (BLG), preferably at least 90% w/w and
- optionally, sweetener and/or flavour,
- having a turbidity of at most 200 NTU, preferably at most 40 NTU.

In some preferred embodiments of the invention, the packaged, heat-treated beverage preparation having a pH in the range of 6.2-8.0, preferably 6.3-7.6, preferably 6.5-7.2 the beverage comprises
- a total amount of protein of 1 to 20% w/w relative to the weight of the beverage preparation, wherein at least 85 w/w % of the protein is beta-lactoglobulin (BLG), preferably at least 90% w/w and
- optionally, sweetener and/or flavour,
- having a turbidity of at most 200 NTU, preferably at most 40 NTU.

More preferably the packaged, heat-treated beverage preparation having a pH in the range of 6.5-8.0, preferably 6.7-7.6, preferably 6.9-7.2, the beverage preparation comprising:
- a total amount of protein of 5 to 12% w/w relative to the weight of the beverage preparation, wherein at least 90 w/w % of the protein is beta-lactoglobulin (BLG), preferably at least 94% w/w, and
- optionally, sweetener and/or flavour,
- the beverage preparation having a turbidity of at most 40 NTU, preferably at most 20 NTU, and wherein the beverage preparation preferably is sterile.

In some preferred embodiments of the invention, the packaged, heat-treated beverage preparation having a pH in the range of 6.2-8.0, preferably 6.3-7.6, preferably 6.5-7.2 the beverage comprises
- a total amount of protein of 3 to 20% w/w relative to the weight of the beverage preparation, more preferably 3 to 18% w/w, even more preferably 3 to 15% w/w, and most preferred 3 to 10% w/w, wherein at least 85 w/w % of the protein is beta-lactoglobulin (BLG), preferably at least 90% w/w and
- optionally, sweetener and/or flavour,
- having a turbidity of at most 200 NTU, preferably at most 40 NTU.

In some preferred embodiments of the invention, the packaged, heat-treated beverage preparation having a pH in the range of 6.5-8.0, preferably 6.7-7.6, preferably 6.9-7.2, the beverage preparation comprising:

a total amount of protein of 3 to 20% w/w relative to the weight of the beverage preparation, more preferably 3 to 18% w/w, even more preferably 3 to 15% w/w, and most preferred 3 to 10% w/w, wherein at least 90 w/w % of the protein is beta-lactoglobulin (BLG), preferably at least 94% w/w, and optionally, sweetener and/or flavour, the beverage preparation having a turbidity of more than 200 NTU, preferably more than 400 NTU.

In some preferred embodiments of the invention, the packaged, heat-treated beverage preparation having a pH in the range of 5.5-6.2, preferably 5.7-6.1, preferably 5.8-6.0, the beverage comprises a total amount of protein of 1 to 20% w/w relative to the weight of the beverage preparation, wherein at least 85 w/w % of the protein is beta-lactoglobulin (BLG), preferably at least 90% w/w and optionally, sweetener and/or flavour, having a turbidity of more than 200 NTU, preferably more than 400 NTU.

In some preferred embodiments of the invention, the packaged, heat-treated beverage preparation having a pH in the range of 5.8-8.0, preferably 6.3-7.6, preferably 6.5-7.2 the beverage comprises a total amount of protein of 2 to 10.0% w/w relative to the weight of the beverage preparation, preferably a total amount of protein of 3.0-8.0% w/w relative to the weight of the beverage preparation, preferably a total amount of protein of 5.0-0.7.5% w/w relative to the weight of the beverage preparation, more preferably 4.0-6.0, wherein at least 85 w/w % of the protein is beta-lactoglobulin (BLG), preferably at least 90% w/w and optionally, sweetener and/or flavour.

In some preferred embodiments of the invention, the packaged, heat-treated beverage preparation having a pH in the range of 5.8-8.0, preferably 6.3-7.6, preferably 6.5-7.2 the beverage comprises a total amount of protein of 2 to 10.0% w/w relative to the weight of the beverage preparation, preferably 3.0-8.0, preferably 5.0-0.7.5, more preferably 4.0-6.0, wherein at least 85 w/w % of the protein is beta-lactoglobulin (BLG), preferably at least 90% w/w and optionally, sweetener and/or flavour, wherein the sum of the amounts of Magnesium and Calcium is at most 10 mM In some preferred embodiments of the invention, the packaged, heat-treated beverage preparation having a pH in the range of 5.8-8.0, preferably 6.3-7.6, preferably 6.5-7.2 the beverage comprises a total amount of protein of 2 to 10.0% w/w relative to the weight of the beverage preparation, preferably 3.0-8.0, preferably 5.0-0.7.5, more preferably 4.0-6.0, wherein at least 85 w/w % of the protein is beta-lactoglobulin (BLG), preferably at least 90% w/w and optionally, sweetener and/or flavour, comprises at most 100 mg phosphorus/100 g protein and at most 700 mg Potassium/100 g protein, preferably at most 50 mg phosphorus/100 g protein and at most 400 mg Potassium/100 g protein or preferably at most 10 mg phosphorus/100 g protein and at most 50 mg Potassium/100 g protein, A preferred embodiment of the invention pertains to a heat-treated beverage preparation obtainable by one or more methods described herein.

It should be noted that the embodiments and features described in the context of one of the aspects of the present invention also apply to the other aspects of the invention.

All patent and non-patent references cited in the present application are hereby incorporated by reference in their entirety.

The invention will now be described in further details in the following non-limiting examples.

Example 1: Methods of Analysis

Example 1.1: Determination of Protein Nativeness by Intrinsic Tryptophan Fluorescence Tryptophan (Trp) fluorescence spectroscopy is a well-described tool to monitor protein folding and unfolding. Trp residues buried within native proteins typically display highest fluorescence emission around 330 nm than when present in more solvent exposed positions such as unfolded proteins. In unfolded proteins, the wavelengths for Trp fluorescence emission typically shift to higher wavelengths and are often measured around 350 nm. We here exploit this transition to monitor thermally induced unfolding by calculating the ratio between fluorescence emission at 330 nm and 350 nm to investigate the influence of heating temperature.

The analysis comprises the following steps:

Beverage compositions were diluted to 0.6 mg/ml in MQ water.

300 µl sample was transferred to white 96-well plate avoiding bubbles or 3 mL was transferred to 10 mm quartz cuvette.

The tryptophan fluorescence emission intensity between 310 and 400 nm was recorded from the top by excitation at 295 using 5 nm slits.

Samples were measured at 22° C. using a Cary Eclipse fluorescence spectrophotometer equipped with a plate reader accessory (G9810A) or single cuvette holder.

The emission intensity ratio was calculated by dividing the measured fluorescence emission intensity at 330 nm with the emission intensity at 350 nm, $R=I330/I350$, and used as a measure of protein nativity.

R of at least 1.11 describes a predominant native BLG conformation and

R of less than 1.11 reports on at least partial unfolding and aggregation.

Example 1.2: Heat-Stability at pH 3.9

Heat-Stability at pH 3.9:

The heat-stability at pH 3.9 is a measure of the ability of protein composition to stay clear upon prolonged pasteurization at pH 3.9.

The heat-stability at pH 3.9 is determined by forming an aqueous solution having a pH of 3.9 and comprising 6.0% w/w protein by mixing a sample of the powder or liquid to be tested with water (or alternatively concentrating it by low temperature evaporation if it is a dilute liquid) and adjusting the pH to 3.9 with the minimum amount of 0.1 M NaOH or 0.1 M HCl required.

The pH-adjusted mixture is allowed to rest for 30 minutes after which 25 mL of the mixture is transferred to a 30 mL thin-walled glass test tube. It is heated to 75.0 degrees C. for 300 seconds by immersion into a water-bath having a temperature of 75.0 degrees C. Immediately after the heating, the glass test tube is cooled to 1-5 degrees C. by transferring it to an ice bath and the turbidity of the heat-treated sample is measured according to Example 1.7.

Example 1.3: Determination of the Degree of Protein Denaturation of a Whey Protein Composition Denatured whey protein is known to have a lower solubility at pH 4.6 than at pH values below or above pH 4.6, therefore the degree of denaturation of a whey protein composition is determined by measuring the amount of soluble protein at pH 4.6 relative to the total amount of protein at a pH where the proteins in the solution are stable.

More specifically for whey proteins, the whey protein composition to be analysed (e.g. a powder or an aqueous solution) is converted to:
a first aqueous solution containing 5.0% (w/w) total protein and having a pH of 7.0 or 3.0, and
a second aqueous solution containing 5.0% (w/w) total protein and having a pH of 4.6.

pH adjustments are made using 3% (w/w) NaOH (aq) or 5% (w/w) HCl (aq).

The total protein content ($P_{pH\ 7.0\ or\ 3.0}$) of the first aqueous solution is determined according to example 1.5.

The second aqueous solution is stored for 2 h at room temperature and subsequently centrifuged at 3000 g for 5 minutes. A sample of the supernatant is recovered and analysed according to Example 1.5 to give the protein concentration in the supernatant ($S_p$ H4.6).

The degree of protein denaturation, D, of the whey protein composition is calculated as:

$$D=((P_{pH\ 7.0\ or\ 3.0}-S_{pH\ 4.6})/P_{pH\ 7.0\ or\ 3.0})*100\%$$

Example 1.4 Determination of Protein Denaturation (with pH 4.6 Acid Precipitation) Using Reverse Phase UPLC Analysis BLG samples (such as non-heated reference and heated BLG beverage compositions) were diluted to 2% in MQ water. 5 mL protein solution, 10 mL Milli-Q, 4 mL 10% acetic acid and 6 mL 1.0 M NaOAc are mixed and stirred for 20 minutes to allow precipitation agglomeration of denatured protein around pH 4.6. The solution is filtered through 0.22 µm filter to remove agglomerates and non-native proteins.

All samples were subjected to the same degree of dilution by adding polished water.

For each sample, the same volume was loaded on an UPLC system with a UPLC column (Protein BEH C4; 300 Å; 1.7 µm; 150×2.1 mm) and detected at 214 nm.

The samples were run using the following conditions:
Buffer A: Milli-Q water, 0.1% w/w TFA
Buffer B: HPLC grade acetonitrile, 0.1% w/w TFA
Flow: 0.4 ml/min
Gradient: 0-6.00 minutes 24-45% B; 6.00-6.50 minutes 45-90% B; 6.50-7.00 minutes 90% B; 7.00-7.50 minutes 90-24% B and 7.50-10.00 minutes 24% B.

The area of BLG peaks against a protein standard (Sigma L0130) was used to determine the concentration of native BLG in samples (5 level calibration curve) Samples were diluted further and reinjected if outside linear range.

Example 1.5: Determination Total Protein

The total protein content (true protein) of a sample is determined by:

1) Determining the total nitrogen of the sample following ISO 8968-1/2|IDF 020-1/2—Milk—Determination of nitrogen content—Part 1/2: Determination of nitrogen content using the Kjeldahl method.

2) Determining the non-protein nitrogen of the sample following ISO 8968-4|IDF 020-4-Milk—Determination of nitrogen content—Part 4: Determination of non-protein-nitrogen content.

3) Calculating the total amount protein as $(m_{total\ nitrogen}-m_{non-protein-nitrogen})*6.38$.

Example 1.6: Determination of Non-Aggregated BLG, ALA, and CMP

The content of non-aggregated alpha-lactalbumin (ALA), beta-lactoglobulin (BLG) and caseinomacropeptide (CMP), respectively was analysed by HPLC analysis at 0.4 mL/min. 25 microL filtered sample is injected onto 2 TSKgel3000PW×1 (7.8 mm 30 cm, Tosohass, Japan) columns connected in series with attached pre-column PW×1 (6 mm×4 cm, Tosohass, Japan) equilibrated in the eluent (consisting of 465 g Milli-Q water, 417.3 g acetonitrile and 1 mL triflouroacetic acid) and using a UV detector at 210 nm.

Quantitative determination of the contents of native alpha-lactalbumin ($C_{alpha}$), beta-lactoglobulin ($C_{beta}$), and caseinomacropeptide ($C_{CMP}$) was performed by comparing the peak areas obtained for the corresponding standard proteins with those of the samples.

The total amount of additional protein (non-BLG protein) was determined by subtracting the amount of BLG from the amount of total protein (determined according to Example 1.5)

Example 1.7: Determination of Turbidity

Turbidity is the cloudiness or haziness of a fluid caused by large number of particles that are generally invisible to the naked eye, similar to smoke in air.

Turbidity is measured in nephelometric turbidity units (NTU).

20 mL beverages/samples were added to NTU-glass and placed in the Turbiquant® 3000 IR Turbidimeter. The NTU-value was measured after stabilisation and repeated twice.

Example 1.8: Determination of Viscosity

The viscosity of beverage preparations was measured using a Rheometer (Anton Paar, Physica MCR301).

3.8 mL sample was added to cup DG26.7. Samples were equilibrated to 22° C., then pre-sheared for 30 sec. at 50 s$^{-1}$, followed by a 30 sec. equilibrium time and shear rate sweeps between 1 s$^{-1}$ and 200 s$^{-1}$ and 1 s$^{-1}$ were performed.

The viscosity is presented in the unit centipoise (cP) at a shear rate of 100 s$^{-1}$ unless otherwise stated. The higher the measured cP values, the heiger the viscosity.

Alternatively, the viscosity was estimated using a Viscoman by Gilson and reported at a shear rate of about 300 s$^{-1}$

Example 1.9: Determination of Colour

The colour was measured using a Chroma Meter (Konica Minolta, CR-400). 15 g sample was added to a small petri dish (55×14.2 mm, VWR Cat #391-0895) avoiding bubble formation. The protein content of the samples was standardised to 6.0 w/w % protein or less.

The Chroma Meter was calibrated to a white calibration plate (No. 19033177). The illuminant was set to D65 and the observer to 2 degree. The color (CIELAB color space, a*-, b*-, L*-value) was measured with lids covering the suspension, as the average of three individual readings in different places of the petri dish.

Demineralised water reference has the following values:
L* 39.97±0.3
a* 0.00±0.06
b*−0.22±0.09

The measurements were converted to delta/difference values based on demineralised water measurement.

$$\text{delta } L^* = L_{sample\ standardised\ to\ 6.0\ w/w\ \%\ protein}^* - L_{demin.\ water}^*, \text{ measured at room temperature.}$$

$$\text{delta } a^* = a_{sample\ standardised\ to\ 6.0\ w/w\ \%\ protein}^* - a_{demin.\ water}^*, \text{ measured at room temperature.}$$

$$\text{delta } b^* = b_{sample\ standardised\ to\ 6.0\ w/w\ \%\ protein}^* - b_{demin.\ water}^*, \text{ measured at room temperature.}$$

The samples is standardized to 6.0 w/w % protein or below.

The L*a*b* colour space (also referred to as the CIELAB space) is one of the uniform colour spaces defined by the International Commission on Illumination (CIE) in 1976 and was used to quantitatively report lightness and hue (ISO 11664-4:2008(E)/CIE S 014-4/E:2007).

In this space, L* indicates lightness (value from 0-100), the darkest black at L*=0, and the brightest white at L*=100.

The colour channels a* and b*, represent true neutral grey values at a*=0 and b*=0. The a* axis represents the green-red component, with green in the negative direction and red in the positive direction. The b* axis represents the blue-yellow component, with blue in the negative direction and yellow in the positive direction.

Example 1.10 Beverage Stability Test/Insoluble Protein Matter

Whey protein beverage compositions were considered stable if less than 15% of total protein in heated samples precipitated upon centrifugation at 3000 g for 5 minutes:

Approx. 20 g samples were added to centrifuge tubes and centrifugated at 3000 g 5 min Kjeldahl analysis of protein before centrifugation and the supernatant after centrifugation were used to quantify protein recovery See example 1.5

The loss of protein is calculated:

$$\text{Denaturation}\% = \left(\frac{P_{total} - P_{3000xg}}{P_{total}}\right) * 100\%$$

This parameter is also sometimes referred to as the level of insoluble protein matter and can be used for analyzing both liquid and powder samples. If the sample is a powder, 10 g of the powder is suspended in 90 g demineralized water and allowed to hydrate at 22 degrees C. under gentle stirring for 1 hours. Approx. 20 g of sample (e.g. liquid sample or the suspended powder sample) to centrifuge tubes and centrifugated at 3000 g 5 min. Kjeldahl analysis of protein before centrifugation ($P_{total}$) and the supernatant after centrifugation ($P_{3000xg}$) were used to quantify protein recovery according to Example 1.5.

The amount of insoluble protein matter is calculated:

$$\text{percentage of insoluble protein matter} = \left(\frac{P_{total} - P_{3000xg}}{P_{total}}\right) * 100\%$$

Example 1.11: Measurement of Gel Strength Upon Acidification

In order to simulate the structure development of a beverage in the stomach during the acidification a rheometer (Anton Paar, Physica MCR301) was used. The beverages were diluted to 2 w/w % protein and temperated to 42° C. for 30 min. Afterward 1 w/w % GDL (D-Gluconic acid, Sigma Aldrich, wt. 49-53%) was added to the solution and stirred for 5 min. The solution (19.6 mL) was added to the cup CC27-SS in the rheometer. The rheometer was equilibrated to 42° C. and G' (storage modulus, Pa) was measured for 60 min. at 0.1 Hz and 0.5% strain. The pH during the acidification was followed by using a pH-logger (WTW, Multi 3410).

Example 1.12: Determination of Transparency by Imaging

Photographs of beverage preparations were conducted by placing samples in turbidity NTU measuring vials touching a piece of paper with 'lorem ipsum' text. Vials were photographed using a smartphone and the inventors evaluated whether the text could be clearly observed through the vial.

Example 1.13: Determination of Ash Content

The ash content of a food product is determined according to NMKL 173:2005 "Ash, gravimetric determination in foods".

Example 1.14: Determination of Conductivity

The "conductivity" (sometimes referred to as the "specific conductance") of an aqueous solution is a measure of the ability of the solution to conduct electricity. The conductivity may e.g. be determined by measuring the AC resistance of the solution between two electrodes and the result is typically given in the unit milliSiemens per cm (mS/cm). The conductivity may for example be measured according to the EPA (the US Environmental Protection Agency) Method No. 120.1.

Conductivity values mentioned herein have been normalised to 25 degrees C. unless it is specified otherwise.

The conductivity is measured on a Conductivity meter (WTW Cond 3210 with a tetracon 325 electrode).

The system is calibrated as described in the manual before use. The electrode is rinsed thoroughly in the same type of medium as the measurement is conducted on, in order to avoid local dilutions. The electrode is lowered into the medium so that the area where the measurement occurs is completely submerged. The electrode is then agitated so that any air trapped on the electrode is removed. The electrode is then kept still until a stable value can be obtained and recorded from the display.

Example 1.15: Determination of the Total Solids of a Solution

The total solids of a solution may be determined according NMKL 110 $2^{nd}$ Edition, 2005 (Total solids (Water)—

Gravimetric determination in milk and milk products). NMKL is an abbreviation for "Nordisk Metodikkomité for Næringsmidler".

The water content of the solution can be calculated as 100% minus the relative amount of total solids (% w/w).

Example 1.16: Determination of pH

All pH values are measured using a pH glass electrode and are normalised to 25 degrees C. The pH glass electrode (having temperature compensation) is rinsed carefully before and calibrated before use.

When the sample is in liquid form, then pH is measured directly in the liquid solution at 25 degrees C.

When the sample is a powder, 10 gram of a powder is dissolved in 90 ml of demineralised water at room temperature while stirring vigorously. The pH of the solution is then measured at 25 degrees C.

Example 1.17: Determination of Loose Density and Bulk Density

The density of a dry powder is defined as the relation between weight and volume of the powder which is analysed using a special Stampf volumeter (i.e. a measuring cylinder) under specified conditions. The density is typically expressed in g/ml or kg/L.

In this method, a sample of dried powder is tamped in a measuring cylinder. After a specified number of tappings, the volume of the product is read and the density is calculated.

Three types of densities can be defined by this method:
Poured density, which is the mass divided with the volume of powder after it has been transferred to the specified measuring cylinder.
Loose density, which is the mass divided with the volume of powder after 100 tappings according to the specified conditions in this standard.
Bulk density, which is the mass divided with the volume of powder after 625 tappings according to the specified conditions in this standard.

The method uses a special measuring cylinder, 250 ml, graduated 0-250 ml, weight 190±15 g (J. Engelsmann A. G. 67059 Ludwigshafen/Rh) and a Stampf volumeter, e.g. J. Engelsmann A. G.

The loose density and the bulk density of the dried product are determined by the following procedure.
Pre-treatment:
The sample to be measured is stored at room temperature.
The sample is then thoroughly mixed by repeatedly rotating and turning the container (avoid crushing particles). The container is not filled more than ⅔.
Procedure:
Weigh 100.0±0.1 gram of powder and transfer it to the measuring cylinder. The volume $V_0$ is read in ml.
If 100 g powder does not fit into the cylinder, the amount should be reduced to 50 or 25 gram.
Fix the measuring cylinder to the Stampf volumeter and let it tap 100 taps. Level the surface with the spatula and read the volume $V_{100}$ in ml.
Change the number of tabs to 625 (incl. the 100 taps). After tapping, level the surface and read the volume $V_{625}$ in ml.
Calculation of Densities:
Calculate the loose and the bulk densities expressed in g/ml according to the following formula:

Bulk density=$M/V$ where M designates weighed sample in grams and V designates volume after 625 tappings in ml.

Example 1.18: Determination of the Water Content of a Powder

The water content of a food product is determined according to ISO 5537:2004 (Dried milk—Determination of moisture content (Reference method)). NMKL is an abbreviation for "Nordisk Metodikkomité for Næringsmidler".

Example 1.19: Determination of the Amounts of Calcium, Magnesium, Sodium, Potassium, Phosphorus (ICP-MS Method)

The total amounts of calcium, magnesium, sodium, potassium, and phosphorus are determined using a procedure in which the samples are first decomposed using microwave digestion, and then the total amount of mineral(s) is determined using an ICP apparatus.
Apparatus:
The microwave is from Anton Paar and the ICP is an Optima 2000DV from PerkinElmer Inc.
Materials:
1 M $HNO_3$
Yttrium in 2% $HNO_3$
Suitable standards for calcium, magnesium, sodium, potassium, and phosphorus in 5% $HNO_3$
Pre-Treatment:
Weigh out a certain amount of powder and transfer the powder to a microwave digestion tube. Add 5 mL 1 M $HNO_3$. Digest the samples in the microwave in accordance with microwave instructions. Place the digested tubes in a fume cupboard, remove the lid and let volatile fumes evaporate.
Measurement Procedure:
Transfer pre-treated sample to DigiTUBE using a known amount of Milli-Q water. Add a solution of yttrium in 2% $HNO_3$ to the digestion tube (about 0.25 mL per 50 mL diluted sample) and dilute to known volume using Milli-Q water. Analyse the samples on the ICP using the procedure described by the manufacturer.
A blind sample is prepared by diluting a mixture of 10 mL 1 M $HNO_3$ and 0.5 mL solution of yttrium in 2% $HNO_3$ to a final volume of 100 mL using Milli-Q water.
At least 3 standard samples are prepared having concentrations which bracket the expected sample concentrations.
The detection limit for liquid samples is 0.005 g/100 g sample for Ca, Na, K and Phosphor and 0.0005 g/100 g sample for Mg. The detection limit for powder samples is 0.025 g/100 g sample for Ca, Na, K and Pho and 0.0005 g/100 g sample for Mg.
When at or below detection limits of Phosphor the value of the detection limit is used in examples to demonstrate the maximum amount of Pho present as a worst-case scenario.

Example 1.20: Determination of the Furosine-Value

The furosine value is determined as described in "Maillard Reaction Evaluation by Furosine Determination During Infant Cereal Processing", Guerra-Hernandez et al, Journal of Cereal Science 29 (1999) 171-176, and the total amount of protein is determined according to Example 1.5. The furosine value is reported in the unit mg furosine per 100 g protein.

Example 1.21: Determination of the Crystallinity of BLG in a Liquid

The following method is used to determine the crystallinity of BLG in a liquid having a pH in the range of 5-6.

a) Transfer a 10 mL sample of the liquid in question to a Maxi-Spin filter with a 0.45 micron pore size CA membrane.

b) Immediately spin the filter at 1500 g for 5 min. keeping the centrifuge at 2 degrees C.

c) Add 2 mL cold Milli-Q water (2 degrees C.) to the retentate side of the spin filter and immediately, spin the filter at 1500 g for 5 min while keeping the centrifuge cooled at 2 degrees C., collect the permeate (permeate A), measure the volume and determine BLG concentration via HPLC using the method outlined in Example 1.31.

d) Add 4 mL 2 M NaCl to the retentate side of the filter, agitate quickly and allow the mixture to stand for 15 minutes at 25 degrees C.

e) Immediately spin the filter at 1500 g for 5 min and collect the permeate (permeate B)

f) Determine the total weight of BLG in permeate A and permeate B using the method outlined in Example 1.31 and convert the results to total weight of BLG instead of weight percent. The weight of BLG in permeate A is referred to as $m_{Permeate\ A}$ and the weight of BLG in permeate B is referred to as $m_{Permeate\ B}$.

g) The crystallinity of the liquid with respect to BLG is determined as:

$$\text{crystallinity} = m_{Permeate\ B}/(m_{Permeate\ A} + m_{Permeate\ B}) * 100\%$$

Example 1.22: Determination of the Crystallinity of BLG in a Dry Powder

This method is used to determine the crystallinity of BLG in a dry powder.

a) 5.0 gram of the powder sample is mixed with 20.0 gram of cold Milli-Q water (2 degrees C.) and allowed to stand for 5 minute at 2 degrees C.

b) Transfer the sample of the liquid in question to a Maxi-Spin filter with a 0.45 micron CA membrane.

c) Immediately spin the filter at 1500 g for 5 min. keeping the centrifuge at 2 degrees C.

d) Add 2 mL cold Milli-Q water (2 degrees C.) to the retentate side of the spin filter and immediately, spin the filter at 1500 g for 5 min, collect the permeate (permeate A), measure the volume and determine BLG concentration via HPLC using the method outlined in Example 1.31 and convert the results to total weight of BLG instead of weight percent. The weight of BLG in permeate A is referred to as $m_{permeate\ A}$ e) The crystallinity of BLG in the powder is then calculated using the following formula:

$$\text{crystallinity} = \frac{m_{BLG\ total} - m_{permeate\ A}}{m_{BLG\ total}} * 100\%$$

where $m_{BLG\ total}$ is the total amount of BLG in the powder sample of step a).

If the total amount of BLG of powder sample is unknown, this may be determined by suspending another 5 g powder sample (from the same powder source) in 20.0 gram of Milli-Q water, adjusting the pH to 7.0 by addition of aqueous NaOH, allowing the mixture to stand for 1 hour at 25 degrees C. under stirring, and finally determining the total amount of BLG of the powder sample using Example 1.31.

Example 1.23: Determination of UF Permeate Conductivity 15 mL of sample is transferred to an Amicon Ultra-15 Centrifugal Filter Units with a 3 kDa cut off (3000 NMWL) and centrifugated at 4000 g for 20-30 minutes or until a sufficient volume of UF permeate for measuring conductivity is accumulated in the bottom part of the filter units. The conductivity is measured immediately after centrifugation. The sample handling and centrifugation are performed at the temperature of the source of the sample.

Example 1.24: Detection of Dried BLG Crystals in a Powder

The presence of dried BLG crystals in a powder can be identified the following way:

A sample of the powder to be analysed is re-suspended and gently mixed in demineralised water having a temperature of 4 degrees C. in a weight ratio of 2 parts water to 1 part powder, and allowed to rehydrate for 1 hour at 4 degrees C.

The rehydrated sample is inspected by microscopy to identify presence of crystals, preferably using plan polarised light to detect birefringence.

Crystal-like matter is separated and subjected to x-ray crystallography in order verify the existence of crystal structure, and preferably also verifying that the crystal lattice (space group and unit cell dimensions) corresponds to those of a BLG crystal.

The chemical composition of the separated crystal-like matter is analysed to verify that its solids primarily consists of BLG.

Example 1.25: Determination of the Total Amount of Lactose

The total amount of lactose is determined according to ISO 5765-2:2002 (IDF 79-2: 2002) "Dried milk, dried ice-mixes and processed cheese—Determination of lactose content—Part 2: Enzymatic method utilizing the galactose moiety of the lactose".

Example 1.26: Determination of the Total Amount of Carbohydrate

The amount of carbohydrate is determined by use of Sigma Aldrich Total Carbohydrate Assay Kit (Cat MAK104-1KT) in which carbohydrates are hydrolysed and converted to furfural and hydroxyfurfurals which are converted to a chromagen that is monitored spectrophotometrically at 490 nm.

Example 1.27: Determination of the Total Amount of Lipids

The amount of lipid is determined according to ISO 1211:2010 (Determination of Fat Content—Röse-Gottlieb Gravimetric Method).

Example 1.28: Determination of Brix

Brix measurements were conducted using a PAL-α digital hand-held refractometer (Atago) calibrated against polished water (water filtered by reverse osmosis to obtain a conductivity of at most 0.05 mS/cm).

Approx. 500 µl of sample was transferred to the prism surface of the instrument and the measurement was started. The measured value was read and recorded.

The Brix of a whey protein solution is proportional to the content of total solids (TS) and TS (% w/w) is approx. Brix*0.85.

Example 1.29 Determination of Lactoferrin and Lactoperoxidase

The concentration of lactoferrin is determined by an ELISA immunoassay as outlined by Soyeurt 2012 (Soyeurt et al; Mid-infrared prediction of lactoferrin content in bovine milk: potential indicator of mastitis; Animal (2012), 6:11, pp 1830-1838)

The concentration of lactoperoxidase is determined using a commercially available bovine lactoperoxidase kit.

Example 1.30: Determination the Number of Colony-Forming Units

The determination of the number of colony-forming units per gram sample is performed according to ISO 4833-1: 2013(E): Microbiology of food and animal feeding stuffs—horizontal method for the enumeration of microorganisms—Colony-count technique at 30° C.

Example 1.31: Determination of the Total Amount of BLG, ALA, and CMP

This procedure is a liquid chromatographic (HPLC) method for the quantitative analysis of proteins such as ALA, BLG and CMP and optionally also other protein species in a composition. Contrary to the method of Example 1.6 the present method also measures proteins that are present in aggregated and therefore provides a measure of the total amount of the protein species in the composition in question.

The mode of separation is Size Exclusion Chromatography (SEC) and the method uses 6 M Guanidine HCl buffer as both sample solvent and HPLC mobile phase. Mercaptoethanol is used as a reducing agent to reduce the disulphide (S-S) in the proteins or protein aggregates to create unfolded monomeric structures.

The sample preparation is easily achieved by dissolving 10 mg protein equivalent in the mobile phase.

Two TSK-GEL G3000SWXL (7.7 mm×30.0 cm) columns (GPC columns) and a guard column are placed in series to achieve adequate separation of the major proteins in raw materials.

The eluted analytes are detected and quantified by UV detection (280 nm).

Equipment/Materials:
1. HPLC Pump 515 with manual seal wash (Waters)
2. HPLC Pump Controller Module II (Waters)
3. Autosampler 717 (Waters)
4. Dual Absorbance Detector 2487 (Waters)
5. Computer software capable of generating quantitative reports (Empower 3, Waters)
6. Analytical column: Two TSK-GEL G3000SWXL (7.8× 300 mm, P/N: 08541). Guard Column: TSK-Guard Column SWxL (6.0×40 mm, P/N: 08543).
7. Ultrasonic Bath (Branson 5200)
8. 25 mm Syringe filter with 0.2 µm Cellulose Acetate membrane. (514-0060, VWR)

Procedure:
Mobile Phase:
A. Stock Buffer Solution.
 1. Weigh 56.6 g of $Na_2HPO_4$, 3.5 g of $NaH_2PO_4$, and 2.9 g of EDTA in to a 1000 mL beaker. Dissolve in 800 mL of water.
 2. Measure pH and adjust to 7.5±0.1, if necessary, with HCl (decrease pH) or NaOH (increase pH).
 3. Transfer to a 1000 mL volumetric flask and dilute to volume with water.
B. 6 M Guanidine HCl Mobile Phase.
 1. Weigh 1146 g of Guanidine HCl in to a 2000 mL beaker, and add 200 mL of the stock buffer solution (A)
 2. Dilute this solution to about 1600 mL with water while mixing with a magnetic stir bar (50° C.)
 3. Adjust the pH to 7.5±0.1 with NaOH.
 4. Transfer into a 2000 mL volumetric flask and dilute to volume with water.
 5. Filter using the solvent filtration apparatus with the 0.22 µm membranefilter.

Calibration Standards.

Calibration standards of each protein to be quantified are prepared the following way:
1. Weigh accurately (to 0.01 mg) about 25 mg of the protein reference standard into a 10 mL volumetric flask and dissolve in 10 mL of water.
 This is the protein stock standard solution (S1) of the protein
2. Pipette 200 µl of S1 into a 20 ml volumetric flask and dilute to volume with mobile phase.
 This is the low working standard solution WS1.
3. Pipette 500 µL of S1 into a 10 mL volumetric flask and dilute to volume with mobile phase.
 This is standard solution WS2.
4. Pipette 500 µL of S1 into a 5 mL volumetric flask and dilute to volume with mobile phase.
 This is standard solution WS3.
5. Pipette 750 µL of S1 into a 5 mL volumetric flask and dilute to volume with mobile phase.
 This is standard solution WS4.
6. Pipette 1.0 mL of S1 into a 5 mL volumetric flask and dilute to volume with mobile phase.
 This is the high working standard solution WS5.
7. Using graduated disposable pipettes transfer 1.5 mL of WS1-5 into separate vials.
 Add 10 µL of 2-mercaptoethanol to each vial and cap. Vortex the solutions for 10 sec.
 Let the standards stay at ambient temperature for about 1 hr.
8. Filter the standards using 0.22 µm Cellulose Acetate syringe filters.

The purity of protein is measured using Kjeldahl (N×6.38) and the area % from standard solution WS5 using the HPLC.

protein (mg)="protein standard weight" (mg)×$P1$×$P2$

P1=P % (Kjeldahl)
P2=protein area % (HPLC)

Sample Preparation
1. Weigh the equivalent of 25 mg of protein of the original sample into a 25 mL volumetric flask.
2. Add approximately 20 mL of mobile phase and let the sample dissolve for about 30 min.
3. Add mobile phase to volume and add 167 µL of 2-mercaptoethanol to the 25 ml sample solution.
4. Sonicate for about 30 min and afterwards let the sample stay at ambient temperature for about 1½ hours.

5. Mix the solution and filter using 0.22 μl Cellulose Acetate syringe filters.

HPLC System/Columns
Column Equilibration
1. Connect the GPC guard column and the two GPC analytical columns in series.
New columns are generally shipped in a phosphate-salt buffer.
2. Run water through a new column gradually from 0.1 to 0.5 mL/min in 30 to 60 mins.
Continue flushing for about 1 hour.
3. Gradually decrease flow rate from 0.5 mL/min to 0.1 mL/min and replace with mobile phase in the reservoir.
4. Increase pump flow rate gradually from 0.1 to 0.5 mL/min in 30 to 60 mins to avoid pressure shock and leave at 0.5 mL/min.
5. Inject ten samples to allow the column to be saturated and wait for the peaks to elute.
This will aid in the conditioning of the column.
This step is done without the need of waiting for each injection to be complete before injecting the next.
6. Equilibrate with the mobile phase at least 1 hour.

Calculation of the Results

Quantitative determination of the contents of the proteins to be quantified, e.g. alpha-lactalbumin, beta-lactoglobulin, and caseinomacropeptide, is performed by comparing the peak areas obtained for the corresponding standard proteins with those of the samples. The results are reported as g specific protein/100 g of the original sample or weight percentage of the specific protein relative to the weight of the original sample.

Example 1.32: Quantification of the Amount of Microgels, Protein Nanogels, Soluble Whey Protein Aggregates and Native Protein The quantification of the amount of insoluble protein matter, protein nanogels, soluble whey protein aggregates and native protein in a beverage or powder sample is performed using the following steps:
a) The sample to be tested is converted (by mixing with demineralized water or by concentration) to a solution containing 20 g total protein/L (e.g. by dilution with demineralized water or by concentration) and the concentration of total protein is verified by measurement of total protein in an aliquot of the solution using Example 1.5 and reported as $c_a$.
b) A first aliquot of the solution of a) is centrifuged at 3.000×g for 5 minutes to precipitate insoluble protein matter and the concentration of protein in the supernatant is subsequently measured as described in step a) and the total amount of protein of the supernatant is reported as $c_b$. The content of insoluble protein aggregates (percent relative to total protein) is calculated as $(c_a-c_b)/c_a*100$.
c) A second aliquot of the solution of a) is centrifuged at 50.000×g for 1 hour to precipitate both insoluble protein matter and protein nanogels and the concentration of protein in the supernatant is measured as described in step a) and reported as $c_c$. The protein nanogel fraction is calculated as $(c_a-c_c)/c_a*100-(c_a-c_b)/c_a*100$
d) A third aliquot is adjusted to pH 4.6 to precipitate all denatured and/or aggregated protein in the sample. The sample is left for 15 minutes at room temperature followed by centrifugation at 50.000×g for 1 hour to separate the precipitate. The concentration of total protein (primarily native protein) of the resulting supernatant is measured as described in step a) and reported as $c_d$.

The fraction of soluble whey protein aggregates in the solution is calculated as $(c_a-c_d)/c_a*100-(c_a-c_c)/c_a*100$.

The fraction of native protein on the solution is calculated as $c_d/c_a*100$.

If the absolute concentrations of insoluble protein matter, protein nanogels, soluble whey protein aggregates and/or native protein of the original sample are required, these are easily calculated by using the information on how much original sample that was used to produce the solution of step a).

All centrifugation steps are done at 25° C. using a Beckmann Coulter Avanti JXN-30 centrifuge equipped with a JA-30.50 rotor and using 50 mL sample in 50 mL Beckmann centrifuge tube (29×103 mm).

Example 1.33: Hydrodynamic Diameter

The hydrodynamic diameter (mean intensity size (d·nm)) of the protein particles was determined by dynamic light scattering using a Nanosizer (Malvern). 800 μL demineralized water and 5 μL of the heat treated protein beverage was mixed and added to a UV-cuvette. The size measurement was performed at room temperature (22° C.).

Example 2: Production of a Spray-Dried, Acidic BLG Isolate Powder

Whey Protein Feed

Lactose-depleted UF retentate derived from sweet whey from a standard cheese production process was filtered through a 1.2 micron filter and had been fat-reduced via a Synder FR membrane prior to being used as feed for the BLG crystallisation process. The chemical composition of the feed can be seen in Table 1. We note that all weight percentages of specific proteins, such as BLG, ALA, mentioned in this Example pertain to the weight percentage of the non-aggregated proteins relative to total protein.

Conditioning

The sweet whey feed was conditioned on an ultrafiltration setup at 20 degrees C., using a Koch HFK-328 type membrane (70 m² membrane) with a 46 mill spacer feed pressure 1.5-3.0 bar, to a feed concentration of 21% total solids (TS) ±5, and using as diafiltration medium polished water (water filtered by reverse osmosis to obtain a conductivity of at most 0.05 mS/cm). The pH was then adjusted by adding HCl so that the pH was approx. 5.5. Diafiltration continued until the drop in conductivity of the retentate was below 0.1 mS/cm over a 20 min period. The retentate was then concentrated until the permeate flow was below 1.43 L/h/m². A first sample of concentrated retentate was taken and subjected to centrifugation at 3000 g for 5 minutes. The supernatant of the first sample was used for the determination of BLG yield.

Crystallisation

The concentrated retentate was transferred to a 300 L crystallisation tank where it was seeded with pure BLG crystal material made from rehydrated, spray-dried BLG crystals. Subsequently, the seeded whey protein solution was cooled from 20 degrees C. to approx. 6 degrees C. over approx. 10 hours to allow the BLG crystals to form and grow.

After cooling, a sample of the crystal-containing whey protein solution (the second sample) was taken and the BLG crystals were separated by centrifugation at 3000 g for 5 minutes. The supernatant and crystal pellets from the second sample were subjected to HPLC analysis as described below. The yield of crystallisation was calculated as outlined below and determined to 57%.

TABLE 1

Chemical composition of the feed

Feed standardized to 95% total solids
Protein composition % w/w of total protein

| | |
|---|---|
| ALA | 10.2 |
| BLG | 59.6 |
| Other proteins | 30.2 |

Selected other components % w/w

| | |
|---|---|
| Ca | 0.438 |
| K | 0.537 |
| Mg | 0.077 |
| Na | 0.131 |
| Pho | 0.200 |
| Fat | 0.220 |
| protein concentration | 87 |

BLG Yield Determination Using HPLC:

The supernatants of the first and second samples were subjected to the same degree of dilution by adding polished water and the diluted supernatants were filtered through a 0.22 μm filter. For each filtered and diluted supernatant the same volume was loaded on an HPLC system with a Phenomenex Jupiter® 5 μm C4 300 Å, LC Column 250×4.6 mm, Ea. and detected at 214 nm.

The samples were run using the following conditions:
Buffer A: MilliQ water, 0.1% w/w TFA
Buffer B: HPLC grade acetonitrile, 0.085% w/w TFA
Flow: 1 mL/min
Column temperature: 40 degrees C.
Gradient: 0-30 minutes 82-55% A and 18-45% B; 30-32 minutes 55-10% A and 45-90% B; 32.5-37.5 minutes 10% A and 90% B; 38-48 minutes 10-82% A and 90-18% B.

Data Treatment:

As both supernatants were treated in the same way, one can directly compare the area of the BLG peaks to calculate a relative yield. As the crystals only contain BLG and the samples all have been treated in the same way, the concentration of alpha-lactalbumin (ALA) and hence the area of ALA should be the same in all of the samples. Therefore, the area of ALA before and after crystallisation is used as a correction factor (cf) when calculating the relative yield.

$$cf_\alpha = \frac{\text{area of } ALA_{before\ crystallization}}{\text{area of } ALA_{after\ crystallization}}$$

The relative yield is calculated by the following equation:

$$Yield_{BLG} = \left(1 - \frac{cf_\alpha \times \text{area of } BLG_{after\ crystallization}}{\text{area of } BLG_{before\ crystallization}}\right) \times 100$$

Acid Dissolution of BLC Crystals

The remainder of the material from the crystallisation tank was separated using a decanter at 350 g, 2750 RPM, 150 RPM Diff. with a 64 spacer and a feed flow of 75 L/h before separation the feed was mixed 1:2 with polished water. The BLG crystal/solid phase from the decanter was then mixed with polished water in order to make it into a thinner slurry before a phosphoric acid was added to lower the pH to approx. 3.0 in order to quickly dissolve the crystals.

After dissolving the BLG crystals, the pure BLG protein liquid was concentrated to 15 Brix on the same UF setup as used to prepare the feed for crystallisation and the pH was adjusted to final pH of approx. 3.8. The liquid BLG isolate was then heated to 75 degrees for 5 minutes and subsequently cooled to 10 degrees C. The heat-treatment was found to reduce the microbial load from 137.000 CFU/g prior to the heat-treatment to <1000 CFU/g after the heat-treatment. The heat-treatment did not cause any protein denaturation and the intrinsic tryptophan fluorescence ratio (I330 nm/I350 nm) was determined to 1.20 indicating native confirmation of the BLG molecules.

The BLG was dried on a pilot plant spray drier with an inlet temperature of 180 degrees C. and an exit temperature of 75 degrees C. The resulting powder sampled at the exit had a water content of approx. 4% w/w, the chemical composition of the powder is shown in table 2. A sample of the dried powder was dissolved and the degree of protein denaturation was determined to 1.5% and the intrinsic tryptophan fluorescence emission ratio (I330/I350) was measured to 1.20.

TABLE 2

The composition of the BLG isolate powder
BLG isolate powder standardized to 95% total solids Protein composition % w/w of total protein

| | |
|---|---|
| ALA | 0.4 |
| BLG | 98.2 |
| Other protein | 1.4 |

Other selected components (% w/w)

| | |
|---|---|
| Ca | BDL |
| K | BDL |
| Mg | BDL |
| Na | BDL |
| Pho | 0.781 |
| fat | 0.09 |
| protein concentration | 90 |

(BDL = below the detection limit)

The bulk density (625 taps) of the spray-dried powder was estimated at 0.2-0.3 g/cm³.

Example 3: Production of a Spray-Dried, pH-Neutral BLG Isolate Powder

When using the same protocol and experimental setup as in Example 2, the lactose-reduced whey protein isolate shown in Table 3 was conditioned and used for feed for crystallisation. The yield of crystallisation was calculated to be 68%.

We note that all weight percentages of specific proteins, such as BLG and ALA, mentioned in this Example pertain to the weight percentage of the non-aggregated proteins relative to total protein.

TABLE 3

Composition of the feed

FEED standardized to 95% total solids
Protein composition
(% w/w of total protein)

| | |
|---|---|
| ALA | 9.1 |
| BLG | 59.1 |
| Other protein incl. CMP | 31.6 |

Other selected components (% w/w)

| | |
|---|---|
| Ca | 0.445 |
| K | 0.574 |
| Mg | 0.074 |
| Na | 0.128 |
| Pho | 0.211 |
| fat | 0.513 |
| protein concentration | 84 |

The remainder of the material from the crystallisation tank was separated on a decanter at 350 g, 2750 RPM, 150 RPM Diff. with a 64 spacer and a feed flow of 75 L/h. before separation the feed was mixed 1:2 with polished water. The BLG crystal/solid phase from the decanter was then mixed with polished water in order to make it into a thinner slurry before 0.1 M potassium hydroxide was added to adjust the pH to approx. 7 in order to quickly dissolve the crystals.

After dissolving the crystals, the pure BLG protein liquid was concentrated to bx. 15 on the same UF setup as used to prepare the whey protein solution for crystallisation and the pH was adjusted to the final pH of 7.0. The BLG was dried on a pilot plant spray drier with an inlet temperature of 180 degrees C. and an exit temperature of 75 degrees C. The resulting powder sampled at the exit had a water content of approx. 4% w/w. The composition of the powder is shown in Table 4. After drying, some of the powder was dissolved in demineralized water and the degree of protein denaturation was determined to 9.0% and the intrinsic tryptophan fluorescence ratio (330 nm/350 nm) was 1.16.

TABLE 4

Chemical composition of the BLG isolate powder.

BLG isolate powder standardized to 95% total solids
Protein composition % w/w of total protein

| | |
|---|---|
| ALA | 0.2 |
| BLG | 98.9 |
| Other protein | 0.9 |

Other selected components (% w/w)

| | |
|---|---|
| Ca | 0.003 |
| K | 2.343 |
| Mg | BDL |
| Na | BDL |
| P | 0.629 |
| Fat | 0.329 |
| Protein concentration | 88 |

BDL = below detection limit.

The bulk density (625 taps) of the spray-dried powder was estimated at 0.2-0.3 g/cm$^3$

Example 4: Preparation of a Generic Whey Protein Beverage

Dried BLG isolate protein powders containing ≥85% BLG on protein basis are dispersed in up to about 95% of the demineralized water required to reach the desired final protein concentration. pH-neutral BLG isolate powders are produced as outlined in example 3 while pH 5.5 BLG isolate powder are produced as outlined in example 7 of PCT/EP2017/084553.

Optionally, minerals, sweeteners, flavours, stabilizers, emulsifiers or other components can be added also including sources of fats and carbohydrates.

pH is adjusted to the final pH using 10% NaOH or 10% phosphoric acid (or other food grade acid).

Remaining water is added to reach desired protein concentration and the composition is optionally homogenized.

For comparison, whey protein isolate replace the ≥85% BLG product in the making of reference samples while preserving remaining steps.

Samples were stored at 20° C. in a dark environment.

Example 5: Thermal Treatment of Whey Protein Compositions

Thermal treatment was conducted using plate heat exchanger or tubular heat exchanger (Manufacturer: OMVE HTST/UHT pilot plant HT320-20) by heating at 143° C. for 2 to 6 seconds (High temperature, short time (HTST).

Heat treated beverage compositions were tapped at 10° C. into 100 mL sterile bottles and immediately sealed.

In other experiments, the thermal treatment was conducted by transfer of the whey protein source to thin-walled glass vials containing 15-30 mL samples. Vials immersed for 1 to 18 minutes in water baths preequilibrated at the target temperature ranging from 86° C. to 95° C. and followed by cooling on ice.

Example 6: Production of Heat Treated Beverage Preparation

In the present example BLG beverages and WPI beverages comprising 6% protein and having a pH of 7.0 were prepared.

The BLG beverages were prepared by dissolving a diafiltered pH 7.0 BLG isolate Powder in demineralized water at 10 degrees C.

For comparison WPI samples were prepared using WPI-A. WPI-A was dissolved in demineralized water at 10 degrees C. 10% NaOH was slowly added to the solution. The final pH was adjusted to pH 7.0.

The solutions were heat treated for 143° C./4 seconds using a plate heat exchanger as described in example 5 and tapped to provide a heat sterilised whey protein beverage composition.

Below in table 5 is given the composition of the BLG powder used for the preparation of the beverage preparation, for comparison the composition of the WPI is also listed.

TABLE 5

Composition of BLG powder (pH 7.0 powder) and WPI powder.

| Description | Dry B-LG | WPI-A |
|---|---|---|
| A-LA (w/w %) | 0.2 | 8 |
| B-LG (w/w %) | 88.6 | 61 |
| Ash | 5.36 | 3.7 |
| Ca | BDL | 0.072% |
| Lipid | 0.33 | <0.1 |
| K | 2.36 | 1.14 |
| Mg | BDL | 0.0075 |
| Na | BDL | 0.484 |

TABLE 5-continued

Composition of BLG powder (pH 7.0 powder) and WPI powder.

| Description | Dry B-LG | WPI-A |
|---|---|---|
| Phosphorous | 0.63 | 0.214 |
| Protein | 88.31 | 89.5 |
| pH | 7.0 | 6.7 |

(BDL = below the detection limit).

Example 7: Colourless and Transparent Whey Protein Beverage Containing >85% BLG Beverage preparations were prepared wherein about 92% w/w of the proteins is BLG, see example 4.

For comparison whey protein samples based on WPI powder comprising about 61% w/w BLG were prepared.

The samples had a protein content of 6% w/w. pH was adjusted to pH 7.0 using NaOH.

The preparations were thermally treated at 143 degrees C. for 4 seconds.

Turbidity, viscosity, colour and transparency of the preparations were measured according to the procedures described in examples 1.7, 1.8, 1.9.

The results are presented in table 6 below.

TABLE 6

Properties of BLG and WPI beverage.

| pH 7.0 | WPI-A | BLG |
|---|---|---|
| Turbidity NTU | 26.17 | 17.38 |
| L* | 39.31 | 39.98 |
| a | −0.02 | 0.03 |
| b | 0.46 | 0.01 |
| ΔL* (sample - water) | −0.66 | 0.01 |
| Δa* (sample - water) | −0.02 | 0.03 |
| Δb* (sample - water) | 0.68 | 0.23 |

For calculation of Delta b* the following formula is used:

delta $b^* = b_{sample\ standardised\ to\ 6.0\ w/w\ \%\ protein}^* - b_{demin.\ water}^*$, measured at room temperature.

For calculation of Delta a* the following formula is used:

delta $a^* = a_{sample\ standardised\ to\ 6.0\ w/w\ \%\ protein}^* - a_{demin.\ water}^*$, measured at room temperature.

For calculation of Delta L* the following formula is used:

delta $L^* = L_{sample\ standardised\ to\ 6.0\ w/w\ \%\ protein}^* - L_{demin.\ water}^*$, measured at room temperature.

The colour values for demineralised water are:
L*=39.97, a*=0 and b*=−0.22.

Results:

The results presented in table 6 demonstrate that a clear colourless and transparent beverage was produced at pH 7.0 when using a protein fraction comprising at least 85 w/w % BLG. The BLG beverage also had a low viscosity.

In contrast to this, the sample comprising a WPI wherein about 61 wt % of the proteins is BLG was yellowish and had a higher b*value.

Example 8: Milky Whey Protein Beverages, High Temperature Heat Treatment

Opaque and milky beverages comprising BLG were produced. BLG powder (having a pH of 5.5) is dissolved in tap water and adjusted to pH 6.0 using 3% NaOH and thermally treated at 94 degrees C. for 14 minutes. The BLG beverages comprised about 96% w/w of the protein as BLG. 10 w/w % BLG beverages were prepared having a pH of 6.0.

See composition of the BLG and WPI samples below:

| | BLG | WPI-A | WPI-B |
|---|---|---|---|
| w/w % BLG of protein | 95.9 | 61 | 57 |
| w/w % ALA of protein | 0.4 | 8 | 10 |
| pH of powder | 5.5 | 6.7 | 6.5 |
| Ca | 0.186 | 0.07 | 0.458 |
| K | 0.0635 | 1.14 | 0.449 |
| Mg | 0.0289 | 0.0075 | 0.0818 |
| Na | 0.0635 | 0.484 | 0.324 |
| Fat | <0.04 | 0.1 | 0.1 |
| Ash | 0.76 | 3.7 | 3 |
| Protein | 94.57 | 89.5 | 90.45 |

Turbidity, viscosity, colour and transparency were measured according to the procedures described in examples 1.7, 1.8, 1.9 as well as the beverage stability as in example 1.12.

The results are presented in table 7 below and in FIG. 1.

Table 7 Properties of a milky BLG beverage at pH 6.0.

| Sample | BLG |
|---|---|
| L* | 94.1 |
| a | −0.69 |
| b | 0.91 |
| ΔL* (sample - water) | 54.13 |
| Δa* (sample - water) | −0.69 |
| Δb* (sample - water) | 1.13 |
| Viscosity (Viscoman) cP | 2.3 cP |
| Turbidity NTU | >10.000 |

Results:

The results presented in table 7 and FIG. 1 demonstrate that milky/opaque colourless beverages were produced at pH 6.0 when using 10 w/w % protein comprising at least 85 w/w % BLG and subjecting it to a thermal heat treatment, corresponding to a sterilisation.

Figure 2:
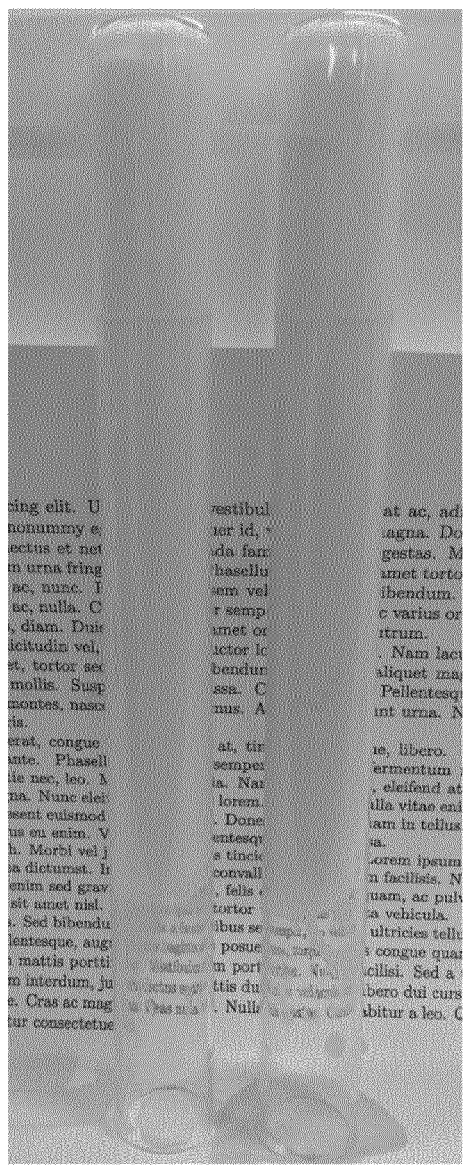
FIG. 2 shows an image of gelled WPI samples, heated at 94° C. for 14 minutes at pH 6.0.

In contrast to this the samples comprising WPI (WPI-A and WPI-B) gelled and it was thus not possible to produce a beverage (see FIG. 2).

Example 9: Digestion of Exemplary BLG Beverages Predominantly Comprising Protein Nanogels or Soluble Whey Protein Aggregates The purpose of this example is to explore structure formation during gastric digestion of different whey protein beverages by an in vitro simulation of a gastric digestion.

Three heat-treated nutritional compositions were prepared. Two of the compositions comprise ≥85% BLG (Beverages A and B) and a traditional WPI beverage (Beverage C).

The beverages were produced according to example 4 and heat treated according to example 5, The composition of protein powders used for the preparation of exemplary beverages can be seen in table 8.

TABLE 8

Composition of protein ingredients.

| Component | BLG powder A | BLG powder B | WPI powder |
|---|---|---|---|
| BLG | 98.2 | 95.9 | 61 |
| ALA | <0.5% | <0.5% | 8 |
| CMP | <1% | 1.08 | 17 |
| Ash | 0.09 | 0.51 | 3.7 |
| Ca | BDL | 0.146 | 0.072 |
| K | BDL | 0.051 | 1.14 |
| Na | BDL | 0.025 | 0.484 |
| Mg | BDL | 0.022 | 0.007 |
| pH | 3.79 | 5.7 | 6.7 |

(BDL = below detection limit)

Beverage A: A 6 w/w % BLG solution was prepared by dissolving the protein powder comprising 98.2% BLG (Table 8). pH was adjusted to pH 7.0 using 10% NaOH and sterilized by UHT treatment at 143° C. for 6 seconds to produce BLG beverage solution A.

Beverage B: A 6 w/w % BLG solution was prepared by dissolving a powder comprising 95.9% BLG (table 8). pH was adjusted to pH 6.0 using 10% NaOH and heat treated at 86° C. for 18 minutes to produce BLG beverage solution B.

Beverage C: A 6 w/w % WPI beverage was prepared by dissolving a protein powder "WPI" comprising 61% BLG (Table 8). pH was adjusted to pH 7.0 using 10% NaOH and heat-treated at 143° C. for 6 seconds; beverage C is used as a reference.

Beverages A and C are clear while beverage B is opaque and milky.

Figure 3:
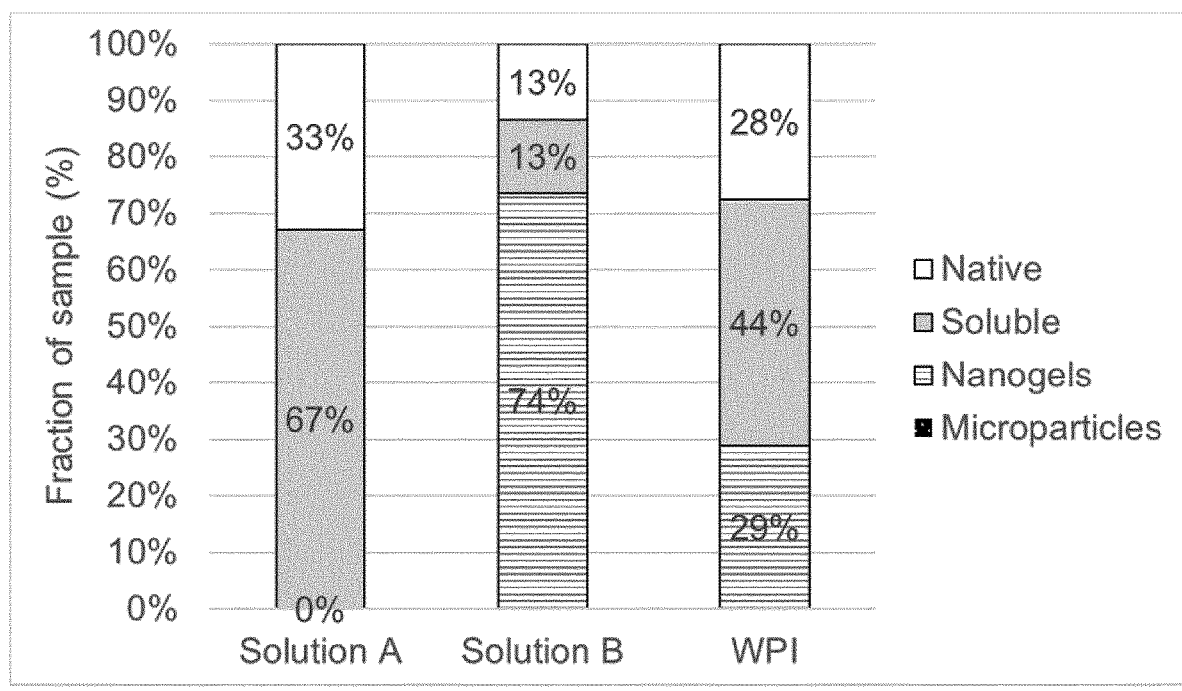
FIG. 3 shows the amount of insoluble protein matter, native whey protein, soluble whey protein aggregate and protein nanogels in exemplary whey protein beverages of example 9, A (BLG 98.2 w/w %), B (BLG 95.9 w/w %) and C (WPI).

The type and amount of insoluble protein matter, soluble aggregates, protein nanogels, and native whey protein present in the beverages was determined as described in Example 1.32, the results are presented in FIG. 3.

Results—Soluble Aggregates, Protein Nanogels, Insoluble Protein Matter and Native Whey Protein:

It was found that the BLG beverage (A) and the WPI beverage (C) resulted in clear beverage, in contrast to the milky appearance of BLG beverage (B). The composition of aggregates was evaluated by the method described in example 1.32 and shown in FIG. 3. FIG. 3 demonstrates that Beverages A (BLG pH 7.0) and C (WPI reference, pH 7.0) predominantly contain soluble whey protein aggregates (67% and 44% respectively) and that beverage B (BLG pH 6.0) predominantly contains protein nanogels (74%). The content of insoluble protein matter was less than 1% in all three beverages.

About 28-33% residual native protein was found in both BLG (A) and WPI (C) beverages this may arise from an incomplete aggregation process whereas 13% native protein remained in BLG (B). The beverage compositions thus contain different protein structures which could lead to differences in their digestion.

A fourth beverage (beverage D) was prepared by mixing 1 volume of a the heat-treated solution A with 1 volume of the heat-treated solution B. Beverage D was found to contain 45% protein nanogels, 19% soluble whey protein aggregates and 37% native protein.

Simulated Gastric Digestion Method:

In order to explore the structure formation during gastric digestion of different whey protein beverages, we performed the following in vitro simulation of a gastric digestion.

Samples were subjected to simulated oral and gastric digestion according to the protocol previously described in Mulet-Cabero, A.-I., Mackie, A. R., Wilde, P. J., Fenelon, M. A., & Brodkorb, A. (2019). Structural mechanism and kinetics of in vitro gastric digestion are affected by process-induced changes in bovine milk. Food Hydrocolloids, 86, 172-183 with minor modifications described below.

Before digestion was performed, the sample (30 g) was mixed with a solution consisting of the buffer salts at 37° C., at a quantity and concentration identical with that which would subsequently be used during the actual simulated digestion. This mixture was titrated to pH 2.0 with 0.1 M HCl using a pH stat (Metrohm 602 pH Stat), this was necessary to determine the actual buffering capacity of the food and is required in order to program the titrator for the actual digestion.

For the actual digestion, samples (30) g were mixed with model human saliva at 37° C. (excluding salivary amylase as there was no starch present in the beverages) for two minutes, the quantity of model saliva (1.65 g) was determined by the solids content (6%) of the sample.

The sample was transferred to a thermostated reaction vessel for the gastric digestion process, the vessel initially contained 10% of the total acid and gastric fluid salts and mimics the fasted state of the stomach. The remaining 90% of the buffering salts, 0.1 M HCl and water were added at a rate such that the addition was completed after 105 minutes, which was the calculated duration of the gastric digestion process. A solution of pepsin (0.5 ml, 254400 U/ml) was added using a syringe pump at 4.762 µl/minute such that all the pepsin solution was added by the end of the 105 minute digestion. The solutions were added adjacent to the walls of the vessel to mimic secretion by the stomach mucosal surface. The pH of the mixture was monitored using a Metrohm Unitrode (6.0258.010) with integrated PT100 thermometer, mounted vertically and centrally within the digestion vessel, which was placed centrally on a rotating oscillating mixer (15 rpm, ±5° from horizontal) which allowed gentle mixing of the sample. Six samples were taken from the bottom of the digestion vessel over the course of the digestion (17.5, 35, 52.5, 70, 87.5 and 105 minutes) with a sampling pipette with a 4 mm diameter orifice. Samples were photographed in a glass Petri dish against a black background using a mobile phone (Samsung Galaxy S8+) in ambient light at a resolution of 4032×3024 pixels at a height of approximately 15 cm.

Samples for SDS PAGE were analysed under reducing conditions on 4-12% gradient gels (Bolt Gel, Invitrogen) using the manufacturers protocol (Constant voltage, 200V, 22 minutes). The sample lanes were bracketed with standards (Invitrogen Mark 12). After running the gels, the gels were fixed in an acidic solution (50% water, 40% methanol, 10% acetic acid) for 2 hours, washed with water (3×5 minutes, 100 ml water per wash) before being stained overnight (50 ml Simply Blue, Invitrogen).

The gels were Imaged using a Chemi Doc XRS system (Bio-Rad).

Figure 4:
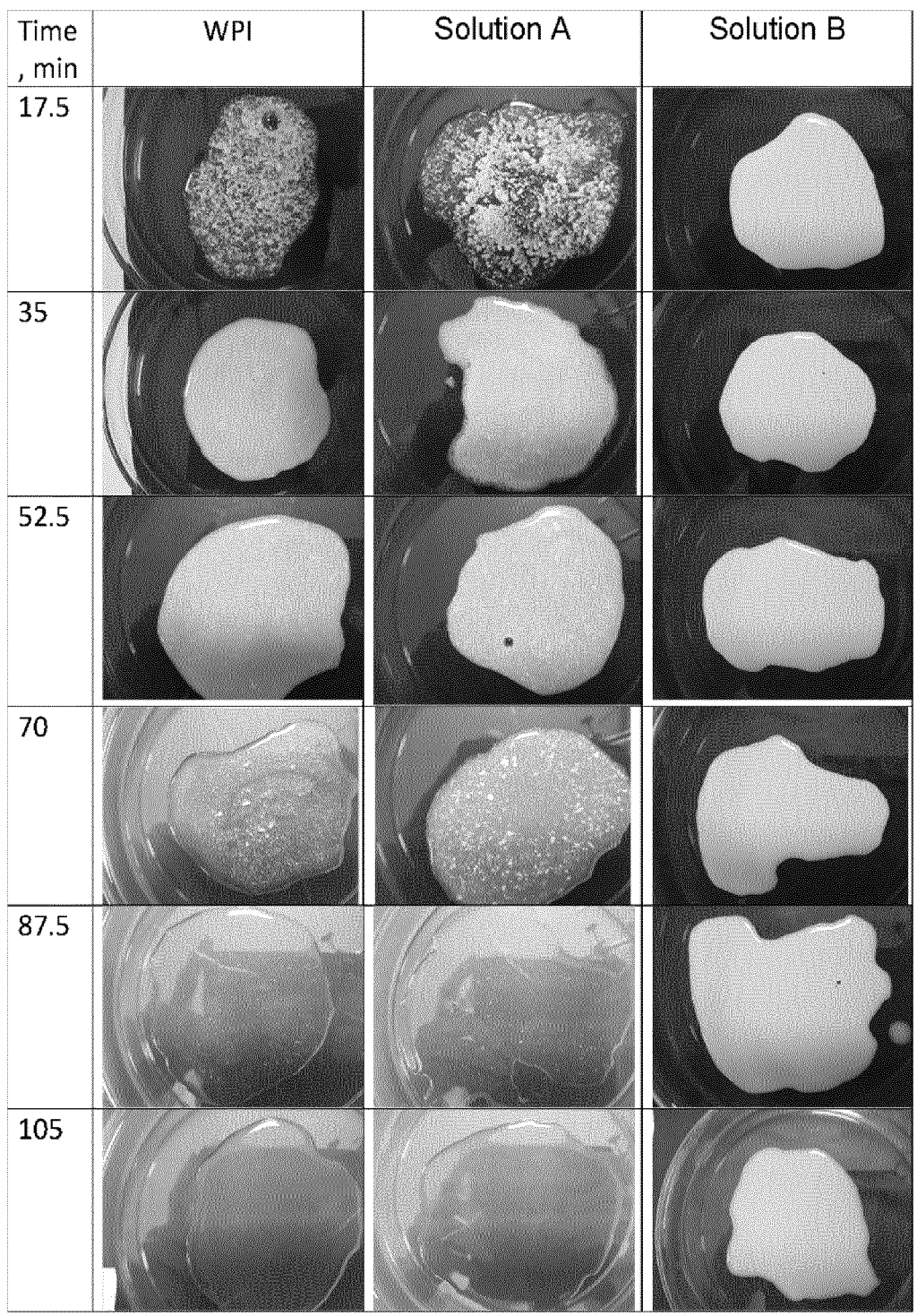
FIG. 4 shows Semi-dynamic in vitro digestion of exemplary beverages A (BLG 98.2 w/w %), B (BLG 95.9 w/w %) and C (WPI).
Figure 5:
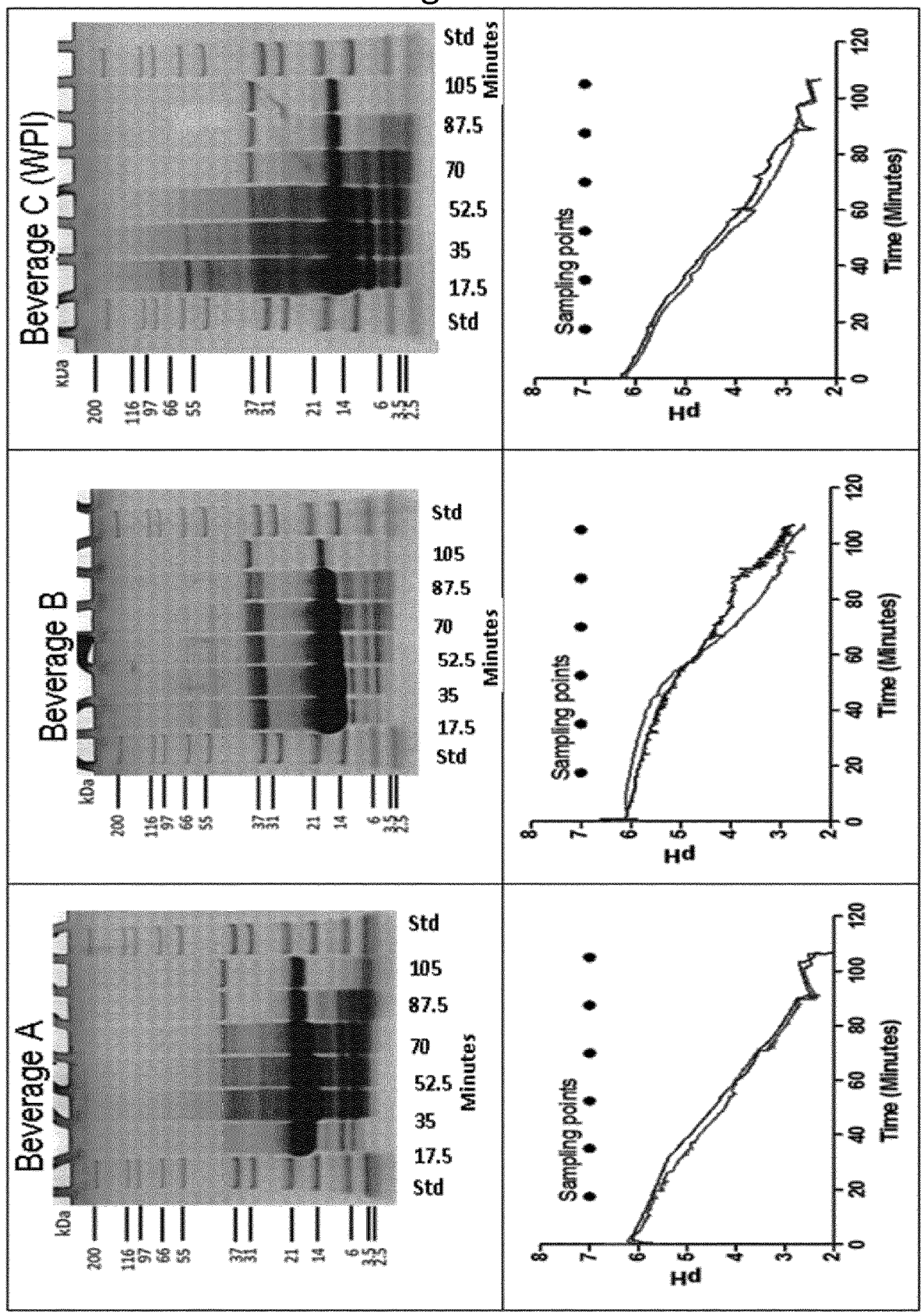
FIG. 5 shows on top: SDS-PAGE analysis of protein aliquots withdrawn at selected timepoints (17.5-105 minutes) during semi-dynamic in vitro digestion of samples. Bottom: pH traces during digestion of sample.

The results are presented in FIGS. 4 and 5. FIG. 4 shows the Semi-dynamic in vitro digestion of beverages A, B and C (WPI) while FIG. 5 shows on top: SDS-PAGE analysis of protein aliquots withdrawn at selected timepoints (17.5-105 minutes) during semi-dynamic in vitro digestion of samples. The pH at the different time points of the digestion study in shown on the bottom.

Results—Simulated Gastric Digestion:

To our surprise, very similar visual protein clotting behaviours were observed throughout the digestion in beverages A (BLG at pH 7.0) and C (WPI at pH 7.0) despite of the higher content of ALA and CMP in the WPI beverage. For both beverages (A and C), protein clots were observed already at 17.5 minutes and were likely due to the initial mixing with acid and gastric fluid salts and the clot amount increased to form an opaque liquid at 35-52.5 minutes (see FIG. 4). The latter timepoints correspond to the pH range of about 5.6 to 4.2, with visible protein clots/agglomerates found at up to 70 minutes (see FIG. 5). It was further found that clotting/agglomeration was accompanied by an increase in viscosity. When more pepsin and gastric fluid salts were added and thereby effectively decreased the pH further, the digestion became transparent, the viscosity decreased and protein clots gradually disappeared.

However, it was surprisingly found that beverage B (BLG at pH 6.0) remained opaque throughout the digestion and that it did not contain visible protein clots at 35-52.5 minutes it was also evaluated as only slightly more viscous in this phase of digestion (FIG. 4).

FIG. 5 demonstrates that at early phases of digestion (17.5 minutes) the protein band between 14 and 21 kDa markers (corresponding to BLG) is indeed dominant in beverage A, whereas multiple bands are present in WPI (beverage C).

Beyond a predominant BLG band, beverage B further contains a band around the 37 kDa marker band that may correspond to BLG dimers. When the digestion time is increased (along with the continuous addition of gastric fluid salts and pepsin), protein bands of lower molecular weight than BLG appear in both beverages A and C (WPI).

To our surprise, the intensity of these low molecular weight protein/peptide bands in beverage A and C (WPI) beverages was found to be significantly lower in beverage B. This may be due to an increased resistance toward gastric proteolysis of BLG predominantly in protein nanogel form compared to soluble aggregates. This finding may enable beverage manufacturers to modulate the state of which protein in the beverage is delivered from the gastrointestinal tract to the intestines by either using beverages containing predominantly soluble whey protein aggregates or protein nanogels or via the use of mixtures.

Gel Strength Upon Acidification:

The gel strength of beverages A, B and C was measured during acidification as described in example 1.11. The results are demonstrated in FIG. 6.

Figure 6:
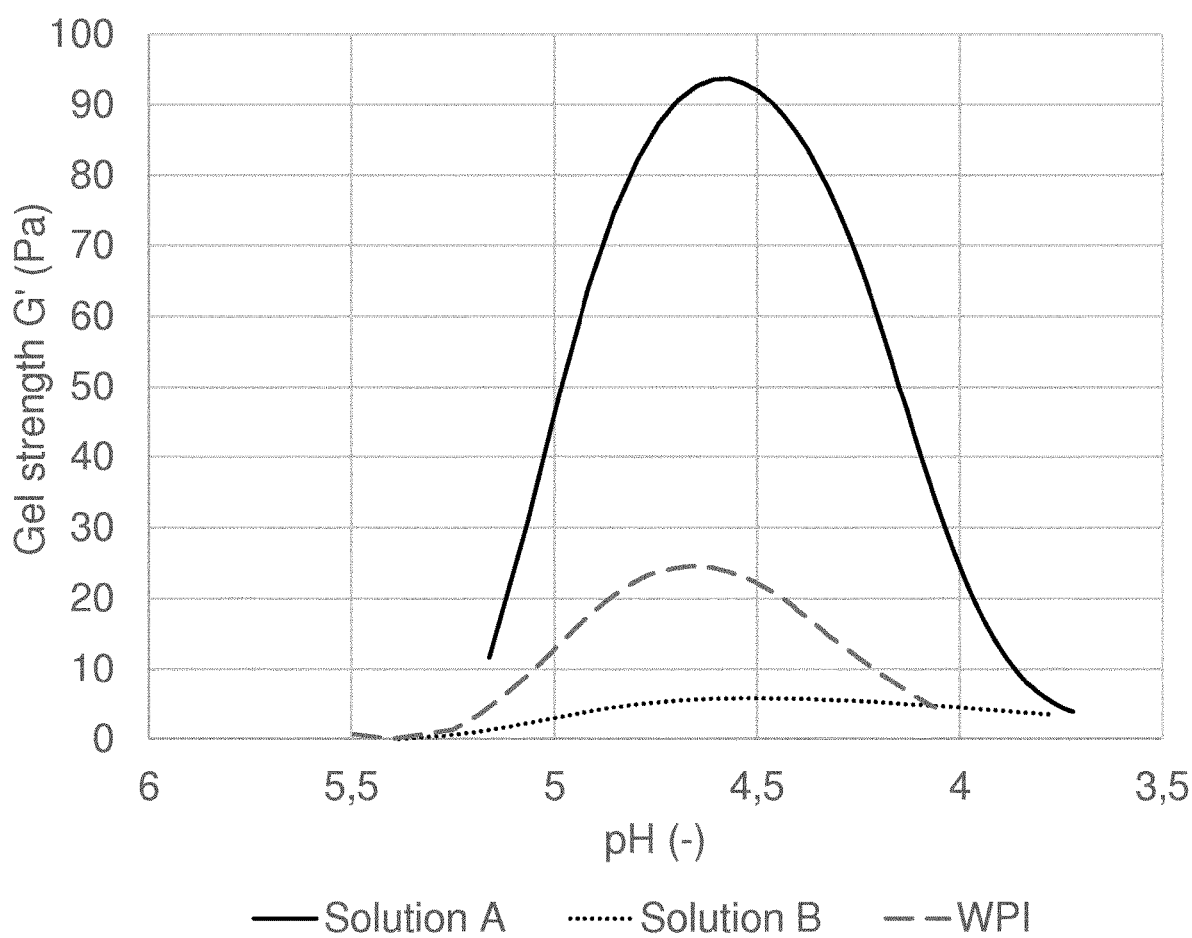
FIG. 6 shows simulation of acidification in the stomach. Gel strength was measured during acidification of three types of beverages predominantly containing either soluble whey protein aggregates (beverage A and WPI) or protein nanogels (beverage B).

Results—Measurement of Gel Strength Upon Acidification:

FIG. 6 shows a simulation of acidification in the stomach. The gel strength was measured during acidification of the three types of beverages predominantly containing soluble aggregates (beverage A and C (WPI)) or protein nanogels (beverage B). The concentration of soluble whey protein aggregates in WPI is expected to be lower due to the lower content BLG and a higher content of other proteins such as CMP (table 8).

Despite the similarity in digestive pattern of beverages A and C (see FIGS. 4 and 5), it was surprisingly found that the viscosity of BLG beverage A increased dramatically compared to the WPI sample when it was acidified. This may be due to the high purity of BLG that is incorporated into aggregates and is present in substantially higher amounts in BLG compared to WPI in which CMP and ALA are less prone to aggregation, see table 8.

Example 10: High Protein Beverages Comprising BLG (Protein Nanogels)

Nutritional high protein beverages comprising 10 w/w %, 11 w/w %, 12 w/w %, 13 w/w %, 14 w/w %, 15 w/w % and 16 w/w % whey protein in which ≥95.9% w/w is BLG were prepared from BLG powder A (shown in table 9). The pH was adjusted to pH 6.0 with 3% w/w NaOH. The solutions were heat treated as described in example 5 in a water bath at 90° C. for 5 min. Afterward the samples were cooled down in ice water, and temperated to room temperature, according to example 5.

TABLE 9

Chemical composition of BLG isolate powder A.

| Description | A - Dry BLG (w/w %) |
|---|---|
| BLG | 95.9 |
| Ash | 0.51 |
| Ca | 0.1455 |
| Cl | 0.04 |
| Lipid | 0.11 |
| K | 0.0512 |
| Mg | 0.022 |
| Na | 0.025 |
| $NO_3$ | 2 |
| $NO_2$ | 0.07 |
| PHO | 0.025 |
| Protein | 93.97 |
| Dry matter | 95.19 |
| pH | 5.7 |

The viscosity (example 1.8), the visual appearance by imaging (example 1.9) and size (hydrodynamic diameter) and the hydrodynamic diameter (example 1.33) of the different beverages were analysed.

Figure 7:
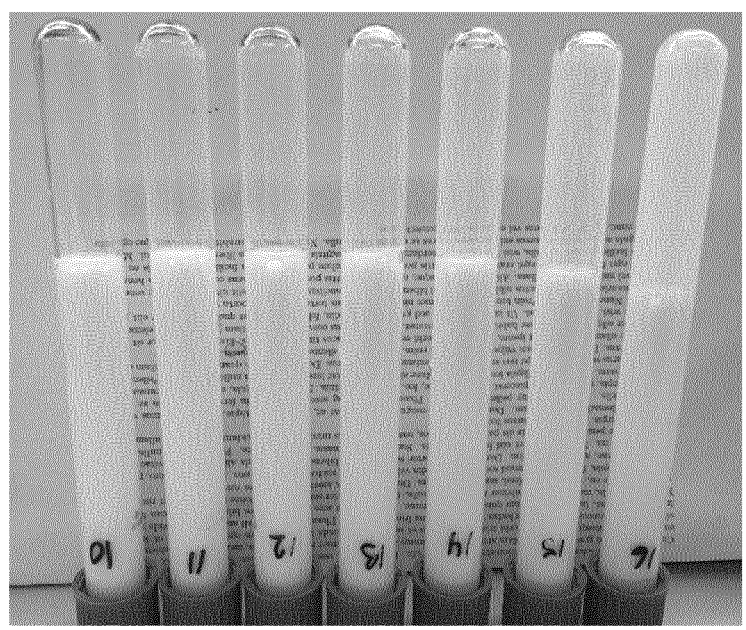
FIG. 7 shows liquid beverages at 10-16 w/w % protein after heat treatment at 90° C. for 5 minutes.
Figure 8:
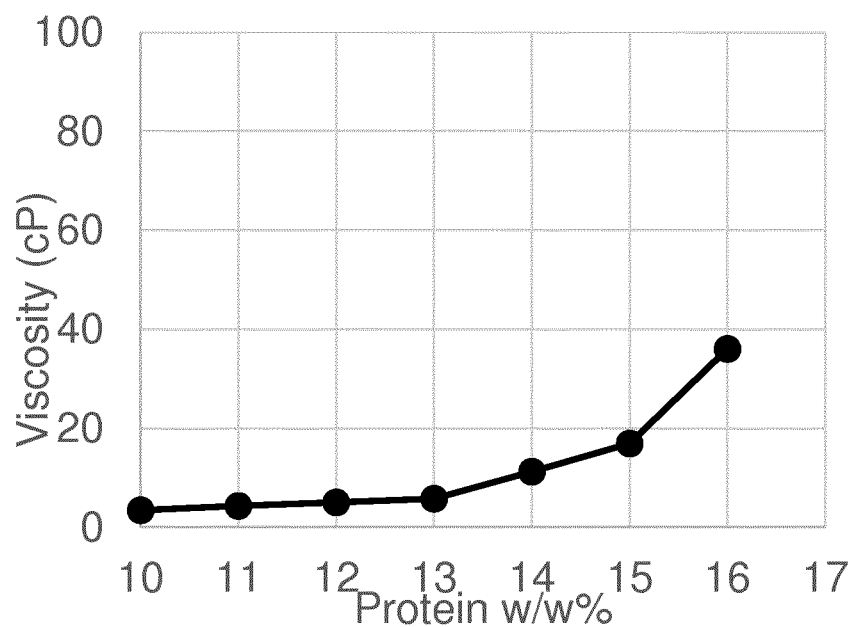
FIG. 8 shows viscosity measurement after heat treatment at 90° C. for 5 minutes, at 10-16 w/w % protein.
Figure 9:
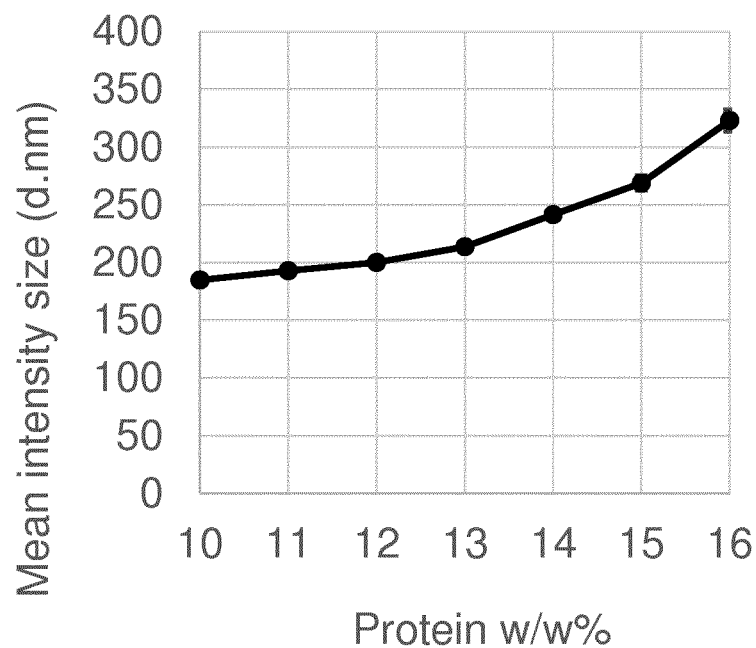
FIG. 9 shows the particle size of heat treated beverages at 10-16 w/w % protein.

Results:

The results are presented in FIGS. 7, 8 and 9. Table 10 below shows the chemical composition of a 16 w/w % BLG beverage heat-treated at 90° C. for 5 min.

The inventors found that the viscosity of the BLG samples surprisingly remained remarkably low even after thermal treatment at 90° C. for 5 minutes at concentrations from 10% w/w protein and even more surprisingly up to at least 16 w/w % protein, see FIGS. 7 and 8. This was completely unexpected A comparable WPI sample would gel at 10 w/w % WPI pH 6.0 (see example 8 and FIG. 2).

Despite such high protein concentration during thermal aggregation, no sedimentation or grains were observed in the beverages, which makes the nutritional compositions particularly suited for high protein beverage applications.

The hydrodynamic diameter of the protein particles was measured (example 1.33) and shown in FIG. 9. The hydrodynamic diameter of the protein particles was measured to 185-323 nm, which indicates that the high protein beverages contain protein nanogel particles, which have been described as particles with a hydrodynamic radius of 100-300 nm by Phan-Xuan et al., 2014 (Phan-Xuan, T., Durand, D., Nicolai, T., Donato, L., Schmitt, C., & Bovetto, L. (2014). Heat induced formation of beta-lactoglobulin microgels driven by addition of calcium ions. *Food Hydrocolloids*, 2012, 34, 227-235.

TABLE 10

Chemical composition of a 16 w/w % BLG beverage.

| | w/w % |
|---|---|
| Ca | 0.025 |
| K | 0.008 |
| Mg | 0.004 |
| Na | 0.038 |
| PH | 6.04 |
| PHO | BDL |
| Protein | 15.9 |

Example 11: High Protein Beverages at Neutral pH

Nutritional high protein beverages comprising 6 w/w %, 10 w/w % and 12 w/w % whey protein in which 95.9% w/w is BLG were prepared from BLG powder A (shown in table 9) to evaluate the stability and turbidity of the beverages. The pH was adjusted to pH 6.0 and 7.0 with 3% w/w NaOH or HCL. The solutions were heat treated as described in example 5 in a water bath at 90° C. for 5 min. Afterward the samples were cooled down in ice water, and temperated to room temperature, according to example 5.

The viscosity (example 1.8), the turbidity (example 1.7), the colour (example 1.9) and the amount of insoluble protein matter (example 1.10) of the different samples were analyzed.

Figure 10:
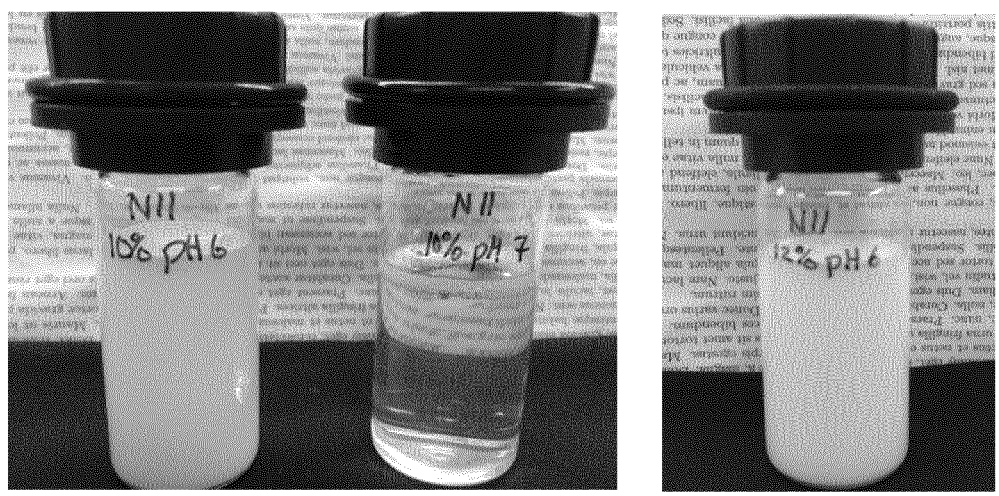
FIG. 10 shows from the left 10 w/w % beverages at pH 6.0 and pH 7.0 respectively using BLG powder A. To the right a 12 w/w % beverage at pH 6.0 using BLG powder A (from table 9).

The results are presented in table 10 below and in FIG. 10.

In contrast to this, we have found that corresponding WPI samples, containing only 57 to 61 w/w % BLG of total protein gels at 10 w/w % protein as shown in example 8.

Example 12: High Protein Beverages at Neutral pH with a Lipid Content of 25% and 50% of the Total Energy Content Nutritional high protein beverages comprising 3 w/w %, 6 w/w %, 10 w/w % and 12 w/w % whey protein in which 95.9% w/w is BLG was prepared from BLG powder A (shown in table 9). Lipids were added to a lipid content of 25% and 50% of the total energy content in order to evaluate the opportunity to prepare nutritional beverages also in the presence of fat.

TABLE 10

Properties of high protein BLG beverages at pH 6.0 and pH 7.0. Grey cells = not determined due to sample gelation.

| Powder | Protein w/w % | pH | Viscosity cP | Turbidity NTU | Description | L* | a* | b* | Δb* | Insoluble protein matter % |
|---|---|---|---|---|---|---|---|---|---|---|
| A | 6 | 6.0 | 1.9 | — | Milky | 90.73 | −1.96 | −1.76 | −1.54 | 0 |
|   |   | 7.0 | 4.1 | 14.6 | Clear | 39.87 | −0.11 | 0.04 | 0.26 | 0 |
|   | 10 | 6.0 | 2.8 | >11000 | Milky | 90.47 | −2.54 | −2.4 | −2.18 | 0 |
|   |   | 7.0 | 57.7 | 11.1 | Clear | 39.74 | −0.11 | 0.04 | 0.26 | 0 |
|   | 12 | 6.0 | 4.5 | — | Milky | 90.38 | −2.24 | −1.92 | −1.70 | 0 |
|   |   | 7.0 | Gel |   |   |   |   |   |   |   |

Results:

Clear Beverages:

It was surprisingly found that it was possible to produce a stable colourless and transparent beverage at pH 7.0 even at a high protein concentration of 10 w/w % protein, when using powder A (table 9), containing 0.1455 w/w % calcium. The inventors have experienced that WPI-based beverages would form gels under the similar conditions.

Milky Beverages:

It was found that a milky beverage with remarkably low viscosity (4.5 cP) could be produced even at a protein concentration of 12 w/w % protein at pH 6.0 after heat treatment at 90° C. for 5 min. without signs of visible grains or sedimentation.

Water and lipid were equilibrated at 70° C. in a water bath. 0.2% Grindsted Citrem LR10 was dissolved in the heated oil and then slowly mixed with preheated water. The solution was cooled to 60° C. and the powder was added and stirred for 30-45 min to obtain the beverage compositions.

The pH was adjusted to pH 6.0 or pH 7.0 with 3% NaOH or HCl. The solutions were heat treated in a water bath at 90° C. for 5 min. Afterward the samples were cooled down in ice water, and temperated to room temperature, according to example 5.

A homogenisation step may further be included in the steps above if necessary to obtain homogeneous samples.

The viscosity (example 1.8), the turbidity (example 1.7), the colour (example 1.9) and the amount of insoluble protein matter (example 1.10) of the different samples were analysed.

The results are presented in table 11 below.

TABLE 11

Properties of milky BLG beverages with added lipids.

| Protein w/w % | Lipid w/w % (% E) | pH | Viscosity cP | Turbidity NTU | Description | L* | a* | b* | Δb* | Insoluble protein matter % |
|---|---|---|---|---|---|---|---|---|---|---|
| 3 | 0.45 | 6.0 | 2.1 | — | Milky | 89.36 | −0.78 | −0.92 | −0.70 | 0 |
|   | (25% E) | 7.0 | 1.4 | 7652 | Milky | 58.35 | −1.46 | −6.76 | −6.54 | 0 |
|   | 1.35 | 6.0 | 1.9 | — | Milky | 88.76 | −0.8 | −1.13 | −0.91 | 0 |
|   | (50% E) | 7.0 | 2.0 | >11000 | Milky | 69.07 | −1.47 | −4.97 | −4.75 | 0 |
| 6 | 0.9 | 6.0 | 1.9 | >11000 | Milky | 90.7 | −2.34 | −2.4 | −2.18 | 0 |
|   | (25% E) | 7.0 | 5.0 | 2122 | Milky | 33.87 | −0.18 | −2.23 | −2.01 | 0 |
|   | 2.7 | 6.0 | 1.9 | >11000 | Milky | 90.71 | −2.42 | −2.49 | −2.27 | 0 |
|   | (50% E) | 7.0 | 4.7 | 2951 | Milky | 37.71 | −0.32 | −2.3 | −2.08 | 0 |
| 10 | 1.5 | 6.0 | 3.8 | >11000 | Milky | 90.96 | −2.83 | −2.46 | −2.24 | 0 |
|   | (25% E) | 7.0 | 178.3 | 3628 | Milky | 37.44 | −0.41 | −1.49 | −1.27 | 0 |

TABLE 11-continued

Properties of milky BLG beverages with added lipids.

| Protein w/w % | Lipid w/w % (% E) | pH | Viscosity cP | Turbidity NTU | Description | L* | a* | b* | Δb* | Insoluble protein matter % |
|---|---|---|---|---|---|---|---|---|---|---|
|  | 4.5 (50% E) | 6.0 | 4.8 | >11000 | Milky | 90.6 | −2.66 | −2.11 | −1.89 | 0 |
|  |  | 7.0 | 5.5 | >11000 | Milky | 90 | −2.94 | −2.85 | −2.63 | 0 |
| 12 | 1.8 (25% E) | 6.0 | 5.7 | >11000 | Milky | 90.7 | −2.16 | −2.2 | −1.98 | 0 |
|  |  | 7.0 | Gel |  |  |  |  |  |  |  |
|  | 5.4 (50% E) | 6.0 | 7.8 | >11000 | Milky | 89.09 | −2.35 | −2.9 | −2.68 | 0 |
|  |  | 7.0 | Gel |  |  |  |  |  |  |  |

Results:

It was found that it was possible to produce stable high protein BLG beverages even with a lipid content of 25% and 50% of the total energy content and still having a remarkably low viscosity.

At pH 7.0 it was possible to produce 10 w/w % protein milky beverages (comprising at least 85 w/w % BLG) with a very low viscosity (5.5 cP), when 50% of the total energy content was lipids.

It was also found that 12 w/w % beverages at pH 6.0 with a lipid content of 25% and 50% of the total energy content could be produced. They had a white milky appearance and a very low viscosity (7.8 cP). The turbidity was at least 11000NTU. The beverages were stable and no insoluble protein matter after 3000 g 5 min were observed.

Example 13: High pH Beverages

Nutritional beverages comprising BLG were produced at pH 8.0 in order to demonstrate their stability and appearance at a high pH.

Nutritional high protein beverages comprising 3 w/w %, whey protein in which at least 85 wt % is BLG were prepared from BLG powder A and B (shown in table 12).

TABLE 12

Chemical composition of two BLG isolate powders.

| Description | A - Dry BLG (w/w %) | B - Dry BLG (w/w %) |
|---|---|---|
| BLG | 95.9 | 92.06 |
| Ash | 0.51 | 1.86 |
| Ca | 0.1455 | 0.0187 |
| Cl | 0.04 | 0.04 |
| Lipid | 0.11 | 0.04 |
| K | 0.0512 | 0.6715 |
| Mg | 0.022 | 0.003 |
| Na | 0.025 | 0.279 |
| $NO_3$ | 2 | 4 |
| $NO_2$ | 0.07 | 0.55 |
| PHO | 0.025 | 0.025 |
| Protein | 93.97 | 92.45 |
| Dry matter | 95.19 | 95.82 |
| pH | 5.7 | 6.9 |

The pH was adjusted to pH 8.0 with 3% NaOH. The solutions were heat treated in a water bath at 90° C. for 5 min. Afterward the samples were cooled down in ice water, and temperated to room temperature, according to example 5.

The results are presented in table 13.

TABLE 13 properties of pH 8.0 beverages.

| Protein w/w % | pH | Powder | Viscosity cP | Turbidity NTU | L* | a* | b* | Δb* | Insoluble protein matter % |
|---|---|---|---|---|---|---|---|---|---|
| 3 | 8.0 | A | 1.49 | 5.3 | 40.03 | 0.00 | −0.02 | 0.20 | 0 |
|  |  | B | 1.8 | 1.7 | 39.45 | −0.20 | −0.15 | 0.07 | 3 |

Results:

The results demonstrate that clear stable beverages having a pH of 8.0 may be produced. The beverages were surprisingly colourless and transparent and with a very low viscosity and turbidity at pH 8.0 using both powder A or powder B.

The invention claimed is:

1. A sterile, packaged, heat-treated beverage having a pH in the range of 5.5-8.0, the beverage comprising
    a total amount of protein of 4 to 20% w/w relative to the weight of the beverage, wherein at least 92% w/w of the protein is beta-lactoglobulin (BLG) and at least 50% w/w of the total amount of protein comprises protein nanogels,
    optionally, sweetener and/or flavour,
    wherein the beverage has been subjected to a heat treatment, which involves sterilization.

2. The packaged, heat-treated beverage preparation according to claim 1, wherein the protein fraction of the beverage preparation has a colour value delta b* in the range of −0.10 to +0.51 at the CIELAB colour scale, wherein delta $b^* = b^*_{sample\ standardised\ to\ 6.0\ w/w\ \%\ protein} - b^*_{demin.\ water}$, measured at room temperature.

3. The packaged, heat-treated beverage preparation according to claim 1, wherein the beverage preparation, has a colour value delta b* in the range of −0.10 to +0.51 at the CIELAB colour scale, wherein delta $b^* = b^* = b^*_{sample\ standardised\ to\ 6.0\ w/w\ \%\ protein} - b^*_{demin.\ water}$, measured at room temperature.

4. The packaged, heat-treated beverage according to claim 1, wherein the sum of the concentration of Na, K, Mg and Ca is at most 400 mM.

5. The packaged, heat-treated beverage according to claim 1, wherein the beverage comprises at most 100 mg phosphorus/100 g protein and at most 700 mg potassium/100 g protein.

6. The packaged, heat-treated beverage according to claim 1, having a pH in the range of 6.5-7.5.

7. The packaged, heat-treated beverage according to claim 1, having a turbidity of at most 200 NTU.

8. The packaged, heat-treated beverage according to claim 1, having a turbidity of more than 200 NTU.

9. The packaged, heat-treated beverage according to claim 1, having a viscosity of at most 200 centipoise, measured at 22 degrees Celsius at a shear rate of 100/s.

10. The packaged, heat-treated beverage according to claim 1, further comprising carbohydrate between 0 to 95% of the total energy content of the beverage.

11. The packaged, heat-treated beverage according to claim 1, further comprising a lipid content between 0 to 50% of the total energy content of the beverage.

12. The packaged, heat-treated beverage according to claim 1, comprising a BLG isolate.

13. The packaged, heat-treated beverage according to claim 1, wherein each main non-BLG whey protein is present in a weight percentage relative to total protein which is at most 15% of its weight percentage relative to total protein in a standard whey protein concentrate from sweet whey.

14. The packaged, heat-treated beverage according to claim 1, comprising at least 60% w/w soluble whey protein aggregates relative to total protein.

15. The packaged, heat-treated beverage according to claim 1, wherein at least 96% w/w of the protein is beta-lactoglobulin (BLG).

16. A dietary supplement comprising the packaged heat-treated beverage according to claim 1.

17. The packaged, heat-treated beverage according to claim 1, wherein at least 94% w/w of the protein is BLG.

18. The packaged, heat-treated beverage according to claim 1, having a viscosity of at most 200 cP, measured at 22° C. at a shear rate of 100/s.

19. The packaged, heat-treated beverage according to claim 1, having a viscosity of at most 50 cP, measured at 22° C. at a shear rate of 100/s.

20. The packaged, heat-treated beverage according to claim 1, having a viscosity of at most 20 cP, measured at 22° C. at a shear rate of 100/s.

21. A method of producing a sterile packaged, heat-treated beverage having a pH in the range of 5.5-8.0, comprising the following steps:
   a) providing a liquid solution comprising:
      a total amount of protein of 4.0 to 20% by weight, wherein at least 92% w/w of the protein is beta-lactoglobulin (BLG), having a pH in the range of 5.5-8.0, and at least 50% w/w of the total amount of protein comprises protein nanogels;
      optionally, sweetener and/or flavour
   b) packaging the liquid solution,
   wherein the liquid solution of step a) and/or the packaged liquid solution of step b) is subjected to a heat treatment which involves sterilization.

22. The method according to claim 21, wherein the sterilisation involves a temperature in the range of 120 to 150C° for 4 to 30 seconds.

23. The packaged heat-treated beverage according to claim 1, for use in a method for the treatment of diseases associated with protein malabsorption.

* * * * *